United States Patent [19]

Benedict et al.

[11] Patent Number: 5,681,612
[45] Date of Patent: Oct. 28, 1997

[54] COATED ABRASIVES AND METHODS OF PREPARATION

[75] Inventors: Harold W. Benedict, Cottage Grove; Michael J. Schneider, St. Paul; Donna W. Bange, Eagan; Gary L. Heacox, Stillwater; Timothy J. Trudeau; Subramanian Krishnan, both of St. Paul, all of Minn.

[73] Assignee: Minnesota Mining and Manufacturing Company, St. Paul, Minn.

[21] Appl. No.: 602,546

[22] Filed: Feb. 20, 1996

Related U.S. Application Data

[63] Continuation-in-part of Ser. No. 242,295, May 13, 1994, abandoned, which is a continuation-in-part of Ser. No. 79,364, Jun. 17, 1993, abandoned, and a continuation-in-part of Ser. No. 443,322, May 17, 1995, abandoned, which is a division of Ser. No. 199,679, Feb. 22, 1994, abandoned.

[51] Int. Cl.$^6$ .................. B05D 3/12; B05D 5/02; B05D 1/38; B24D 11/06
[52] U.S. Cl. .................. 427/240; 427/202; 427/203; 427/214; 427/289; 427/381; 51/294; 51/295; 51/298
[58] Field of Search .................. 427/202, 203, 427/204, 205, 240, 389.9, 412, 407.3, 289, 179, 214, 219, 221, 233, 376.2, 419.5, 381; 51/295, 294, 298

[56] References Cited

U.S. PATENT DOCUMENTS

| Re. 25,587 | 6/1964 | Wiltshire | 264/114 |
|---|---|---|---|
| 289,879 | 12/1883 | Almond . | |
| 1,412,309 | 4/1922 | Lambert . | |
| 1,676,845 | 7/1928 | Teisher . | |
| 1,924,355 | 8/1933 | Freedlander | 154/4 |
| 2,032,356 | 3/1936 | Ellis | 51/278 |
| 2,209,074 | 7/1940 | Dahlstrom | 51/188 |

(List continued on next page.)

FOREIGN PATENT DOCUMENTS

| 1023563 | 1/1978 | Canada | 57/4 |
|---|---|---|---|
| 095055 | 11/1983 | European Pat. Off. . | |
| 142140 | 5/1985 | European Pat. Off. . | |
| 213353 | 3/1987 | European Pat. Off. . | |
| 0 257 757 A3 | 3/1988 | European Pat. Off. . | |

(List continued on next page.)

OTHER PUBLICATIONS

"Air Products Announces Trademark Changes for Polyurethane Prepolymers and Curatives", News Release #94034 from Air Products & Chemicals, Inc., 2 pgs. (Jan. 3, 1994).
"American National Standard for Grading of Certain Abrasive Grain on Coated Abrasive Material", sponsored by Grinding Wheel Institute (ANSI Standard B74.18–1984), 32 pages (Jan. 27, 1984).

(List continued on next page.)

*Primary Examiner*—Diana Dudash
*Attorney, Agent, or Firm*—Gary L. Griswold; Walter N. Kirn; Daniel R. Pastirik

[57] ABSTRACT

Methods for preparing abrasive articles and novel methods of making abrasive articles are presented. One method includes inserting a fibrous material adjacent an interior surface of a drum. A composition comprising an organic binder precursor material is then placed in the drum, and the drum is rotated such that centrifugal forces distribute the composition, including the organic binder precursor material, uniformly about the fibrous material. The composition is exposed to conditions sufficient to solidify the organic binder precursor material such that an endless, flexible, seamless substrate is formed having an outer surface formed adjacent the interior surface of the drum, an inner surface opposite the outer surface and the fibrous material embedded therein. Coated abrasives formed by this method, as well as other methods, are provided wherein an effective amount of a fibrous reinforcing material is engulfed within an organic polymeric binder material. Sufficient binder is present such that there is one or more regions of organic binder material free of fibrous reinforcing material, to which abrasive particles are attached.

43 Claims, 13 Drawing Sheets

U.S. PATENT DOCUMENTS

| | | | |
|---|---|---|---|
| 2,333,035 | 10/1943 | Oglesby | 51/185 |
| 2,349,365 | 5/1944 | Martin et al. | 51/197 |
| 2,356,249 | 8/1944 | Kremer et al. | 154/4 |
| 2,356,866 | 8/1944 | Melton et al. | 51/293 |
| 2,391,731 | 12/1945 | Miller et al. | 51/188 |
| 2,404,207 | 7/1946 | Ball | 51/188 |
| 2,411,724 | 11/1946 | Hill | 51/293 |
| 2,468,853 | 5/1949 | Williamson | 51/294 |
| 2,590,697 | 3/1952 | Grove | 51/297 |
| 2,682,733 | 7/1954 | Buckner | 51/188 |
| 2,704,735 | 3/1955 | Hedges et al. | 154/120 |
| 2,712,987 | 7/1955 | Storrs et al. | 51/293 |
| 2,743,559 | 5/1956 | Ball et al. | 51/188 |
| 2,773,540 | 12/1956 | Waugh | 154/4 |
| 2,785,442 | 3/1957 | Boggs | 18/58.3 |
| 2,983,637 | 5/1961 | Schmidt | 154/52.1 |
| 2,995,176 | 8/1961 | Waugh | 154/4 |
| 2,999,780 | 9/1961 | Perrault | 154/83 |
| 3,030,743 | 4/1962 | Raymond | 51/207 |
| 3,166,388 | 1/1965 | Riegger et al. | 51/196 |
| 3,276,852 | 10/1966 | Lemelson | 51/298 |
| 3,333,372 | 8/1967 | Gianatasio | 51/399 |
| 3,561,938 | 2/1971 | Block et al. | 51/358 |
| 3,562,968 | 2/1971 | Johnson et al. | 51/389 |
| 3,577,872 | 5/1971 | Drummond | 57/35 |
| 3,607,502 | 9/1971 | Marzocchi et al. | 156/142 |
| 3,729,835 | 5/1973 | Sandell | 51/399 |
| 3,860,400 | 1/1975 | Prowse et al. | 51/295 |
| 3,900,355 | 8/1975 | Goto et al. | 156/74 |
| 4,018,574 | 4/1977 | Dyer | 51/295 |
| 4,049,767 | 9/1977 | Vaidya | 264/257 |
| 4,163,647 | 8/1979 | Swiatek | 51/295 |
| 4,215,516 | 8/1980 | Huschle et al. | 51/399 |
| 4,253,836 | 3/1981 | Miranti, Jr. | 474/200 |
| 4,256,467 | 3/1981 | Gorsuch | 51/295 |
| 4,282,011 | 8/1981 | Terpay | 51/298 |
| 4,289,168 | 9/1981 | Lecourt et al. | 138/109 |
| 4,314,827 | 2/1982 | Leitheiser et al. | 51/298 |
| 4,373,933 | 2/1983 | Grazen | 51/309 |
| 4,394,340 | 7/1983 | Tarumi et al. | 264/219 |
| 4,455,343 | 6/1984 | Temple | 428/285 |
| 4,525,177 | 6/1985 | Grimes et al. | 51/295 |
| 4,554,765 | 11/1985 | Grimes et al. | 51/401 |
| 4,588,419 | 5/1986 | Caul et al. | 51/295 |
| 4,609,581 | 9/1986 | Ott et al. | |
| 4,652,274 | 3/1987 | Boettcher et al. | 51/298 |
| 4,652,275 | 3/1987 | Bloecher et al. | 51/298 |
| 4,653,236 | 3/1987 | Grimes et al. | 51/401 |
| 4,681,558 | 7/1987 | Rausch | 474/205 |
| 4,734,104 | 3/1988 | Broberg | 51/295 |
| 4,736,549 | 4/1988 | Toillié | 51/399 |
| 4,744,802 | 5/1988 | Schwabel | 51/309 |
| 4,770,671 | 9/1988 | Monroe et al. | 51/293 |
| 4,799,939 | 1/1989 | Bloecher et al. | 51/293 |
| 4,867,760 | 9/1989 | Yarbrough | 51/298 |
| 4,881,951 | 11/1989 | Wood et al. | 51/309 |
| 4,894,280 | 1/1990 | Guthrie et al. | 428/224 |
| 4,903,440 | 2/1990 | Larson et al. | 51/298 |
| 4,906,523 | 3/1990 | Bilkadi et al. | 428/327 |
| 4,960,442 | 10/1990 | Wagner et al. | 51/298 |
| 5,011,508 | 4/1991 | Wald et al. | 51/293 |
| 5,078,753 | 1/1992 | Broberg et al. | 51/298 |
| 5,108,463 | 4/1992 | Buchanan | 51/295 |
| 5,109,638 | 5/1992 | Kime, Jr. | 51/401 |
| 5,137,542 | 8/1992 | Buchanan et al. | 51/295 |
| 5,203,884 | 4/1993 | Buchanan et al. | 51/295 |
| 5,219,505 | 6/1993 | Kaiser | 264/138 |
| 5,236,472 | 8/1993 | Kirk et al. | 51/298 |
| 5,316,812 | 5/1994 | Stout et al. | 428/64 |
| 5,341,609 | 8/1994 | Gorsuch et al. | 51/399 |
| 5,344,688 | 9/1994 | Peterson et al. | 428/102 |
| 5,420,015 | 5/1995 | Wuerch | 106/162 |
| 5,436,063 | 7/1995 | Follett et al. | 428/224 |
| 5,573,619 | 11/1996 | Benedict et al. | 156/137 |

FOREIGN PATENT DOCUMENTS

| | | |
|---|---|---|
| 321959 | 6/1989 | European Pat. Off. |
| 333909 | 9/1989 | European Pat. Off. |
| 340982 | 11/1989 | European Pat. Off. |
| 349466 | 1/1990 | European Pat. Off. |
| 451944 A2 | 10/1991 | European Pat. Off. |
| 533482 A1 | 3/1993 | European Pat. Off. |
| 626238 A1 | 11/1994 | European Pat. Off. |
| 2095185 | 2/1972 | France |
| 2250049 | 5/1975 | France |
| 2396625 | 2/1979 | France |
| 26 57 881 | 6/1978 | Germany |
| 1240289 | 7/1971 | United Kingdom |
| 1445520 | 8/1976 | United Kingdom |
| 1475986 | 6/1977 | United Kingdom |
| 1492789 | 11/1977 | United Kingdom |
| 2 232 636 A | 12/1990 | United Kingdom |
| 2240736 | 8/1991 | United Kingdom |
| 86/02306 | 4/1986 | WIPO |
| 93/02837 | 2/1993 | WIPO |
| 93/12911 | 7/1993 | WIPO |
| 93/24279 | 12/1993 | WIPO |
| 95/00294 | 1/1995 | WIPO |
| 95/11111 | 4/1995 | WIPO |
| 95/22434 | 8/1995 | WIPO |
| 95/22438 | 8/1995 | WIPO |

OTHER PUBLICATIONS

"Standard Test Methods for Impact Resistance of Plastics and Electrical Insulating Materials", ASTM Designation: D256–84, 81–102 (Sep. 1984).

"Standard Test Methods for Impact Resistance of Rigid Plastic Sheeting or Parts by Means of a TUP (Falling Weight)", ASTM Designation: D3029–84, 749–764 (Sep. 1984).

"Standard Test Methods for Flexural Properties of Unreinforced and Reinforced Plastics and Electrical Insulating Materials", ASTM Designation: D790–86, 384–397 (1986) (no month).

B.F. Goodrich Specialty Polymers & Chemicals Division, "Product Data HYCAR Reactive Liquid Polymers" Brochure dated Apr. 1991 (5 pages).

Henkel Polymers Division, "Epoxy Curing Agents Product Data Sheet for Genamid 747", Identified as P–182 (undated) (2 pages).

"Material Safety Data Sheet—Polytetramethyleneoxide-di--p-aminobenzoate", Polaroid Corporation, No. RCC–209 R–2, 4 pgs (Jan. 1984).

*ME*, Nov. 1990 pp. 30 and 1 unnumbered.

"NeoRez and NeoPac Water-borne Urethanes for Coatings Applications", ICI Resins US, 3 pgs (undated).

"Product Information—Blendur P 120M", Mobay Corporation, 3 pgs (undated).

Product Information from Air Products & Chemicals, Inc. regarding Durathane™, 1 pg (Jan. 3, 1994).

Shell, "Material Safety Data Sheet", 1 pg (Jun. 13, 1995).

*The Nonwoven Handbook*; B.M. Lichstein., Ed.; Association of the Nonwoven Fabrics Industry: New York (1988)—Title page, copyright page, and table of contents only (no month).

"Witcobond® W–290H, Wicobond W–293", Witco Corporation, Organics Division, Bulletin 345, 4 pgs (Apr. 1986).

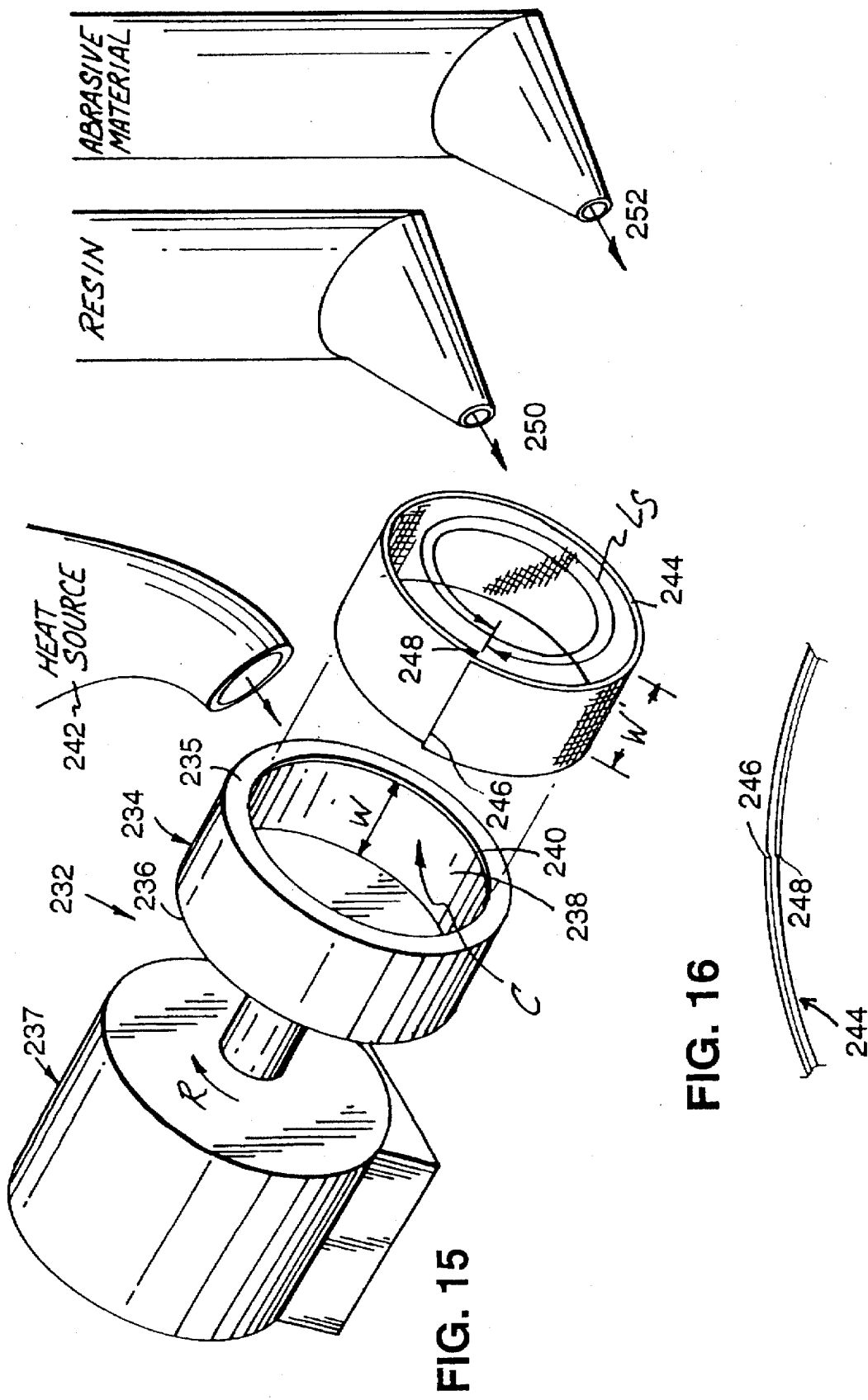

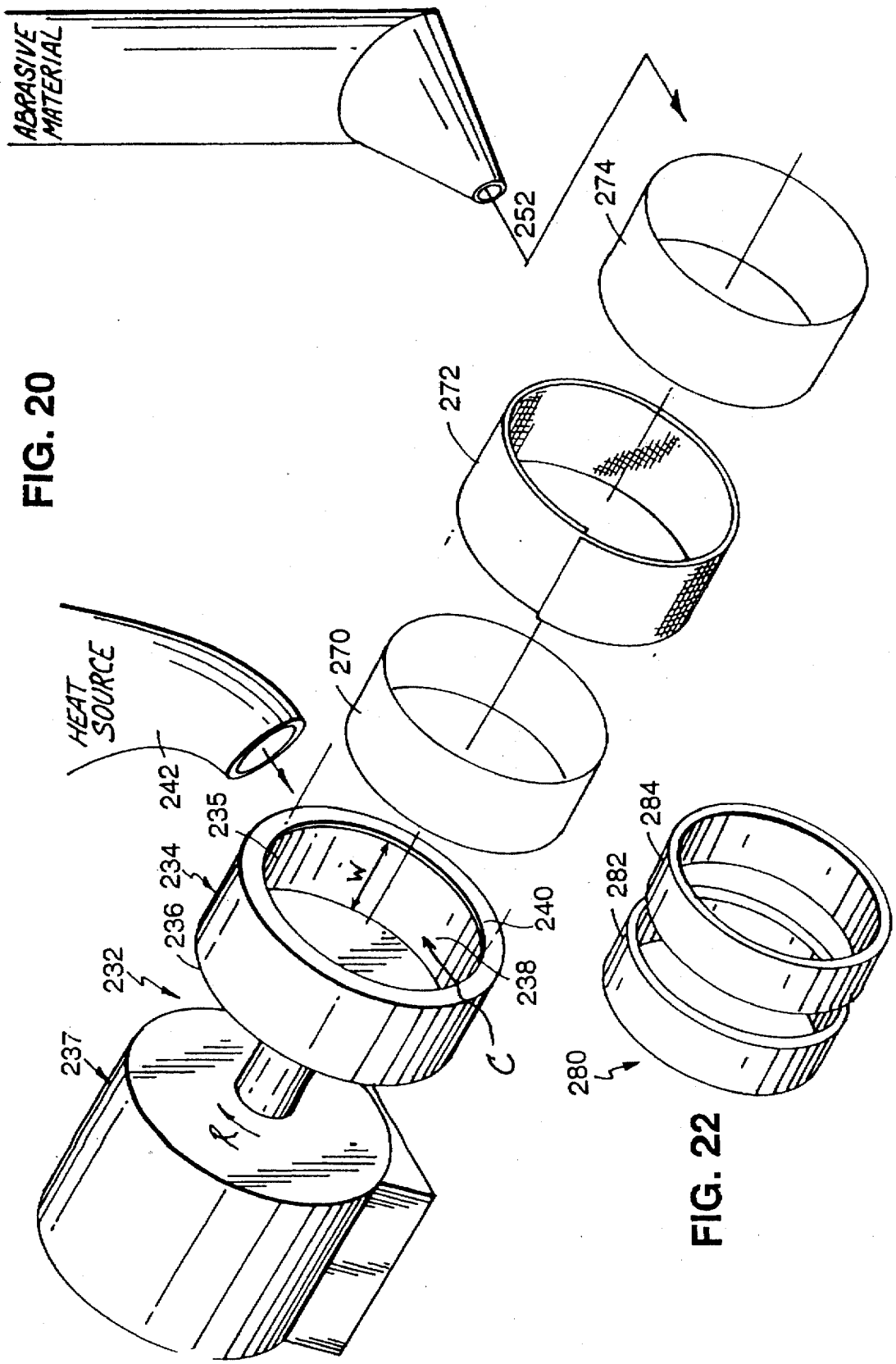

COATED ABRASIVES AND METHODS OF PREPARATION

CROSS-REFERENCE TO RELATED APPLICATIONS

This application is a continuation-in-part of U.S. patent application Ser. No. 08/242,295, filed May 13, 1994, now abandoned, which is a continuation-in-part of U.S. patent application Ser. No. 08/079,364, filed Jun. 17, 1993, now abandoned, and a continuation-in-part of U.S. patent application Ser. No. 08/443,322, filed May 17, 1995, now abandoned, which is a divisional of U.S. patent application Ser. No. 08/199,679, now abandoned filed Feb. 22, 1994, now abandoned all of which are incorporated herein by reference.

FIELD OF THE INVENTION

The present invention relates to coated abrasive articles, and particularly to coated abrasive articles comprising abrasive particles (also known as abrasive grains) adhered to an organic polymeric binder, the binder having a fibrous reinforcing material therein. The present invention also relates to methods of making abrasive articles, and more specifically, to methods for preparing a flexible, endless, seamless substrate containing an organic binder material and a fibrous material embedded therein. Additionally, this invention relates to methods of preparing flexible, endless, seamless coated abrasive belts.

BACKGROUND OF THE INVENTION

Coated abrasive articles generally contain an abrasive material, typically in the form of abrasive particles, bonded to a previously made backing by means of one or more adhesive layers. The adhesive layers and abrasive particles are conventionally applied to the backing in separate step(s) after the backing has been formed. Such articles usually take the form of sheets, discs, belts, bands, and the like, which can be adapted to be mounted on pulleys, wheels, or drums. Abrasive articles can be used for sanding, grinding or polishing various surfaces of, for example, steel and other metals, wood, wood-like laminates, plastic, fiberglass, leather, or ceramics.

The backings or substrates used in coated abrasive articles are typically made of paper, polymeric materials, cloth, non-woven materials, vulcanized rubber, or combinations of these materials. Many of these materials provide unacceptable backings for certain applications because they are not of sufficient strength, flexibility, or impact-resistance. In addition, some of these materials age too rapidly which is unacceptable. Furthermore, some of the materials are sensitive to liquids that are used as coolants and cutting fluids. Accordingly, early failure and poor functioning can occur in certain applications.

In a typical manufacturing process, a coated abrasive article is made by feeding a preformed backing in a continuous web form through a series of coating and curing steps wherein binder layers and abrasive particles are applied. The coated web is then converted into a desired construction, such as a sheet, disc, belt or the like. One of the most useful constructions of a coated abrasive article is an endless coated abrasive belt, i.e., a continuous loop of coated abrasive material. In order to form such an endless belt, the web form is typically cut into an elongate strip of a desired width and length. The ends of the elongate strip are then joined together to create a "joint" or a "splice".

Two types of splices are common in endless abrasive belts. These are the "lap" splice and the "butt" splice. For the lap splice, the ends of the elongate strip are doubled such that the top surface with the abrasive coating and the bottom surface of the backing fit together without a significant change in the overall thickness of the belt. This is typically done by removing abrasive particles from the abrasive surface of the strip at one of the ends, and by removing part of the material from the backing of the elongate strip at the other end. The doubled ends are then overlapped and joined adhesively. For the butt splice, the bottom surface of the backing at each end of the elongate strip is coated with an adhesive end overlaid with a strong, thin, tear-resistant, splicing media. Each end for either of these splices may be cut straight or have mating curves of various configurations. Although endless coated abrasive belts containing a splice in the backing are widely used in industry today, these products suffer from some disadvantages which can be attributed to the splice.

For example, the splice is generally thicker than the rest of the coated abrasive belt, even though the methods of splicing generally used involve attempts to minimize this variation in the thickness along the length of the belt. This can lead to a region on the workpiece with a "coarser" surface finish than the remainder of the workpiece, which is highly undesirable, especially in high precision grinding applications. For example, wood with areas having a coarser surface finish will stain darker than the remainder of the wood. Also, the splice can be the weakest area or link in the coated abrasive belt. In extreme cases the splice may break prematurely before full utilization of the coated abrasive belt, which leads not only to waste, but potential hazard. Belts have therefore often been made with laminated liners or backings to give added strength and support. Such belts can be relatively expensive and, under certain conditions, can be subject to separation of the laminated layers.

In addition, abrading machines that utilize a coated abrasive belt can have difficulty properly tracking and aligning the belt because the splice creates a discontinuity in the coated abrasive belt. Furthermore, the spliced area can be undesirably more stiff than the remainder of the belt, and belts including a splice may put undesirable "chatter" marks on the workpiece. Finally, the splice in the belt backing adds considerable expense in the manufacturing process of coated abrasive belts.

Prior references have shown methods for producing endless, seamless abrasive belts. For example, Ball (U.S. Pat. No. 2,404,207) discloses belts produced by a method that utilizes a carrier belt that is rotated around support rolls. A comb removes a carded membrane from a stripper roll to thereby deposit the carded membrane upon the rotating carrier belt. Accordingly, layers of carded membrane are incrementally deposited around a peripheral surface of the carrier belt as the carrier belt is rotated around the support rolls. The carded membrane can be comprised of fibrous materials such that layers of fibrous materials form a web about the carrier belt. A pressure roll is used to compact the web and impregnate the web with an adhesive binder material. Abrasive particles can also be distributed upon the carrier belt through two different control hoppers.

A variation of a butt splice is presented in Dyer (U.S. Pat. No. 4,018,574). Dyer discloses a process for manufacturing an endless coated abrasive article. The process involves inserting a strip of coated abrasive material inside an open-ended cylindrical mold with the abrasive coated surface adjacent to and in contact with an inner peripheral surface of the mold. The strip of coated abrasive material is cut in a shape such that longitudinal edges of the abrasive material abut to form a helical butt joint. A resin composition including a suitable reinforcing material is introduced to the mold after the mold is set in rotation. The rotation of the mold creates centrifugal force which causes the resinous mixture to flow outwardly to thereby distribute the resinous composition uniformly upon the back of the abrasive material. The resin material is then cured to form a layer on the inner periphery of the finished coated abrasive belt. The process results in an endless coated abrasive article that has a helical-shaped seam or splice extending throughout the abrasive material.

PCT International Publication No. WO 93/12911, published 8 Jul. 1993, discloses fiber reinforced polymeric backings and coated abrasives employing same. In producing the backing, the fibers are engulfed by a polymer and the polymer is then solidified or cured, depending on the polymer's chemistry. Abrasive particles are then adhered to the backing by a subsequent resin coating applied to the backing (sometimes referred to as a "make" coating), typically a resole phenolic resin. The abrasive articles and methods of making same described in WO 93/12911 thus require a separate make coating step. Further, the procedures for making the fiber reinforced backings are essentially batch procedures.

It would be advantageous if fiber reinforced coated abrasive articles could be made by eliminating the step of applying a separate make coating to a preformed backing, and if the process of making a coated abrasive having a fiber reinforced backing could be either a batch process or a continuous web process. This could result in significant cost savings.

SUMMARY OF THE INVENTION

The present invention provides methods for preparing backings for abrasive materials, particularly substrates such as flexible, endless, seamless substrates useful as backings for abrasive materials. Additionally, the present invention provides methods of preparing abrasive articles, particularly flexible, endless, seamless abrasive belts, incorporating the backings of the invention. Also, the present invention provides fiber reinforced coated abrasive articles which may be either endless seamless belts, endless seamed belts, discs, sheets, daisies, and the like, depending on the process used to make them. The articles of the present invention are advantageous because they are typically very flexible, they display reduced shelling in certain circumstances, and they can be cheaper. Furthermore, coated abrasive articles of the invention which are endless, seamless belts do not exhibit many of the disadvantages associated with coated abrasive belts made from preformed backing loops containing a splice.

By the phrase "endless, seamless", it is meant that the substrate, i.e., backing loops or articles, are continuous in structure throughout their length. That is, they are free from undesirable thickened areas resulting from distinct splices or joints. This does not preclude, however, the possibility of splices and or complete gaps in a fibrous layer embedded within the substrate, or that there are no splices in an abrasive layer. Rather, it means that there are no undesirably thickened areas resulting from such splices or joints in the substrate. Accordingly, the flexible, endless, seamless substrate, as well as the flexible, endless, seamless abrasive belts, do not exhibit many of the above discussed disadvantages associated with coated abrasive belts made from backing loops containing a splice. Furthermore, unlike previous methods, the methods herein produce a substrate or an abrasive article, preferably a belt, that has a substantially uniform thickness or caliper throughout (i.e., along the entire article).

The term "flexible" means that the backings and abrasive articles incorporating same are able to be used (for extended periods of time without substantial stretching) as endless abrasives belts in grinding machines. Although the backings (sometimes referred to herein as "substrates") of the invention are flexible, since they are comprised of the fibrous material, the fibrous material increases the tensile strength of the backings and articles so that the backings and articles do not substantially elongate and/or stretch after or during use.

The backings (i.e., substrates) of the present invention primarily contain an organic binder material and an effective amount of a fibrous material. The phrase "effective amount" of fibrous material refers to an amount sufficient to give the desired physical characteristics of the substrate such as reduction in stretching or splitting during use. The binder is typically present in the backing in a sufficient amount to form the surfaces of the substrate. The backing may have some porosity between the surfaces as long as the tensile strength and other mechanical properties are not deleteriously effected. Thus, the substrate has a layer of fibrous material embedded or engulfed within the organic binder material, such that there are regions of organic binder material free of fibrous material on opposite surfaces of the layer of fibrous material. Accordingly, the surfaces of the substrate have a generally smooth, uniform surface topology that preferably seal in the fibrous material. Furthermore, by sealing the fibrous material, a subsequently applied make coating will not penetrate into the backing (i.e., substrate). Make coatings may contain agents that are deleterious to the backing binder and/or fibrous material, and may cause the backing to undesirably deteriorate or permanently stretch (it being understood that some non-permanent stretching may occur or even be desirable). Sealing the fibrous material within the binder helps prevent such deterioration or stretching.

Herein, the term "embedded" means that the reinforcing material is essentially completely encapsulated or engulfed within the organic binder material, so that there may be a very minor percentage of fibers present at the outer surface of the backing. In applications of the present invention, it is preferred that the organic polymeric binder material is present in a sufficient amount to fully surround the fibrous reinforcing material that is present in at least one generally distinct layer across the width, and along the entire length, of the backing loop. In this way, there is generally no fibrous reinforcing material exposed (i.e., there are regions of organic polymeric binder material generally without fibrous reinforcing material therein above and below the layer of reinforcing material).

One method for preparing a flexible, endless, seamless substrate comprises inserting a fibrous material adjacent an interior surface of a drum. A composition comprising an organic binder precursor is then provided in the drum, preferably substantially adjacent the fibrous material. A "binder precursor" is a material (e.g., a polymer precursor) that is either in a flowable state or capable of flowing (i.e., the term refers to a material that is flowable or flowing at ambient or elevated temperatures and pressures), whereas the term "binder" refers to a "solid" or "solidified" binder precursor material (e.g., a cured solid polymer) that does not readily flow under ambient temperatures and pressures. The terms "sold" and "solidified" are meant to include a thixotropic gel. Accordingly, the drum is rotated to create centrifugal forces to thereby distribute the composition uniformly about the fibrous material. The composition is then exposed to conditions sufficient to solidify the organic binder precursor to form a binder such that a flexible, endless, seamless substrate is formed having an outer surface formed adjacent the interior surface of the drum, an inner surface opposite the outer surface, and the fibrous material embedded within the organic binder.

Specifically, the present invention provides a method for preparing a flexible, endless, seamless substrate suitable for use as a backing for a coated abrasive article, the method comprising:

(a) inserting a fibrous material into a drum so that a major surface of said material is adjacent an interior surface of the drum, the interior surface defining a substrate width and a substrate length;

(b) placing a composition comprising an organic binder precursor material within the drum, said composition capable of solidifying to form a flexible binder;

(c) rotating the drum to evenly distribute the composition about the fibrous material and about the interior surface of the drum; and (d) solidifying the composition to form a flexible binder such that a flexible, endless, seamless substrate is formed having an outer surface adjacent the interior surface of the drum, an inner surface opposite the outer surface and the fibrous material embedded in the binder.

As stated above, the present invention provides coated abrasive articles other than belts. Accordingly, the coated abrasive articles comprise:

(a) a member having first and second major surfaces and a middle portion extending between said major surfaces, said middle portion comprising an effective amount of a fibrous reinforcing material substantially engulfed in a single organic polymeric binder, the binder defining a region adjacent said first major surface substantially free of the fibrous reinforcing material;

(b) a plurality of abrasive particles embedded in and protruding from said binder on said first major surface; and (c) an optional size coating overlying the abrasive particles and binder of said first major surface.

These coated abrasive articles include a single organic polymeric binder for forming the backing and holding the abrasive particles. That is, they are essentially free of a make coating that is separate and distinct from the binder of the backing. These articles can be made by a number of methods.

One such method of making a coated abrasive comprises:

(a) applying a fibrous reinforcing material to a support structure and either simultaneously or sequentially applying a sufficient amount of an organic polymeric binder precursor to the reinforcing material such that the binder precursor engulfs the fibrous reinforcing material and further provides a region of binder substantially free of the reinforcing material;

(b) applying a plurality of abrasive particles to the region of binder precursor substantially free of the reinforcing material; and (c) exposing the construction resulting from step (b) to conditions sufficient to solidify the binder precursor thereby forming a binder, wherein a majority of the abrasive particles protrude out of the binder.

BRIEF DESCRIPTION OF THE DRAWINGS

FIG. 15 is perspective view of one method of the invention and the equipment used therein;

FIG. 16 is a detailed view of a portion of a fibrous mat used in the inventive method;

FIG. 20 is a perspective view of another alternative method and the equipment used therein;

FIG. 22 is a perspective view of a substrate that has been longitudinally cut to form a plurality of substrates.

DETAILED DESCRIPTION

Figure 1:
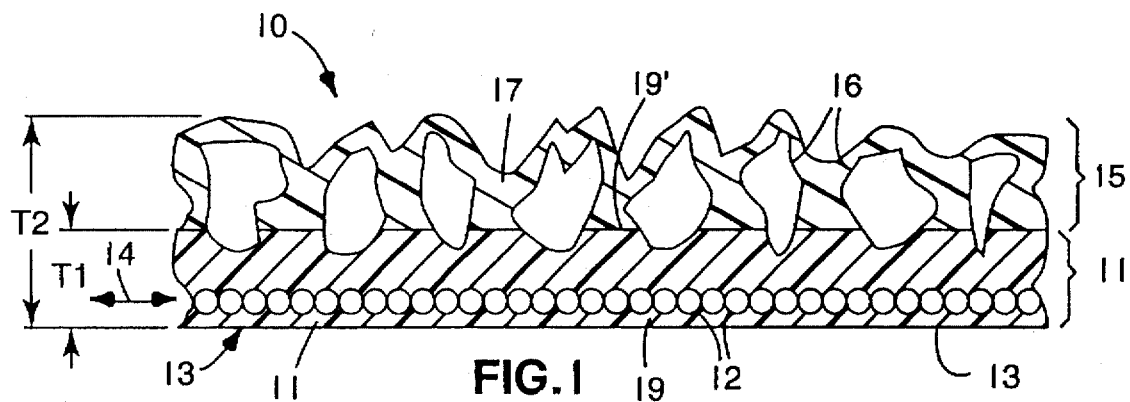
FIG. 1 is an enlarged fragmentary cross-sectional view of a first coated abrasive embodiment according to the present invention.
Figure 2:
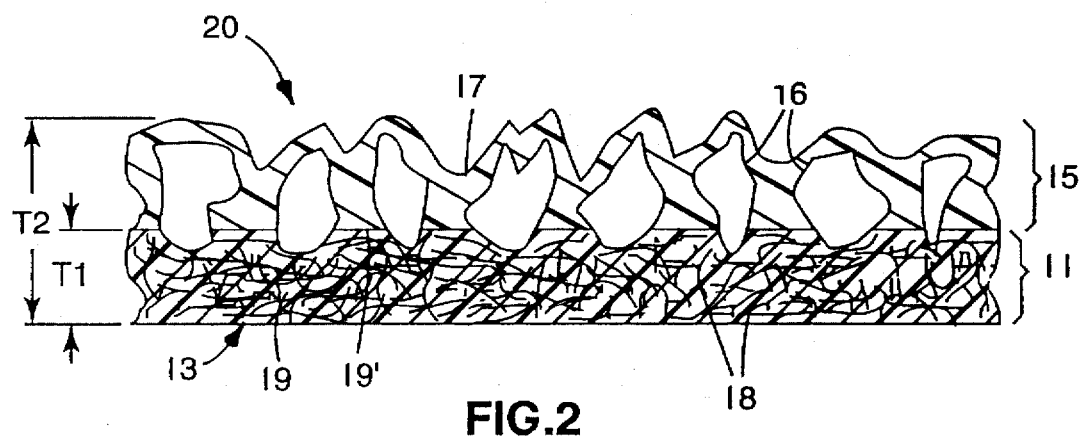
FIG. 2 is an enlarged fragmentary cross-sectional view of a second coated abrasive embodiment according to the present invention.

Two embodiments of coated abrasive articles of the invention are illustrated in enlarged cross-section in FIGS. 1 and 2. Preferred articles of the invention are flexible, endless, seamless abrasive belts. It should be understood that FIGS. 1 and 2 are not drawn to scale and that thickness T1 of substrate 11 (also referred to herein as member 11 or backing 11) and thickness T2 of abrasive articles 10 and 20 have been greatly exaggerated for purposes of clarity.

Referring to FIG. 1, coated abrasive article embodiment 10 comprises a member 11 comprised of fibrous material, such as fibers, 12 and organic binder material 13 (also referred to herein as binder 13). In certain articles of this invention there is no separate and distinct make coating since binder 13 serves two purposes: to engulf fibers 12 of the fibrous reinforcement, and to present sufficient binder to adhere abrasive particles to member 11. Reinforcing fibers 12 lie substantially in a first plane 14. Binder 13 substantially engulfs reinforcing fibers 12 such that fibers 12 are embedded within binder 13. That is, binder 13 surrounds the fibers, although it is conceivable that fibers 12 could be separated so as to have substantial penetration of binder 13 between fibers.

Substrate 11 has an inner surface 19 and an outer surface 19' that are substantially smooth. The term "smooth" means that the fibers of the fibrous material generally do not protrude from the backing (i.e., substrate 11), but are substantially completely engulfed therein, thereby forming a substantially flat surface. Additionally, the outer and inner surfaces are generally sealed, i.e., water cannot penetrate through the backing.

Over binder 13 is an abrasive surface coating 15 (also referred to herein as an abrasive layer 15) comprised of abrasive particles 16 (also referred to herein as abrasive particles 16) and size coating binder 17. Abrasive particles 16 are partially embedded in binder 13, but lie mostly in and form abrasive surface coating 15. In other words, abrasive layer 15 is formed by abrasive particles 16 embedded and disposed on the outer surface of organic binder material 13.

Referring to FIG. 2, this figure illustrates coated abrasive article embodiment 20. FIG. 2 is a cross-section (enlarged) of a second coated abrasive article of the invention, in which member 11 comprises a plurality of randomly laid fibers 18 and binder 13. Abrasive surface coating 15 is substantially the same as in FIG. 1.

Coated Abrasive Properties

The coated abrasive articles of the present invention generally have the following properties. The articles are sufficiently heat resistant under grinding conditions for which the abrasive article is intended to be used such that it does not significantly disintegrate, i.e., split, break, delaminate, tear, or a combination of these, as a result of the heat generated during a grinding, sanding, or polishing operation. The articles are also sufficiently tough such that they will not significantly crack or sharer from the forces encountered under grinding conditions for which the abrasive article is intended to be used. That is, it is sufficiently stiff to withstand typical grinding conditions encountered by coated abrasive belts, but not undesirably brittle.

Preferred articles of the present invention are sufficiently flexible to withstand grinding conditions. By "sufficient flexibility" and variants thereof in this context, it is meant that articles of the invention are formulated to be capable of conforming to the work piece being abraded. For example, a continuous "flexible" article is one that is sufficiently flexible to be used on one (or more) roller amounts or a two (or more) pulley amounts in a grinder. Furthermore, for preferred grinding applications, the articles are capable of flexing and adapting to the contour of the workpiece being abraded, yet sufficiently strong to transmit an effective grinding force when pressed against the workpiece. Also, the substrate should bend and return to its original shape without significant permanent deformation.

Preferred coated abrasive articles of the present invention possess a generally uniform tensile strength in the longitudinal, i.e., machine direction. More preferably, the tensile strength for any portion of an article of the invention tested does not vary by more than about 20% from that of any other portion of the article. Tensile strength is generally a measure of the maximum stress a material subjected to a stretching load can withstand without tearing.

Preferred articles of the present invention also exhibit appropriate shape control and are sufficiently insensitive to environmental conditions, such as humidity and temperature. By this it is meant that preferred coated abrasives of the present invention possess the above-listed properties under a wide range of environmental conditions. Preferably, they possess the above-listed properties within a temperature range of about 10°–30° C., and a humidity range of about 30–50% relative humidity (RH). More preferably, they possess the above-listed properties under a wide range of temperatures, i.e., from below 0° C. to above 100° C., and a wide range of humidity values, from below 10% RH to above 90% RH.

The preferred organic polymeric binder material used in coated abrasives of the present invention is generally chosen such that there will be compatibility with, and good adhesion to, any subsequently applied adhesive layers, particularly to the size coat. Good adhesion is determined by the amount of shelling of the abrasive material. Although the choice of organic polymeric material is important, the amount of shelling typically depends to a greater extent on the choice of subsequently applied adhesive and the compatibility of the organic polymeric binder and adhesive layers.

In preferred articles of the present invention, the organic polymeric binder material is present in a sufficient amount to substantially engulf the fibrous reinforcing material that is present in at least one generally distinct layer across the width, and along the entire length, of the articles. In this way, there is no fibrous reinforcing material exposed, i.e., there are regions of organic polymeric binder material devoid of fibrous reinforcing material. Embodiments also considered within the scope in the invention are those articles wherein there exist spaces between reinforcing fibers filled with organic polymeric binder and any optional additives. Embodiments wherein the fibers are adjacent (i.e., no organic polymeric binder therebetween) are also within the invention. There may be regions devoid of fibers and binder within the plane comprised of reinforcing fibers and binder, such as open pores, or filler regions.

In preferred articles of the present invention, the organic polymeric binder (which engulfs or is distributed throughout the fibrous reinforcement) is present in a sufficient amount to generally seal the surfaces of the article, although the article may have some porosity between the sealed surfaces as long as the tensile strength and other mechanical properties are not deleteriously effected. As used herein the term "seal" means that a liquid, such as water, cannot penetrate into the coated abrasives of the invention through the back side (non-abrasive side) and out of the abrasive side of the article. Further, there must be sufficient organic polymeric binder to adhere the abrasive particles to the reinforcing yarns. Further, the amount of binder in the member is sufficient to form a layer or reservoir sufficient to accept and hold a plurality of abrasive particles on substantially one plane of the abrasive article. In other words, abrasive particles are not present throughout the member, but only on one surface thereof.

The abrasive particles are preferably present as a substantially continuous layer, although it is within the invention to coat the abrasive particles in a pattern, i.e., forming areas devoid of abrasive particles. In the case where electrostatic coating is used, for example, a screen may be placed between the surface on which the abrasive articles lie and the binder precursor. Other methods will be apparent to those skilled in the art.

An advantage of endless belt articles of the present invention that do not have a make coat over conventional coated abrasive belts is the reduced tendency for edge shelling on small width belts. Shelling is the term used to describe the premature release of abrasive particles. Shelling is generally undesirable because it reduces the useful life of the coated abrasive. The problem is particularly troublesome in belts that have widths of one inch or less, as the edges of these belts will sometime shell to a greater extent than wider belts. The present invention reduces this tendency because the belt edges are very flexible and conformable. This flexibility is attributed to the make coating engulfing the reinforcing fibers and serving to bond the abrasive particles to the reinforcing fibers.

The length of the inventive coated abrasive endless belts can be any desired length. Typically, it is about 40–1500 centimeters (cm). The thickness of coated abrasive articles preferably does not vary by more than about 15% (more preferably, by more than about 10%, and most preferably, by more than about 5%) from location to location (i.e., throughout the length and width of the substrate). That is, member 11 (FIGS. 1 and 2) has a substantially uniform thickness T1 throughout.

Fibrous Reinforcement Binder

The abrasive articles of the present invention contain a fibrous reinforcing material engulfed by a binder 13 (see FIGS. 1 and 2) which also functions as would a traditional "make" coating. The binder material is an organic polymeric binder material. It can be a cured or solidified thermosetting resin, thermoplastic material, elastomeric material, or combination thereof. Preferably, the organic polymeric binder material is a cured or solidified thermosetting resin or thermoplastic material. More preferably, the organic polymeric binder material is a thermosetting resin, at least because such resins can be provided in a very fluid (low viscosity) flowable form when uncured, even under ambient conditions. Herein, the phrase "ambient conditions" and variants thereof refer to room temperature, i.e., 15°–30° C., generally about 20°–25° C., and 30–50% relative humidity, generally about 35–45% relative humidity. In some instances, the use of a combination of a thermosetting material and an elastomeric material is preferred.

Typically, the amount of binder material in the backing is within a range of about 40–99 wt %, preferably within a range of about 50–95 wt-%, more preferably within a range of about 65–92 wt-%, and most preferably within a range of about 70–85 wt-%, of the total weight of the backing. The backing is also referred to herein as the substrate or planar member.

Figure 7:
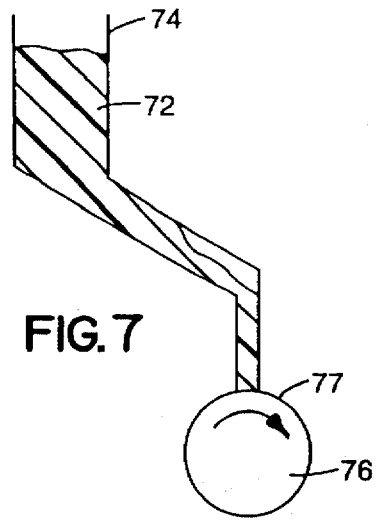
FIG. 7 is a side view of an apparatus for applying the binder precursor to a drum.
Figure 8:
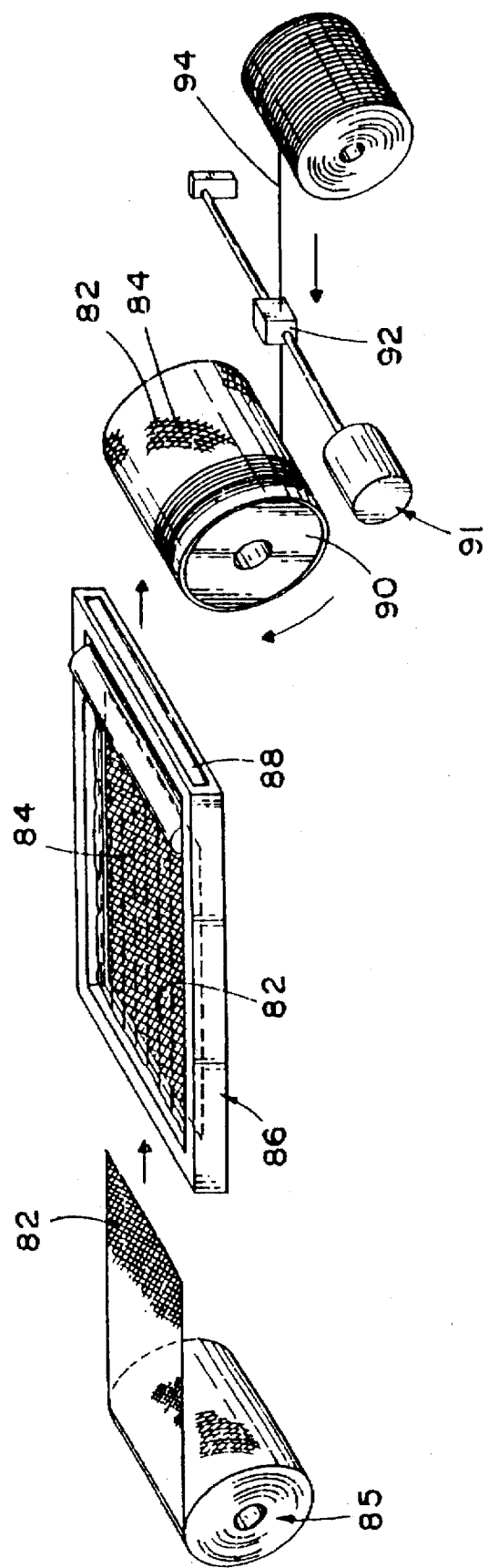
FIG. 8 is a schematic of a preferred process of the present invention for applying a thermosetting binder precursor to a fibrous reinforcing mat structure and a layer of a continuous fibrous reinforcing strand such that they are both engulfed within the thermosetting resin.
Figure 9:
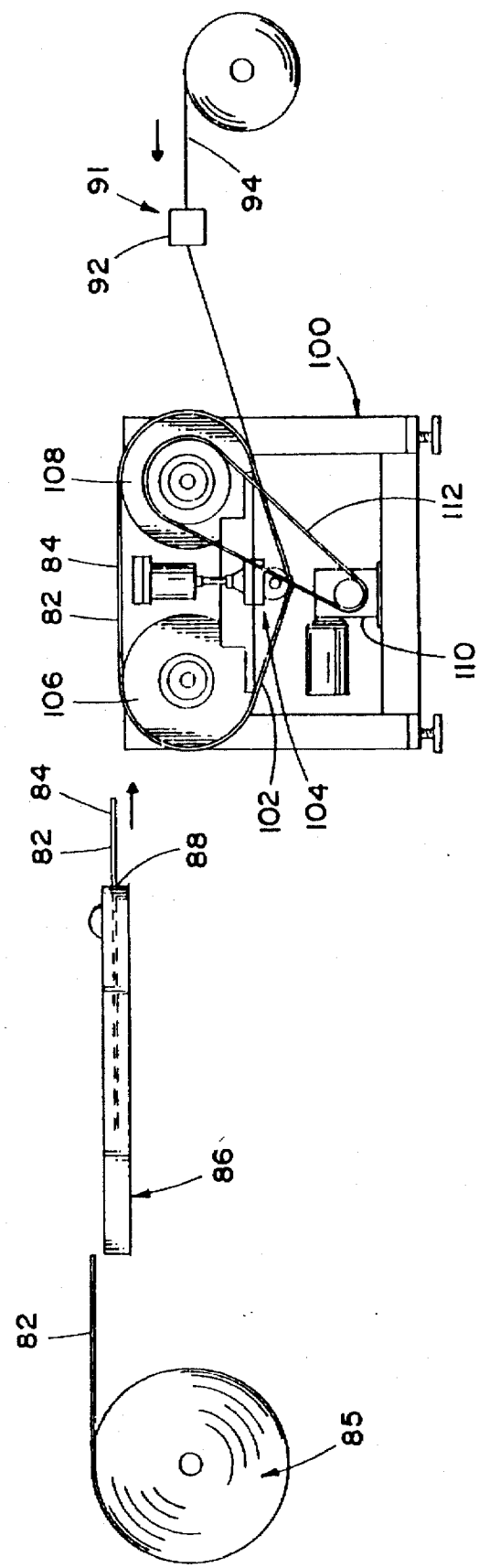
FIG. 9 is a schematic of an alternative of the process depicted in FIG. 8.

If the organic polymeric binder material 13 includes a cured thermosetting resin, prior to the manufacture of the inventive articles the thermosetting resin is in a nonpolymerized or only partially polymerized state, typically in a liquid or semi-liquid or gel state. The procedures articulated in FIGS. 7–9 are preferably employed when using thermosetting resins.

Examples of thermosetting resins from which binder 13 can be prepared include phenolic resins, amino resins, polyester resins, aminoplast resins, urethane resins, melamine-formaldehyde resins, epoxy resins, acrylated isocyanurate resins, urea-formaldehyde resins, isocyanurate resins, acrylated urethane resins, acrylated epoxy resins or mixtures thereof. The preferred thermosetting resins are epoxy resins, urethane resins, polyester resins, or flexible phenolic resins. The most preferred resins are epoxy resins and urethane resins, at least because they exhibit an acceptable cure rate, flexibility, good thermal stability, strength, and water resistance. Furthermore, in the uncured state, typical epoxy resins have low viscosity, even at high percent solids. Also, there are many suitable urethanes available at high percent solids.

One preferred class of binder is the class of polyurethane elastomers. Examples of such polyurethane materials are commercially available from Uniroyal Chemical under the trade designation "Vibrathane". These polyurethane elastomers are formed from prepolymers that can be a polyether based upon toluene diisocyanate terminated prepolymer or a polyether based upon diphenylmethane diisocyanate. These prepolymers can be crosslinked with 4,4"-methylene-bis (ortho-chloroaniline) or a diamine curative. The polyurethane binders are also preferred, because during thermal curing the polyurethane resins do not appreciably reduce their viscosity and thus do not appreciably flow during curing. It is also within the scope of this invention to blend polyurethane resins with epoxy resins.

Epoxy resins useful in the polymerizable mixture used to prepare the articles of this invention include monomeric or polymeric epoxides. Useful epoxy materials, i.e., epoxides, can vary greatly in the nature of their backbones and substituent groups. Representative examples of acceptable substituent groups include halogens, ester groups, ether groups, sulfonate groups, siloxane groups, nitro groups, or phosphate groups. The weight average molecular weight of the epoxy-containing polymeric materials can vary from about 60 to about 4000, and are preferably within a range of about 100 to about 600. Mixtures of various epoxy-containing materials can be used in the compositions of this invention. Examples of commercially available epoxy resins include "Epon" from Shell Chemical, Houston, Tex. and "DER" from Dow Chemical Company, Midland, Mich.

Epoxy-functional resins preferably comprise materials selected from the group consisting of diepoxy-functional materials within the general formula

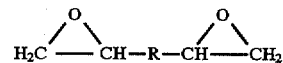

wherein R may be any organic radical with the proviso that the organic radical does not hinder the ability of the material to be emulsified. Preferred are those diepoxy-functional materials wherein R is selected from the group consisting of

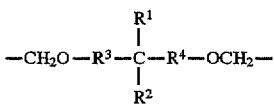

wherein $R^1$ and $R^2$ are independently selected from the group consisting of alkyl groups having from 1 to about 10 carbon atoms, and $R^3$ and $R^4$ are independently selected from the group consisting of aryl and alkaryl radicals having from 6 to about 20 carbon atoms. In the latter materials, it is to be understood that $R^3$ and $R^4$, if aryl, may be alkyl-substituted. An example of a useful epoxy-functional material of this type is the aqueous dispersion known under the trade designation "EPI-REZ CMD-35201", commercially available from Shell Chemicals, Inc., Houston, Tex., wherein $R^1$ and $R^2$ are methyl, and $R^3$ and $R^4$ are unsubstituted phenyl moieties.

Another class of epoxy-functional materials suitable for use in producing the inventive binders are those wherein the epoxy-functional material comprises a novolac-type epoxy resin within the general formula

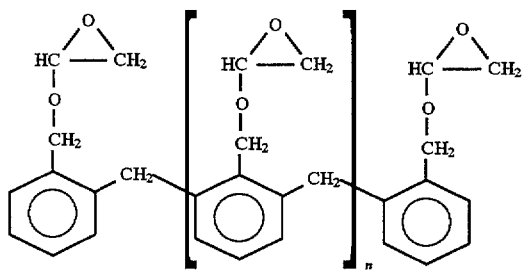

wherein n may range from 1 to about 10. A novolac-type epoxy resin water emulsion is available from Ciba-Geigy Corporation, Hawthorne, N.Y. under the trade designation "MS 9772".

Phenolic resins are usually categorized as resole or novolac phenolic resins. Examples of useful commercially available phenolic resins are "Varcum" from BTL Specialty Resins Corporation, Blue Island, Ill.; "Arofene" from Ashland Chemical Company, Columbus, Ohio; "Bakelite" from Union Carbide, Danbury, Conn.; and "Resinox" from Monsanto Chemical Company, St. Louis, Mo.

Resole phenolic resins are characterized by being alkaline catalyzed and having a molar ratio of formaldehyde to phenol of greater than or equal to 1:1. Typically, the ratio of formaldehyde to phenol is within a range of about 1:1 to about 3:1. Examples of alkaline catalysts useable to prepare resole phenolic resins include sodium hydroxide, potassium hydroxide, organic amines, or sodium carbonate.

Novolac phenolic resins are characterized by being acid catalyzed and having a molar ratio of formaldehyde to phenol of less than 1:1. Typically, the ratio of formaldehyde to phenol is within a range of about 0.4:1 to about 0.9:1. Examples of the acid catalysts used to prepare novolac phenolic resins include sulfuric, hydrochloric, phosphoric, oxalic, or p-toluenesulfonic acids. Although novolac phenolic resins are typically considered to be thermoplastic resins rather than thermosetting resins, they can react with other chemicals (e.g., hexamethylenetetraamine) to form a cured thermosetting resin.

Examples of commercially available urea-formaldehyde resins include "Uformite" from Reichhold Chemical, Inc., Durham, N.C.; "Durite" from Borden Chemical Co., Columbus, Ohio; and "Resimene" from Monsanto, St. Louis, Mo. Examples of commercially available melamine-formaldehyde resins include "Uformite" from Reichhold Chemical, Inc., Durham, N.C.; and "Resimene" from Monsanto, St. Louis, Mo. "Resimene" is used to refer to both urea-formaldehyde and melamine-formaldehyde resins.

Examples of aminoplast resins useful in applications according to the present invention are those having at least one pendant α,β-unsaturated carbonyl group per molecule, which are, for example, as disclosed in U.S. Pat. No. 4,903,440 and 5,236,472, which are incorporated herein by reference.

Useable acrylated isocyanurate resins are those prepared from a mixture of: at least one monomer selected from the group consisting of isocyanurate derivatives having at least one terminal or pendant acrylate group and isocyanate derivatives having at least one terminal or pendant acrylate group; and at least one aliphatic or cycloaliphatic monomer having at least one terminal or pendant acrylate group. These acrylated isocyanurate resins are described, for example, in U.S. Pat. No. 4,652,274, which is incorporated herein by reference.

Acrylated urethanes are diacrylate esters of hydroxy terminated-NCO-extended polyesters or polyethers. Examples of commercially available acrylated urethanes useful in applications of the present invention include those having the trade names "Uvithane 782," available from Morton Thiokol Chemical, Chicago, Ill., "Ebecryl 6600," "Ebecryl 8400," and "Ebecryl 88-5," available from Radcure Specialties, Atlanta, Ga.

The acrylated epoxies are diacrylate esters, such as the diacrylate esters of bisphenol A epoxy resin. Examples of commercially available acrylated epoxies include those having the trade names "Ebecryl 3500," "Ebecryl 3600," and "Ebecryl 8805," available from Radcure Specialties, Atlanta, Ga.

Suitable thermosetting polyester resins are those known under the trade designations "E-737" and "E-650" from Owens-Corning Fiberglass Corp., Toledo, Ohio.

Suitable polyurethanes are available as "Vibrathane B-813 prepolymer" or "Adiprene BL-16 prepolymer" used with "Caytur-31" curative. The polyurethane known under the trade designation "Adiprene BL-16" is a ketoxime-blocked poly-1,4-butylene glycol diisocyanate having a molecular weight of about 1500. All are available from Uniroyal Chemical, Middlebury, Conn. Preferred polyurethane resins are high percent solids resins, including those based on aliphatic polyethers, such as the aqueous polyurethane emulsion commercially available from Imperial Chemical Industries under the trade designation "Neorez R-966", which has a weight percent solids of 33%. Other preferred polyurethanes are the aqueous dispersions of polyurethane particles that are commercially available from Witco Corp., under the trade designations "Witcobond 290H" and "Witcobond 293", which both have a weight percent solids of about 66%, an anionic particle charge, and a particle size of 2 micrometers. Preferred polyurethanes are made by reacting isocyanate prepolymers with suitable polyols and/or amine curatives. The term "polyurethane" is generally used in the art and herein to include polymers having urethane and urea linkages, sometimes referred to as polyurethane/polyurea.

Preferred isocyanate prepolymers are those commercially available from Imperial Chemical Industries under the trade designations "PBA 2040", "PBA 2272", "PBA 2280", and "PBA 2234" (which are all modified 4,4'-diaminodiphenylmethane isocyanate prepolymers, having an equivalent weight ranging from about 260 to about 530, an NCO percentage ranging from about 8 to about 16 mole percent, and an isocyanate functionality of ranging from 2 to 3 (the "PBA 2040 version has 0.002 weight percent HCl added, the "PBA 2280 has 0.001 weight percent HCl added, while the other two versions have no HCl added); the polymeric diphenylmethane diisocyanate (MDI), consisting of 18-25% MDI, containing methylene bisphenyl isocyanate, and 75-82% polymethylene polyphenyl isocyanate, commercially available from Dow Chemical Co., under the trade designation "PAPI 2020"; and diphenylmethane diisocyanate (MDI), commercially available from Dow Chemical Co., under the trade designation "Isonate 143L".

Preferred amine curatives include aliphatic and aromatic amines. Preferred aromatic amine curatives include those available under the trade designation "Polamine", particularly "Polamine 1000" and "Polamine 2000", from Air Products and Chemicals, and aromatic diamines such as methylenedianiline and diethyltoluenediamine.

Preferred aliphatic amine curatives include aliphatic diamines such as amino-functional poly(oxyalkylene) compounds available under the trade designation "Jeffamine" from Texaco, Inc., Houston, Tex. Generally, the amine-functional material reactivity in producing the inventive binder is aliphatic>alicyclic>aromatic. Due to the high reactivity of aliphatic diamines, alicyclic, aromatic, and mixed alicyclic and aromatic diamines are preferred.

Poly(oxyalkylene) compounds such as poly(oxyalkylene) amines (POAA) and poly(oxyalkylene) ureides having molecular weight ranging from about 90 to about 1000 are useful amine-functional materials. The poly(oxyalkylene) compounds useful in the invention may or may not have terminal amine functionality.

Useful poly(oxyalkylene) amines which are diamines are selected from the group consisting of compounds represented by general formulas I, II, III, and IV:

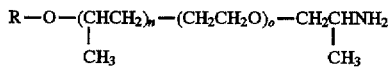   I wherein R is an alkyl group having from 1 to 4 carbon atoms and n and o are integers ranging from 0 to 20;

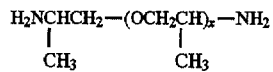   II wherein x is an integer ranging from about 2 to about 20; diamines selected from the group consisting of

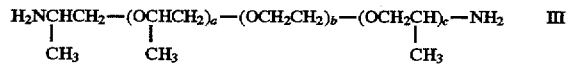   III wherein a, b, and c are integers, the sum of a plus c ranges from 1 to 5, and b ranges from 0 to 20; and poly(oxyalkylene) amines which are triamines selected from the group consisting of compounds represented by the general formula

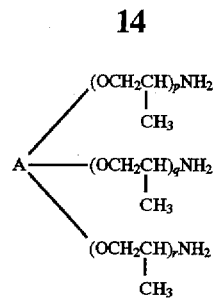   IV wherein p, q, and r are integers greater than zero such that the sum of p, q, and r ranges from about 5 to about 30, and wherein A is a triol initiator, such as trimethylolpropane, glycerine, or the like.

Representative examples of poly(oxyethylene) amines which are useful in the practice of the invention include: poly(oxypropylene) diamine, poly(oxyethylene-co-oxypropylene) diamine, poly(oxyethylene-co-oxypropylene) urea, poly(oxyethylene-co-oxypropylene) diurea, and the trifunctional reaction products of glycerine or trimethylolpropane with hydroxy-terminated poly(oxypropylene) amine.

As indicated previously, in some applications of the present invention, a thermoplastic binder material can be used, as opposed to the preferred thermosetting resins discussed above. A thermoplastic binder material is a polymeric material that softens when exposed to elevated temperatures and generally returns to its original physical state when cooled to ambient temperatures. During the manufacturing process, the thermoplastic binder is heated above its softening temperature, and often above its melting temperature, to form the desired shape of the coated abrasive. After member 11 (FIG. 1) is formed, the thermoplastic binder is cooled and solidified. Thus, with a thermoplastic material, molding processes can be used to advantage, or a web process as described below in reference to FIG. 13.

Preferred thermoplastic materials for use in the invention are those having a high melting temperature and/or good heat resistant properties. That is, preferred thermoplastic materials have a melting point of at least about 100° C., preferably at least about 150° C. Additionally, the melting point of the preferred thermoplastic materials is sufficiently lower, i.e., at least about 25° C. lower, than the melting temperature of the reinforcing material.

Examples of thermoplastic materials suitable for preparations of binders in articles according to the present invention include polycarbonates, polyetherimides, polyesters, polysulfones, polystyrenes, acrylonitrile-butadiene-styrene block copolymers, polypropylenes, acetal polymers, polyamides, polyvinyl chlorides, polyethylenes, polyurethanes, or combinations thereof. Of this list, polyamides, polyurethanes, and polyvinyl chlorides are preferred, with polyurethanes and polyvinyl chlorides being most preferred.

If the thermoplastic material from which the backing is formed is a polycarbonate, polyetherimide, polyester, polysulfone, or polystyrene material, a primer can be used to enhance the adhesion between the backing and the make coat. The term "primer" is meant to include both mechanical and chemical type primers or priming processes. This is not meant to include a layer of cloth or fabric attached to the surface of the backing. Examples of mechanical primers include, but are not limited to, corona treatment and scuffing, both of which increase the surface area of the surface. An example of a chemical primer is a colloidal dispersion of, for example, polyurethane, acetone, a colloidal oxide of silicon, isopropanol, and water, as taught by U.S. Pat. No. 4,906,523, which is incorporated herein by reference.

A third type of binder useful in the inventive articles is an elastomeric material. An elastomeric material, i.e., elastomer, is defined as a material that can be stretched to at least twice its original length and then retract very rapidly to approximately its original length, when released. Examples of elastomeric materials useful in applications of the present invention include styrene-butadiene copolymers, polychloroprene (neoprene), nitric rubber, butyl rubber, polysulfide rubber, cis-1,4-polyisoprene, ethylene-propylene terpolymers, silicone rubber, or polyurethane rubber. In some instances, the elastomeric materials can be crosslinked with sulfur, peroxides, or similar curing agents to form cured thermosetting resins.

Typically and preferably, the binder precursor is solidified by exposure to an energy source, such as thermal energy or radiation energy. For endless, spliceless coated abrasive belts of the invention made on a support structure, it is generally preferred to rotate the belt during thermal curing. This rotation minimizes the tendency of the binder precursor from flowing during curing and ultimately minimizes the shifting of the abrasive particles during curing.

It is also within the scope of this invention to dry and/or partially cure the binder precursor prior to the application of the abrasive particles. However, the binder precursor should not be dried or cured to such a degree that it will not hold the abrasive particles.

It is also within the scope of this invention that the binder precursor is not solidified or cured before the application of the size coating precursor. In this method variation, the size coating precursor is applied directly over the binder precursor and the abrasive particles. This method variation has an advantage in that it saves a processing step of not precuring the binder precursor. It is generally preferred that the size coating precursor be applied in a non-contacting method, such as spraying. After the size coating precursor is applied, the resulting construction is exposed to conditions to cure or solidify both the binder precursor and the size coating precursor. Again, it is preferred that during thermal curing that the resulting construction is rotated to help prevent the binder precursor and size coating precursor from flowing.

Fibrous Reinforcing Material

The backing made from the organic polymeric binder material includes an effective amount of a fibrous reinforcing material. Herein, an "effective amount" of a fibrous reinforcing material is a sufficient amount to impart at least improvement in desirable characteristics to the articles as discussed above, but not so much as to give rise to any significant number of voids and detrimentally effect the structural integrity of the articles.

The primary purposes of the fibrous material are to increase the tear-resistance and stretch-resistance of the articles, particularly the flexible, endless, seamless substrate or belt. The fibrous mat may be nonwoven or woven, and composites of adhesive or melt-bondable fibers with continuous strands of fibers or yarns. The latter comprises, for example, a plurality of parallel polyester yarns thermobonded onto a nonwoven made of organic melt-bonded staple fibers, such as core/sheath melt-bonded fibers. One preferred composite comprises from about 50 to about 80 weight percent, more preferably from about 60 to about 70 weight percent, of core-sheath melt-bonded fibers, both the core and the sheath comprising polyester, the sheath polyester having lower melting temperature than the core polyester, and about 20 to about 50 weight percent, more preferably from about 30 to about 40 weight percent of polyester continuous parallel fibers having a melting temperature about the same as the melting temperature of the polyester forming the core of the core-sheath fiber. Such webs have a density ranging from about 0.30 to about 0.40 g/cm$^3$.

Typically and preferably, the amount of the fibrous reinforcing material in the backing is within a range of about 1–80 wt-%, preferably 5–50 wt-%, more preferably 8–35 wt-%, and most preferably 15–30 wt-%, based on the total weight of the backing (i.e., binder and fibrous material). For certain belts made inside a drum, as described below, typically no more than about 60 wt-% fibrous reinforcing material is present.

The fibrous reinforcing material can be in the form of fibrous strands, a fiber mat or web, or a stitchbonded or weft insertion mat. Fibrous strands are commercially available as threads, cords, yarns, rovings, and filaments. Threads and cords are typically assemblages of yarns. A thread has a very high degree of twist with a low friction surface. A cord can be assembled by braiding or twisting yarns and is generally larger than a thread. A yarn is a plurality of fibers or filaments either twisted together or entangled. A roving is a plurality of fibers or filaments pulled together either without a twist or with minimal twist. A filament is a continuous fiber. Both rovings and yarns are composed of individual filaments. A fiber mat or web consists of a matrix of fibers, i.e., fine threadlike pieces with an aspect ratio of at least about 100:1. The aspect ratio of a fiber is the ratio of the longer dimension of the fiber to the shorter dimension.

The fibrous reinforcing material can be composed of any material that increases the strength of the binder (and can be inserted into a drum for certain embodiments). Examples of useful reinforcing fibrous material in applications of the present invention include metallic or nonmetallic fibrous material. The preferred fibrous material is nonmetallic. The nonmetallic fibrous materials may be materials made of glass, carbon; minerals, synthetic or natural heat resistant organic materials, or ceramic materials. Preferred fibrous reinforcing materials for applications of the present invention are organic materials, glass, and ceramic fibrous material.

By "heat resistant" organic fibrous material, it is meant that useable organic materials should be sufficiently resistant to melting, or otherwise softening or breaking down, under the conditions of manufacture and use of the coated abrasives of the present invention. Useful natural organic fibrous materials include wool, silk, cotton, or cellulose. Examples of useful synthetic organic fibrous materials are made from polyvinyl alcohol, nylon, polyester, rayon, polyamide, acrylic, polyolefin, aramid, or phenol.

One particularly preferred organic fibrous material for applications of the present invention is aramid fibrous material, particularly aramid staple fiber-based nonwoven papers wherein the fibers are bound together by an acrylic latex. Such nonwoven papers are commercially available from Veratec, a division of International Paper Co., Tuxedo, N.Y., and are produced using aramid staple fibers available from E. I. DuPont de Nemours, Inc., Wilmington, Del. under the trade designations "Kevlar" and "Nomex." It is also possible to have more than one type of reinforcing fiber engulfed within the binder.

Generally, any ceramic fibrous reinforcing material is useful in applications of the present invention. An example of a ceramic fibrous reinforcing material suitable for the present invention is "Nextel" which is commercially available from Minnesota Mining and Manufacturing Co., St. Paul, Minn. An example of a useful ceramic fibrous reinforcing mat is 440 "Ultrafiber Mat" which is commercially available from Minnesota Mining and Manufacturing Co., St. Paul, Minn. These mats are nonwovens of fine ceramic fibers with no shot, and with no binders added to the mat. The fibers have fiber diameters ranging from about 2 to about 4 micrometers, with fiber lengths ranging from about 2 to about 25 cm. The mats preferably have mat width ranging from about 10 to 40 cm; mat thickness ranging from about 1 to 3 cm; weight per unit area ranging from about 160 to 210 g/m², and bulk density (with mat thickness of 2.0 cm) ranging from about 8 to 11 kg/m³. The ceramic fibers making up the "440" mats consist of 70 wt. % alumina ($Al_2O_3$), 28 wt. % silica ($SiO_2$), and 2 wt. % boria ($B_2O_3$); while the ceramic fibers making up the "312" mats consist of 62 wt. % alumina, 24 wt. % silica, and 14 wt. % boria.

Examples of useful, commercially available, glass fibrous reinforcing materials in yarn or roving form are those available from PPG Industries, Inc. Pittsburgh, Pa., under the product name E-glass bobbin yarn; those available from Owens-Corning, Toledo, Ohio, under the product name "Fiberglas" continuous filament yarn; and Manville Corporation, Toledo, Ohio, under the product name "Star Rov 502" fiberglass roving. The size of glass fiber yarns and rovings are typically expressed in units of yards/lb. Useful preferred grades of such yarns and rovings are in the range of 75 to 15,000 yards/lb. For belts made inside a drum, these materials are cut to fit within the drum.

If glass fibrous reinforcing material is used, it is preferred that the glass fibrous material be accompanied by an interfacial binding agent, i.e., a coupling agent, such as a silane coupling agent, to improve adhesion to the organic binder material, particularly if a thermoplastic binder material is used. Examples of silane coupling agents include those known under the trade designations "Z-6020" (N-β (aminoethyl)-γ-aminopropyltrimethoxysilane) and "Z-6040" (glycidoxypropyltrimethoxysilane), both available from Dow Corning Corp., Midland, Mich. Also effective silane coupling agents are methacrylate- and vinyl-functional silane coupling agents such as 3-methacryloxypropyltrimethoxysilane, and the like, available under the trade name "Z-6030" and triacetoxyvinylsilane, available under the trade name "Z-6075", both available from Dow Corning Corp.

The reinforcing fibers may contain a pretreatment of some kind, prior to being engulfed by the binder. This pretreatment may be an adhesion promoter or a slashing compound. For example, fiberglass reinforcing fibers may contain a surface treatment, such as an epoxy or urethane compatible with fiberglass yarn, to promote adhesion to the binder. Examples of such fiberglass yarns are those known by the trade designations "ECG 150 1/0 1.0Z" style 903 and "EC9 33 1X0 Z40" style 903 fiberglass yarns from PPG, Pittsburgh, Pa., and those known under the trade designations "ECG 150 1/0" style 603 and "EC9 33 1X0 0.7Z" style 603 fiberglass yarns from Owens-Corning, Toledo, Ohio.

Advantages can be obtained through use of fibrous reinforcing materials of a length as short as 100 micrometers, or as long as needed for a fibrous reinforcing layer formed from one continuous strand. It is preferred that the fibrous reinforcing material used be in the form of essentially one continuous strand per layer of reinforcing material. That is, it is preferred that the fibrous reinforcing material is of a length sufficient to extend around the length, i.e., circumference, of the coated abrasive loop a plurality of times and provide at least one distinct layer of fibrous reinforcing material. For belts made inside a drum, fibrous reinforcing material can be used that is as long as 5 times the circumference of the drum, as long as the material may be fitted into the drum.

The reinforcing fiber denier, i.e., degree of fineness, for preferred fibrous reinforcing material ranges from about 5 to about 5000 denier, typically between about 50 and about 2000 denier. More preferably, the fiber denier will be between about 200 and about 1200, and most preferably between about 500 and about 1000. For belts made inside a drum, the more preferred fiber denier will be between about 5 and about 200, and most preferred between about 5 and about 50. It is understood that the denier is strongly influenced by the particular type of fibrous reinforcing material employed.

The fibrous reinforcing material can be in the form of fibrous strands, a fiber mat or web, or a stitchbonded or weft insertion mat. A primary purpose of a mat or web structure is to increase the tear resistance of the coated abrasives of the invention. The mat or web can be either in a woven or a nonwoven form. Preferably, the mat consists of nonwoven fibrous material at least because of its openness, nondirectional strength characteristics, and low cost. For increased stretch resistance and increasing tensile strength of substrates and belts of the invention, the previously mentioned composites of melt-bondable fibers and continuous yarns are preferred.

A nonwoven mat is a matrix of a random distribution of fibers. This matrix is usually formed by bonding fibers together either autogenously or by an adhesive. That is, a nonwoven mat is generally described as a sheet or web structure made by bonding or entangling fibers or filaments by mechanical, thermal, or chemical means.

Examples of nonwovens suitable for this invention include open, porous staple fiber webs (such as disclosed in assignee's U.S. Pat. No. 2,958,593, comprising staple fibers entangled together and bound at points of mutual contact by a binder, such as a phenolic resin), spun bonded, melt blown, needle punched, hydroentangled or thermo-bonded forms. A nonwoven web is typically porous, having a porosity of about 15% or more. Depending upon the particular nonwoven employed, the fiber length can range from about 100 micrometers to infinity, i.e., continuous fibrous strands. Nonwoven mats or webs are further described in "The Nonwovens Handbook" edited by Bernard M. Lichstein, published by the Association of the Nonwoven Fabrics Industry, New York, 1988.

The thickness of the fibrous mat structure when applied in typical applications of the present invention generally ranges from about 25 to about 800 micrometers, preferably from about 100 to about 375 micrometers. The weight of a preferred fibrous mat structure generally ranges from about 7 to about 150 grams/square meter (g/m²), preferably from about 17 to about 70 g/m². In certain preferred applications of the present invention, the article contains only one layer of the fibrous mat structure. In other preferred embodiments it can contain multiple distinct layers of the fibrous mat structure distributed throughout the binder. Preferably, there are 1 to 10 layers, and more preferably 2 to 5 layers, of the fibrous mat structure in articles of the present invention. Preferably about 1–50 wt %, and more preferably about 5–20 wt %, of the preferred articles of the present invention is the fibrous reinforcing mat.

The fibrous reinforcing material can also be in the form of a mat structure containing adhesive or melt-bondable fibers. Such melt-bondable fibers are disclosed in European Patent Application 340,982, published Nov. 8, 1989, which is incorporated herein by reference.

There are a number of organic and synthetic fiber scrims that are useful for the fibrous material. Examples of organic materials include cotton, canvas and wool. Examples of synthetic scrims include nylon, woven nylon, fiberglass, rayon, polyester and "Kevlar." The basic physical requirements of a substrate determine the type of materials that are needed to produce the substrate.

The type of fibrous reinforcement chosen typically depends on the organic polymeric binder material chosen and the use of the finished product. For example, if a thermoplastic binder material is desired, reinforcement strands are important for imparting strength in the longitudinal direction. The binder material itself generally has good cross-belt strength and flexibility, i.e., in the direction of the width of the belt. If a thermosetting binder material is desired, a fibrous mat structure is important for imparting strength and tear resistance.

Coated abrasives of the present invention preferably and advantageously include a combination of fibrous reinforcing strands and a fibrous mat structure. The fibrous strands can be individual strands embedded within the fibrous mat structure for advantage, at least with respect to manufacturing ease. The fibrous strands can also form distinct layer(s) separate from, i.e., noninterlocking or intertwining with, the fibrous mat structure.

The fibrous mat structure is advantageous at least because it generally increases the tear resistance of endless, seamless articles of the present invention. For endless, seamless articles that include both fibrous reinforcing strands and a fibrous mat structure, the fibrous mat structure is preferably about 1–50 wt %, more preferably about 5–20 wt %, of the member composition, and the fibrous reinforcing strands are preferably about 5–50 wt %, more preferably about 7–25 wt % of the composition.

As stated above, the fibrous reinforcing material can also be in the form of a mat structure containing adhesive or melt-bondable fibers used to integrate parallel strands of individual fibers. In this way, "individual" parallel strands are embedded, i.e., incorporated, within a fibrous reinforcing mat. These parallel strands can be in direct contact with each other along their length, or they can be separated from each other by a distinct distance. Thus, the advantages of using individual fibrous reinforcing strands can be incorporated into a mat structure. Such melt-bondable fibers are disclosed, for example, in European Patent Application 340,982, published Nov. 8, 1989, which is incorporated herein by reference.

The fibrous reinforcing material can be oriented as desired for advantageous applications of the present invention. That is, the fibrous reinforcing material can be randomly distributed, or the fibers and/or strands can be oriented to extend along a direction desired for imparting improved strength and tear characteristics.

As stated previously, in certain articles of the present invention, individual reinforcing strands can be adjacent to one another within a layer of fibrous reinforcing material without overlapping or crossing or the reinforcing strands may be interlacing. They can also be in the form of a plurality of noninterlacing parallel and coplanar reinforcing strands. Furthermore, there can be a plurality of layers, i.e., planes, of fibrous reinforcing material, which can be oriented parallel or perpendicular to one another.

The fibrous reinforcing material can be directed such that the majority of the strength in the cross direction can be attributed to the organic polymeric binder. To achieve this, either a high weight ratio of binder to fibrous reinforcing material is employed, such as about 10:1; or, the fibrous reinforcing material, usually in the form of individual reinforcing strands, is present in only the machine, i.e., longitudinal, direction of the loop.

Figure 3:
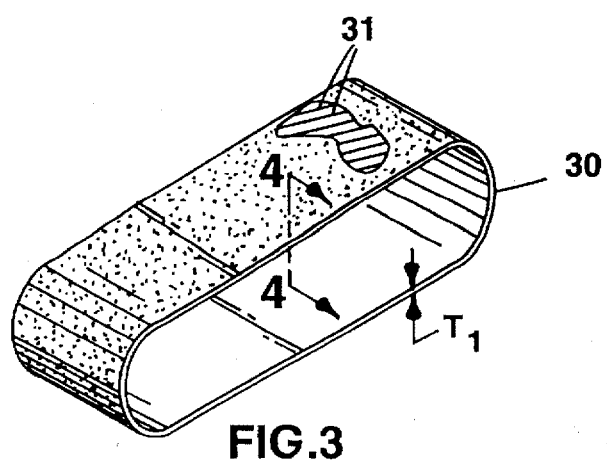
FIG. 3 is perspective view (with parts broken away) of an endless, seamless coated abrasive containing both a fibrous reinforcing mat structure and a layer of a continuous fibrous reinforcing strand engulfed within a thermosetting resin.

Referring again to the figures, FIGS. 3 to 6 illustrate (not shown to scale) various coated abrasives within the invention. It is preferred that the fibrous reinforcing material, particularly the individual reinforcing strands, be present in a coated abrasive construction in a predetermined, i.e., not random, position or array. For example, for the embodiment 30 of FIG. 3, the individual wraps 31 in the layer of reinforcing fibrous strands are oriented to extend in the machine direction, i.e., the longitudinal direction, of article 30; FIG. 3 being a representation of an endless, seamless coated abrasive material with a portion of an internal layer of reinforcing strands exposed.

Figure 4:
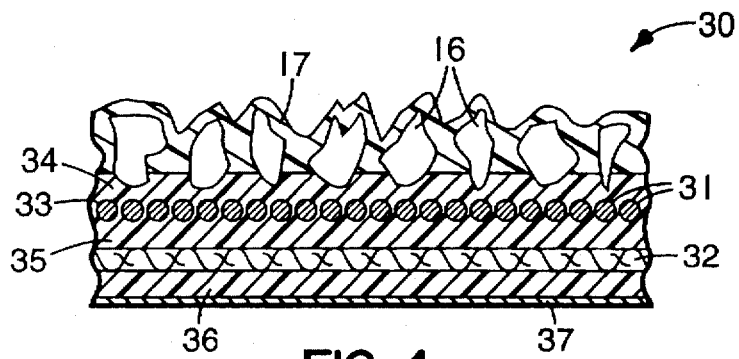
FIG. 4 is an enlarged fragmentary cross-sectional view of an endless, seamless coated abrasive according to the present invention taken generally along line 4—4, FIG. 3.

As illustrated in FIG. 4, which is an enlarged fragmentary cross-sectional view of the endless, seamless coated abrasive 30 taken generally along line 4—4, FIG. 3, the fibrous reinforcing material is present in two distinct layers 32 and 33 with solidified organic binder layers 34, 35, and 36 above, between, and below the layers of fibrous reinforcing material 32 and 33. One layer (33) is oriented above and separate from the other layer (32) by a layer of organic binder material 35. Layer 33 is a layer of fibrous strands with the wraps 31 in extension in the longitudinal direction of the article. Layer 32 is a layer of a fibrous reinforcing mat or web. This orientation of the strands in the longitudinal direction of the article provides advantageous characteristics, particularly tensile strength, i.e., resistance to tearing in the longitudinal direction of the loop. Layers 34, 35, and 36 all correspond to binder 13 of FIG. 1 and 2. It will be appreciated that binder layers 34, 35, and 36 may be the same or different in composition. Abrasive particles 16 and size coating 17 are illustrated as in FIG. 1.

Although not shown in any particular figure, the reinforcing fibrous strands can alternatively be oriented to extend in the cross direction of a coated abrasive, or at least to approach the cross direction. Furthermore, for alternative embodiments not shown in any particular figure, alternate layers of reinforcing strands can be oriented to extend in both the longitudinal and cross direction, respectively, of the coated abrasive as a grid, if so desired. A significant improvement in cross tear resistance is realized when the fibers are extended in the cross direction, and segments may be spliced together to form segmented coated abrasives.

Figure 5:
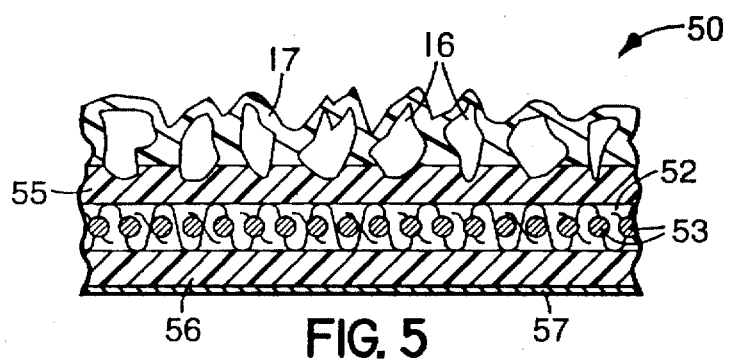
FIG. 5 is an enlarged fragmentary cross-sectional view of an endless, seamless coated abrasive according to the present invention taken generally analogously along line 4—4, FIG. 3.

FIG. 5 is an enlarged fragmentary cross-sectional view of an endless, seamless coated abrasive according to the present invention taken generally analogously along line 4—4, FIG. 3. Article 50 has one layer of fibrous reinforcing mat structure 52 in its internal structure. The embodiment shown in FIG. 5 shows a fibrous reinforcing mat structure with individual parallel fibrous strands 53 incorporated therein. Although not specifically shown in FIG. 5, the layer of fibrous reinforcing mat structure typically consists of at least two wraps of the reinforcing mat. Binder layers 55 and 56 correspond to binder 13 as described in reference to FIGS. 1 and 2. Abrasive particles 16 and size coating 17 are illustrated as in FIG. 1.

If there is only one layer of a fibrous mat structure or one layer of fibrous reinforcing strands used, the layer is preferably oriented in the center portion of the binder thickness, although it can be positioned toward one of the outer surfaces of the article. That is, if there is only one layer of a fibrous reinforcing material, it is not on, or at, the surface of the article; rather it is engulfed within the internal structure of the binder. Thus, at the outer and inner surfaces of an endless, seamless article there is generally no exposed fibrous reinforcing material.

Figure 6:
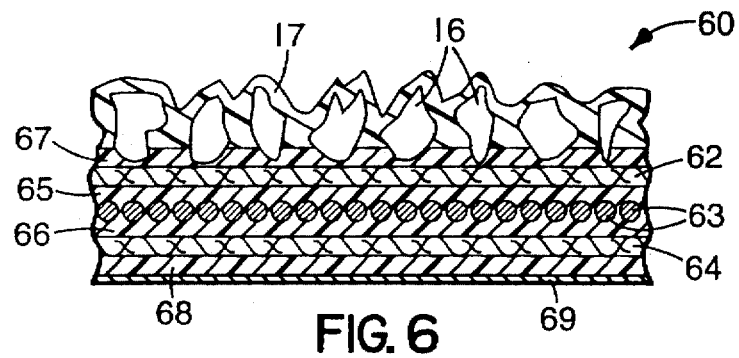
FIG. 6 is an enlarged fragmentary cross-sectional view of an endless, seamless coated abrasive according to the present invention taken generally analogously along line 4—4, FIG. 3.

Referring to the embodiment of FIG. 6, which is an enlarged fragmentary cross-sectional view of an endless, seamless coated abrasive according to the present invention taken generally analogously along line 4—4, FIG. 3, article 60 has three parallel layers, i.e., planes, 62, 63, and 64 of fibrous reinforcing material. These three layers 62, 63, and 64 are separated from one another by regions of organic polymeric binder material 65 and 66, which correspond to binder 13 in FIG. 1. These three layers 62, 63, and 64, generally do not overlap, interlock, or cross one another, and are coated by regions of organic binder material 67 and 68. Although each of the layers of fibrous reinforcing material could be a layer of reinforcing strands, a layer of a fibrous reinforcing mat or web, or a layer of a fibrous reinforcing mat with reinforcing strands incorporated therein, the embodiment in FIG. 6 shows layers 62 and 64 as layers of fibrous mat structure, and layer 63 as a layer of fibrous strands positioned in the machine, i.e., longitudinal, direction of article 60. Also note that in making an article such as depicted in FIG. 6, binder layers 65 and 66 may be applied simultaneously or in two separate steps, and layers 65 and 66 may comprise the same or different organic polymers.

In FIGS. 4, 5, and 6, an optional layer 37, 57, and 69, respectfully is illustrated. This refers to the optional paper or polymeric film referred to earlier that may be used to increase tear resistance, reduce backwear, and/or increase the aesthetic appearance of the article. The paper or plastic film may simply be employed to ensure release of the product from a support structure during manufacture. Preferred polymeric films include those comprising polyester, polyimide, polyethylene, polyamide, polysulfone and polypropylene.

Coated abrasives of the present invention include at least one layer of reinforcing strands, or at least one layer of a fibrous reinforcing mat or web structure, or at least one layer of a fibrous reinforcing mat with reinforcing strands incorporated therein. Preferred articles of the present invention incorporate a plurality of layers of fibrous reinforcing material. More preferred articles of the present invention incorporate at least one layer of a fibrous mat structure and at least one layer of reinforcing strands, for advantageous strength in both the longitudinal and cross directions.

Optional Additives

The coated abrasives of the present invention can further and advantageously for certain applications of the present invention include other additives. A number of optional materials are presented in World Pat. Application No. WO 93/12911, published Jul. 8, 1993, which is incorporated herein by reference. For example, incorporation of a toughening agent into the binder will be preferred for certain applications. Preferred toughening agents include rubber-type polymers or plasticizers. The preferred rubber toughening agents are synthetic elastomers. Preferably, at least an effective amount of a toughening agent is used. Herein, the term "effective amount" in this context refers to an amount sufficient to impart improvement in flexibility and toughness.

Other materials that can be advantageously added to the binder for certain applications of the present invention include inorganic or organic fillers. Inorganic fillers are also known as mineral fillers. A filler is defined as a particulate material, typically having a particle size less than about 100 micrometers, preferably less than about 50 micrometers. The filler may also be in the form of solid or hollow spheroids, such as hollow glass and phenolic spheroids. Fillers are capable of being dispersed uniformly within the binder. Examples of useful fillers for applications of the present invention include carbon black, calcium carbonate, silica, calcium metasilicate, cryolite, phenolic fillers, or polyvinyl alcohol fillers. If a filler is used, it is theorized that the filler fills in between the reinforcing fibers, and possibly prevents crack propagation through the binder. Typically, a filler would not be used in an amount greater than about 70 weight % based on the weight of the binder, and 70 weight % based on the weight of a size coating.

Other useful materials or components that can be added to the binder for certain applications of the present invention are pigments, oils, antistatic agents, flame retardants, heat stabilizers, ultraviolet stabilizers, internal lubricants, antioxidants, and processing aids. Examples of antistatic agents include graphite fibers, carbon black, metal oxides such as vanadium oxide, conductive polymers, humectants and combinations thereof. These materials are further described, for example, in U.S. Pat. Nos. 5,108,463, 5,137, 542, and 5,203,884, all of which are incorporated herein by reference.

Adhesive Layers

The adhesive layer (so-called "size" coating 17 of FIG. 1) in the coated abrasive articles of the present invention is formed from a resinous adhesive. Useful resinous adhesives are those that are compatible with the organic polymeric binder material 13 (FIG. 1). Cured resinous adhesives are also tolerant of grinding conditions such that the adhesive layer(s) does not deteriorate and prematurely release the abrasive material.

Size adhesives are preferably comprised of thermosetting resin. Examples of useable thermosetting resinous adhesives suitable for these layers include those mentioned above as useful in forming binder 13.

The size adhesive layer (17 in FIG. 1) can preferably contain other materials that are commonly utilized in abrasive articles. These materials, referred to as additives, include grinding aids, coupling agents, wetting agents, dyes, pigments, plasticizers, release agents, or combinations thereof. Other fillers might also be used as additives in these layers. Fillers or grinding aids are typically present in no more than an amount of about 70 weight %, for the size coating, based upon the weight of the adhesive. Examples of useful fillers include calcium salts, such as calcium carbonate and calcium metasilicate, silica, metals, carbon, or glass.

The optional supersize layer can preferably include a grinding aid to enhance the abrading characteristics of the coated abrasive. Examples of grinding aids include potassium tetrafluoroborate, cryolite, ammonium cryolite, or sulfur. One would not typically use more of a grinding aid than needed for desired results.

Preferably, the adhesive layers are formed from a conventional calcium salt filled resin, such as a resole phenolic resin, for example. Resole phenolic resins are preferred at least because of their heat tolerance, relatively low moisture sensitivity, high hardness, and low cost. More preferably, the adhesive layers include about 45–55 wt-% calcium carbonate or calcium metasilicate in a resole phenolic resin. Most preferably, the adhesive layers include about 50 wt-% calcium carbonate filler, and about 50 wt-% resole phenolic resin, aminoplast resin, or a combination thereof. Herein, these percentages are based on the weight of the adhesive.

Abrasive Material

Examples of abrasive material 16 suitable for use in articles of the present invention include fused aluminum oxide, heat treated aluminum oxide, ceramic aluminum oxide, silicon carbide, alumina zirconia, garnet, diamond, cubic boron nitride, or mixtures thereof. The term "abrasive material" encompasses abrasive particles, agglomerates, or multi-grain abrasive granules. An example of such agglomerates is described in U.S. Pat. No. 4,652,275, which is incorporated herein by reference. It is also with the scope of the invention to use diluent erodible agglomerate grains as disclosed in U.S. Pat. No. 5,078,753, which is incorporated herein by reference.

A preferred abrasive material is an alumina-based, i.e., aluminum oxide-based, abrasive particles. Useful aluminum oxide grains for applications of the present invention include fused aluminum oxides, heat treated aluminum oxides, and ceramic aluminum oxides. Examples of ceramic aluminum oxides are disclosed in U.S. Pat. Nos. 4,314,827, 4,744,802, 4,770,671, and 4,881,951, all of which are incorporated herein by reference.

The average particle size of the abrasive particles for advantageous applications of the present invention is at least about 0.1 micrometer, preferably at least about 100 micrometers. A grain size of about 100 micrometers corresponds approximately to a coated abrasive grade 120 abrasive particle, according to American National Standards Institute (ANSI) Standard B74.18-1984. The abrasive particles can be oriented, or it can be applied to the binder without orientation, depending upon the desired end use of the coated abrasive.

Coated Abrasive Articles and Preparation Thereof

One embodiment of the inventive coated abrasive articles of the present invention includes: a substantially planar member having an abrasive surface (i.e., a first major surface) and a nonabrasive surface (i.e., a second major surface), the member comprising an effective amount of a fibrous reinforcing member (i.e., material) substantially engulfed by an organic polymeric binder, the binder present in sufficient amount to provide a region of binder substantially free of the fibrous reinforcing member, wherein the fibrous reinforcing member lies substantially in a first plane; a plurality of abrasive particles partially embedded in the region of binder substantially free of the fibrous reinforcing member such that a majority of the abrasive particles protrude out of the binder, the particles lying substantially in a second plane which forms the abrasive surface that is adjacent the first plane; and an optional size coating overlying the abrasive particles and binder. The coated abrasive articles of the present invention are otherwise free of abrasive particles.

Another coated abrasive embodiment of the present invention comprises: a substantially planar member having an abrasive surface and a nonabrasive surface, the member comprising an effective amount of a fibrous reinforcing member having an organic polymeric binder distributed throughout the member, the binder present in sufficient amount to provide a region of binder substantially free of the fibrous reinforcing member, wherein the fibrous reinforcing member lies substantially in a first plane; a plurality of abrasive particles partially embedded in the region of binder substantially free of the fibrous reinforcing member such that a majority of the abrasive particles protrude out of the binder thus forming the abrasive surface, the particles lying substantially in a second plane that is adjacent the first plane; and an optional size coating overlying the abrasive particles and binder.

The single organic polymeric binder used in the invention thus serves both as a treatment for the reinforcing fibers (e.g., a prebond) and to provide means to secure/adhere the abrasive particles to the article (e.g., as a make coating). The organic polymeric binder is a treatment for the reinforcing fibers in the sense that at least one of the following functions is performed:

1) improved adhesion of the abrasive particles to an article having reinforcing fibers therein;

2) protection of fibers, both from the grinding interface and from "backwear" (such as when an endless belt traverses over a support platen); and 3) adheres individual fibers together or to other separate fibrous reinforcements within the confines of the organic polymeric binder.

Although there is no separate distinct resin boundary between the portion of the final abrasive articles of the invention normally termed a "backing" and the abrasive surface, the coated abrasive articles of the present invention may be described as including a "substantially planar member" which contains an organic polymeric binder material which either substantially engulfs, or is distributed throughout, a fibrous reinforcing material. By substantially planar is meant that the member is generally sheet-like in nature, having side edges which are preferably parallel.

The preferred, planar member (i.e., sheet-like member) primarily comprises a polymeric organic binder and fibrous reinforcing material. Although there may be additional components added to the binder composition, a coated abrasive of the present invention primarily comprises abrasive particles adhered to one major surface of an organic polymeric binder having an effective amount of a fibrous reinforcing material engulfed therein. The articles of the invention thus have an abrasive surface (i.e., a first major surface) and a nonabrasive surface (i.e., a second major surface). The phrase "effective amount" of fibrous reinforcing material refers to an amount sufficient to give the desired physical characteristics of the inventive articles such as reduction in stretching or splitting during use, which may subject the articles to temperatures up to 80° C., and often as high as 150° C., and possibly up to 150° C., and grinding pressures up to 20 kg/cm². Typical grinding pressure used ranges from about 0.35 to about 0.70 kg/cm².

Similar to PCT International Publication No. WO 93/12911, the organic polymeric binder material and fibrous reinforcing material together comprise a flexible composition, which may be in the form of an endless, seamless loop with generally parallel side edges. However, in the presently claimed invention, the organic polymeric binder can also be present in sufficient amount to function as the binding medium for abrasive particles which, as explained further herein, are applied when the binder is still in an uncured and/or unsolidified state. The flexible coated abrasives of the present invention typically include at least one layer of fibrous reinforcing material along the entire length or area of the article. This layer of fibrous reinforcing material is preferably substantially completely surrounded by (i.e., engulfed within) the organic polymeric binder material. That is, the layer of fibrous reinforcing material is embedded or engulfed within the internal structure of the article, i.e., within the body of the article, such that there is excess organic binder material which results in regions of organic binder material free of fibrous reinforcing material on opposite surfaces of the layer of fibrous reinforcing material. In addition, during the manufacture of the articles of the present invention, one surface of the member free of fibrous reinforcing material is provided sufficient binder to bind abrasive particles thereto. In this way, one surface, e.g., the inner surface of an endless loop made on a support structure, has a generally smooth, uniform surface topology, while the opposite surface has adhered thereto an abrasive surface. Thus, in these embodiments the step of applying a separate make coating precursor and equipment required therefore are eliminated.

The fibrous reinforcing material can be in the form of individual fibrous strands or a fibrous mat structure. The coated abrasive articles of the present invention preferably consist of various layers of individual fibrous reinforcing strands and/or fibrous mat structures incorporated within, i.e., engulfed within, an internal structure or body of the article. Preferred belts contain, for example, a thermosetting binder, a layer of noninterlacing parallel and coplanar individual fibrous reinforcing strands, and a layer of a fibrous mat structure wherein the fibrous material within one layer does not interlock with the fibrous material within the other layer.

Certain preferred coated abrasive belts of the present invention also contain a barrier sheet, such as paper or polymeric film, adhered to the article on the surface opposite the abrasive particles. The barrier sheet can be laminated with an adhesive to the article or, more preferably, adhered using the organic polymeric binder while the binder is still in its flowable state. These embodiments of the coated abrasive articles of the present invention are advantageous because of the ease in removing the article from a support apparatus used to produce the articles in batch mode, for aesthetic reasons, and as an inexpensive way of increasing the tear strength of the articles of the invention. Further, especially when the binder material is a thermoset resin and the article is an endless belt, "platen compatibility" and backwear from drive rolls become increasingly important issues, since thermosets generally have a higher coefficient of friction than thermoplastics. If the frictional wear or backwear is too great, damage to the backside (nonabrasive side) of the belts may occur, which of course is not preferred.

The coated abrasives of the present invention may be prepared by either of two general methods: batch and continuous. In certain batch processes, generally an endless belt structure comprising liquid organic binder precursor material having fibrous reinforcing material therein is prepared in extension around a periphery of a support structure, such as a drum. A sufficient amount of the liquid organic binder precursor material is applied so that not only is all of the fibrous reinforcement engulfed by the binder precursor, but a layer of uncured binder precursor is built up on the external surface of the article. At this stage, depending on the organic polymer chemistry of the binder precursor, the article may optionally be exposed to conditions to partially cure or gel the binder precursor so that it becomes tacky enough to hold abrasive particles thereto (the binder precursor may be tacky enough without such exposure). While still in the uncured state the article is then rotated while being exposed to a stream of abrasive particles, applied electrostatically, magnetically, or by drop coating, such that a majority of the abrasive particles protrude from the binder precursor. The article is then exposed to conditions sufficient to solidify the binder precursor to form a flexible, solidified, abrasive belt article having fibrous reinforcing material therein.

Electrostatic coating is a preferred method of applying abrasive particles to backings, whether in the form of a belt, disc, etc. During electrostatic coating, electrostatic charges are applied to the abrasive particles and this propels the abrasive particles toward the binder precursor-coated article. Electrostatic coating tends to orient the abrasive particle, which tends to lead to better abrading performance. In drop coating, the abrasive particles are forced from a feed station and fall into the binder precursor by gravity. It is also within the scope of this invention to propel the abrasive particles toward and into the binder precursor by a mechanical force. Magnetic coating involves using magnetic fields to force abrasive particles toward and into the binder precursor.

If the abrasive particles are applied by electrostatic coating, then it is preferred that the member be placed on a drum. This drum is preferably the original support structure used for producing the article or it can be a different drum. The drum serves as an electrical ground for the electrostatic coating process. The proper amount of abrasive particles is then placed on a plate or surface underneath the drum. Next, the drum is rotated and the electrostatic field is turned on. As the drum rotates, the abrasive particles are forced off of the plate and forced to move by the electric field toward the binder precursor, and become embedded into the binder precursor. The drum is rotated until the desired amount of abrasive particles are coated. The resulting construction is exposed to conditions sufficient to solidify the binder precursor.

A majority of the abrasive particles should protrude out of the binder. This means that, for a majority of the total number of abrasive particles, a portion of the abrasive particle is embedded into the binder, while another portion of the abrasive particle protrudes out of the binder. Preferably, all abrasive particles will protrude from the binder, but this is not always ensured depending on the technique used. This results in an oriented abrasive particle that tends to lead to better performance. There may be a few abrasive particles totally embedded into the binder that do not protrude out of the binder. However the majority, preferably greater than 50%, of the abrasive particles protrude out of the binder.

The abrasive particles lie substantially in a second plane adjacent the first plane. There may be more than one layer of abrasive particles, but these abrasive particles are generally close enough together to form a plane. Generally, the planes of reinforcing fibers and abrasive particles are parallel to one another and do not intersect. Thus, the abrasive particles are positioned such that they are not in the plane of reinforcing fibers and the abrasive particles are not present between any of the reinforcing fibers.

The flexible, solidified abrasive belts formed in batch processes of the invention have an outer and an inner surface. One method of preparing a loop of liquid organic binder material having fibrous reinforcing material therein preferably includes the steps of: applying a fibrous reinforcing mat structure around the periphery of a support structure, such as a drum; and winding one individual reinforcing strand around the periphery of the support structure, e.g., drum, in the form of a helix in longitudinal extension around the loop, i.e., along the length of the loop, in a layer that spans the width of the loop.

An alternative and preferred batch method of preparing the endless, seamless loops of the present invention includes coating, i.e., impregnating, a fibrous, reinforcing mat structure with an organic binder precursor material prior to the mat being applied around the periphery of the support structure. One method of impregnating the fibrous reinforcing material is to coat the fibers through an orifice or knife coater with the binder precursor material. If the organic binder material is a solid material at room temperature (about 20°–25° C.), such as a thermoplastic material, the step of preparing a loop of organic binder material having fibrous reinforcing material therein includes: applying a first layer of a solid organic binder material around the periphery of a support structure, preferably a drum; applying a layer of fibrous reinforcing material around the first layer of solid organic polymeric binder material on the support structure; applying a second layer of a solid organic polymeric binder material around the first layer of solid organic polymeric binder material and the layer of fibrous reinforcing material on the support structure to form a structure of a solid organic polymeric binder material having a layer of fibrous reinforcing material therein; heating the solid organic polymeric binder material until it flows and generally forms a melt of thermoplastic organic polymeric binder precursor material having fibrous reinforcing material therein; exposing the article to a stream of abrasive particles, such that a majority of the particles protrude as explained above; and exposing the article to conditions sufficient to cure or solidify the organic binder precursor material.

In preferred embodiments, an adhesive layer (sometimes referred to as a "size" coating) is applied over the abrasive particles, either before or after the liquid organic polymeric binder has solidified, and both the binder and size adhesive are fully solidified. In certain preferred applications of the present invention, a second adhesive layer (sometimes referred to as a "supersize") can be applied if desired.

Similar batch methods can also be used in preparing a coated abrasive using a support structure, such as a conveyor system. Such a system would typically use, for example, a stainless steel sleeve, in the form of a conveyor belt. In this embodiment, the step of preparing a loop of liquid organic binder material includes preparing the loop around the conveyor belt.

Another method of making abrasive articles of the invention is a continuous process, sometimes referred to herein as "web" process. In this process, a fibrous reinforcing material, e.g., a roll of nonwoven material, is traversed through an organic binder precursor. The binder precursor is applied in sufficient amount to generally wet and essentially engulf the fibrous reinforcing yarns. Then abrasive particles are coated into the binder precursor, preferably by an electrostatic coater, such that a majority of the particles protrude therefrom. Then the resulting construction is exposed to conditions to solidify the binder precursor. An optional size coating precursor may be coated over the abrasive particles by any conventional technique, such as a roll coater. The resulting construction is then subjected to conditions to solidify the size coating precursor, then typically wound into a roll. Further processing may then occur such as the addition of a supersize coating, additional curing, flexing and/or humidification. After this optional further processing, the coated abrasive in web form can be convened into the desired form or shape, such as disc, sheet, daisy, or the like.

Thus, a variety of methods can be used to prepare abrasive articles according to the present invention. Typically the method chosen depends on the type of the binder chosen.

For the endless, seamless coated abrasive embodiments of the invention, a preferred method generally involves:

(a) applying a fibrous reinforcing member (i.e., material) to a support structure and either simultaneously or sequentially applying a sufficient amount of an organic polymeric binder precursor to the reinforcing member such that the binder precursor engulfs the fibrous reinforcing member and further provides a region of binder free of the reinforcing member;

(b) applying a plurality of abrasive particles to the region of binder precursor free of the reinforcing member; and (c) exposing the construction resulting from step (b) to conditions sufficient to solidify the binder precursor thereby forming a binder, wherein a majority of the abrasive particles protrude out of the binder.

A second method of making a coated abrasive comprises:

(a) providing a fibrous reinforcing member lying substantially in a first plane;

(b) applying an organic polymeric binder precursor to the fibrous reinforcing member in an amount sufficient to thereby substantially engulf the reinforcing member with binder precursor and further provide a region of binder precursor flee of the reinforcing member;

(c) applying a plurality of abrasive particles to the region of binder precursor free of the reinforcing member such that the abrasive particles protrude from the binder precursor and substantially form a second plane, the second plane adjacent the first plane; and (d) exposing the construction of step (c) to conditions sufficient to solidify the binder precursor thereby forming a binder, wherein a majority of the abrasive particles protrude out of the binder.

Another method of making a coated abrasive comprises:

(a) applying a fibrous reinforcing member to a support structure and either simultaneously or sequentially applying an organic polymeric binder precursor to the reinforcing member in an amount sufficient such that the binder precursor engulfs the reinforcing fibers and provides a region of binder precursor free of the reinforcing member;

(b) applying a plurality of abrasive particles to the region of binder precursor free of the reinforcing member such that a majority of the abrasive particles protrude from the binder precursor;

(c) applying a size coating precursor over the abrasive particles and binder precursor wherein the binder precursor has not been solidified and is still in a flowable state; and (d) exposing the construction resulting from step (c) to conditions sufficient to solidify the binder precursor size coating precursor to form a binder and a size coating.

Yet another method comprises:

(a) providing a fibrous reinforcing member lying substantially in a first plane;

(b) applying an organic polymeric binder precursor in an amount to substantially engulf the reinforcing member with the binder precursor and provide a region of binder precursor free from said reinforcing member;

(c) applying a plurality of abrasive particles to the region of binder precursor free from said reinforcing member such that a majority of the abrasive particles protrude from the binder precursor, and the abrasive particles lie substantially in a second plane comprising the particles, the second plane adjacent the first plane;

(d) applying a size coating precursor over the abrasive particles and the binder precursor while the binder precursor is still in a flowable state; and (e) exposing the construction of step (d) to conditions sufficient to solidify the binder precursor and the size coating precursor to form a binder and a size coating.

The present invention also provides a method comprising:

(a) saturating a nonwoven fibrous substrate with an organic polymeric binder precursor via knife coating to form a saturated nonwoven;

(b) applying the saturated nonwoven to a support structure;

(c) applying alternating yarns of nylon and fiberglass over the saturated nonwoven while tensioning the yarns such that the yarns are pulled down into the saturated nonwoven, there being sufficient binder precursor to wet and engulf the yarns and still have an excess of binder precursor present to form a region substantially free of said nonwoven and said yarns, the nonwoven and yarns applied to the support structure in two layers, the two layers being out of phase (preferably 180 degrees) to create a uniform structure;

(d) applying a plurality of abrasive particles to the region of binder precursor substantially free from said nonwoven and said yarns such that a majority of the abrasive particles protrude from the binder precursor; and (e) exposing the construction of step (d) to conditions sufficient to solidify the binder precursor to form a binder.

A further method comprises:

(a) applying a nonwoven fibrous substrate to a support structure;

(b) applying alternating yarns of nylon and fiberglass over the nonwoven while tensioning the yarns such that the yarns are pulled down into the nonwoven, the yarns having been previously coated with a binder precursor, there being sufficient binder precursor to wet and engulf the yarns and still have an excess of binder precursor present to form a region substantially free of said nonwoven and said yarns, the nonwoven and yarns applied to the support structure in two layers, the two layers being out of phase (preferably 180 degrees) to create a uniform structure;

(c) applying a plurality of abrasive particles to the region of binder precursor substantially free from said yarns and said nonwoven such that a majority of the abrasive particles protrude from the binder precursor; and (d) exposing the construction of step (c) to conditions sufficient to solidify the binder precursor to form a binder.

One preferred method is carried out in a continuous web fashion, and comprises the steps of:

(a) traversing a nonwoven material through a coating station to engulf the nonwoven in an organic polymeric binder precursor, thus forming a saturated nonwoven having a region of binder precursor free of said nonwoven material;

(b) embedding a fibrous reinforcing yarn into the saturated nonwoven to form a region free of said nonwoven material and said yarn;

(c) projecting via electrostatic forces a plurality of abrasive particles into the region of binder precursor free of said nonwoven material and said yarn;

(d) exposing the construction resulting from step (c) to conditions sufficient to solidify the binder precursor to form a binder;

(e) applying a size coating precursor over the abrasive particles and the binder;

(f) exposing the construction resulting from step (e) to conditions sufficient to solidify the size coating precursor thus forming a size coated abrasive;

(g) optionally further processing the size coated abrasive by procedures such as additional curing, flexing and/or humidification; and (h) converting the size coated abrasive into the desired form or shape.

One preferred continuous method to make the abrasive article of the invention described above, is to first saturate a nonwoven substrate with a binder precursor. This saturation can be accomplished by any conventional coating method such as spraying, roll coating, knife coating, dipping, and squeeze coating, the preferred technique being to knife coat the nonwoven substrate with the binder precursor. Next, this saturated nonwoven is applied to a support structure. Then alternating yarns of nylon and fiberglass are applied over the nonwoven substrate. As the yarns are applied, the tension should be set such that the yarns are pulled down into the saturated nonwoven. This tension will also help promote wetting of the binder precursor onto the reinforcing yarns. There is sufficient binder precursor to wet and engulf the reinforcing yarns and still have an excess of binder precursor present over the reinforcing yarns. The nonwoven and reinforcing yarns are preferably applied to the support structure to create a uniform structure. In some instances to make a uniform structure, the nonwoven and/or reinforcing fibers are applied in two layers, these two layers being out of phase (preferably 180 degrees).

As shown generally in FIG. 1, the reinforcing fibers lie substantially in a first plane. If there is more than one type of reinforcing fiber or two or more layers of reinforcing fibers, essentially all of the reinforcing materials will be relatively close together. Thus, this first plane is meant to include the all of the reinforcing fibers.

Figure 13:
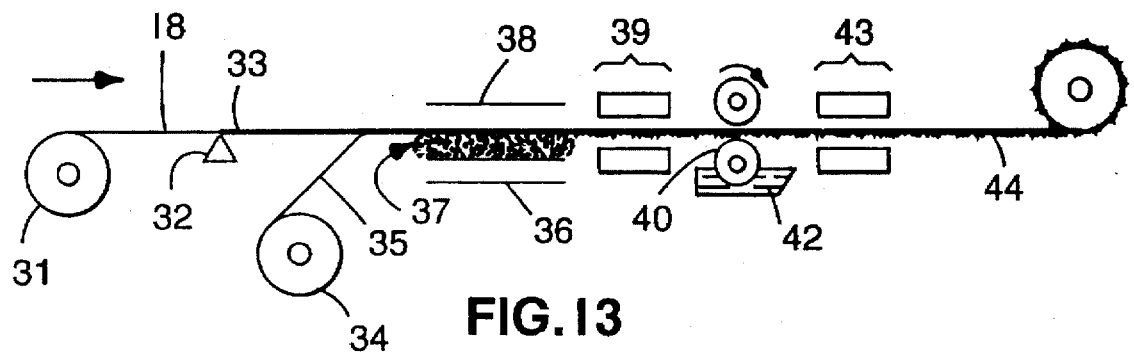
FIG. 13 is a schematic (reduced) of a preferred continuous web process of the present invention for making coated abrasive articles of the invention.

FIG. 13 illustrates a schematic, reduced view of a continuous web process useful for producing seamed coated abrasives within the invention. A roll of reinforcing fiber 31, e.g., a roll of nonwoven 31 is unwound and is subsequently coated at a coating station 32 with a binder precursor 33. This coating can be accomplished by any technique previously mentioned. Preferred is the use of a knife coater. Optionally, other reinforcing fibers, e.g., reinforcing yarns 35 can leave an unwind station 34 and be embedded into the binder precursor. The binder precursor will then wet or essentially engulf these reinforcing yarns. Next, abrasive particles 37 are coated into the binder precursor, preferably by an electrostatic coater 36. A ground plate 38 is placed above the web. Then the resulting construction is exposed to conditions to solidify the binder precursor. It is preferred that the binder precursor be exposed to an energy source 39, either thermal energy or radiation energy. Next, a size coating precursor 42 is coated over the abrasive particles by any conventional technique. In FIG. 13, the size coating precursor is applied by a roll coater 40. The resulting construction is then subjected to conditions sufficient to solidify the size coating precursor. Typically, the size coating precursor is exposed to an energy source 43. The resulting coated abrasive 44 is then wound into a roll. Further processing may then occur such as additional curing, flexing and/or humidification. After this optional further processing, the coated abrasive in web form can be converted into the desired form or shape.

It is also within the scope of this invention to use a carrier web or support web during the process illustrated in FIG. 13. The carrier web will help support the "abrasive" web until the binder precursor can be solidified. The support web can be any material that has the necessary strength and heat resistance. Examples of such carrier webs include paper, polymeric film, rubber webs, cloth, vulcanized fiber, metallic belts, and treated versions thereof and combinations thereof. The carrier web may be perforated. The front surface of the carrier web may also contain a release coating, so that the carrier web does not adhere to the binder after solidification of the make coat.

The preferred size coating is a resole phenolic resin filled with either a grinding aid or an inorganic filler. For endless, splice-less belts, it is preferred to spray the size coating precursor over the abrasive particles. Preferably two or more spraying passes are employed to apply the size coating precursor. After the size coating precursor is applied, it is solidified, typically upon exposure to an energy source. Typical and preferable energy sources include thermal and radiation energy.

Abrasive particle coating techniques for use in the inventive methods may be selected from the group consisting of electrostatic coating, drop coating, and magnetic coating. In certain embodiments, a size coating precursor may be applied over an uncured or only partially solidified binder precursor, i.e., the binder precursor has not been exposed to conditions to initiate polymerization or curing.

The support structure is preferably a drum, which can be made from a rigid material such as steel, metal, ceramics, or a strong plastic material. The drum is placed on a mandrel so that it can be rotated at a controlled rate by a motor. This rotation can range anywhere from 0.1 to 500 revolutions per minute (rpm), preferably 1 to 100 rpm, depending on the application.

The drum can be a unitary or created of segments or pieces that collapse for easy removal of the endless, seamless article. If a large endless, seamless article is preferred, the drum is typically made of segments for collapsibility and easy removal of the article. If such a drum is used, the inner surface of the article may contain slight ridges where the segments are joined and form a seam in the drum. Although it is preferred that the inner surface be generally free of such ridges, such ridges can be tolerated in endless, seamless coated abrasives of the present invention in order to simplify manufacture, especially with large belts.

The dimensions of the drum generally correspond to the dimensions of the endless, seamless articles. The circumference of the drum will generally correspond to the inside circumference of the endless, seamless articles. The width of the endless, seamless articles can be of any value less than or equal to the width of the drum. A single endless, seamless coated abrasive can be made on the drum, removed from the drum, and the sides can be trimmed. Additionally, the coated abrasive can be slit longitudinally into multiple articles with each having a width substantially less than the original article.

In many instances, it is preferred that a release coating be applied to the periphery of the drum before the binder or any of the other components are applied. This provides for easy release of the endless, seamless coated abrasive after the binder is solidified. In most instances, this release coating will not become part of the endless, seamless coated abrasive. If a collapsible drum is used in the preparation of a large endless, seamless coated abrasive, such a release liner helps to prevent, or at least reduce, the formation of ridges in the inner surface of the article, as discussed above. Examples of such release coatings include, but are not limited to, silicones, fluorochemicals, or polymeric films coated with silicones or fluorochemicals. It is also within the scope of this invention to use a second release coating which is placed over the final or top coating of the binder. This second release coating is typically present during the solidification of the binder, and can be removed afterwards.

The thermosetting binder material is typically applied in a liquid state or semi-liquid state to the drum. The application of the binder can be by any effective technique such as spraying, die coating, knife coating, roll coating, curtain coating, or transfer coating. For these coating techniques, the drum is typically rotated as the thermosetting binder is applied. For example, referring to FIG. 7, a thermosetting binder 72 can be applied by a curtain coater 74 set above the drum 76. As the drum 76 rotates, the thermosetting binder 72 is applied to the periphery 77 of the drum 76. It typically takes more than one rotation of the drum to obtain the proper coating of the thermosetting binder, such that the fibrous reinforcing material is fully coated and will be fully surrounded by organic binder material in the final product. The thermosetting binder 72 may also be heated to lower the viscosity and to make it easier to use in the coating process.

It is also within the scope of this invention to use more than one type of binder material. When this is done, the two or more types of binder materials, e.g., thermosetting binder materials, can be mixed together prior to the coating step, and then applied to the drum. Alternatively, a first binder material, e.g., a thermosetting resin, can be applied to the drum, followed by a second binder material, e.g., a thermoplastic material. If a thermosetting resin is used in combination with a thermoplastic material, the thermosetting resin may be gelled, or partially cured, prior to application of the thermoplastic material.

For thermosetting resins, the solidification process is actually a curing or polymerization process. The thermosetting resin is typically cured with either time or a combination of time and energy. This energy can be in the form of thermal energy, such as heat or infrared, or it can be in the form of radiation energy, such as an electron beam, ultraviolet light, or visible light. For thermal energy, the oven temperature can be within a range of about 30°–250° C., preferably within a range of about 75°–150° C. The time required for curing can range from less than a minute to over 20 hours, depending upon the particular binder chemistry employed. The amount of energy required to cure the thermosetting binder will depend upon various factors such as the binder chemistry, the binder thickness, and the presence of other material in the binder.

The thermosetting binder material is preferably only dried and in some instances partially solidified or cured before the abrasive particles are applied.

The fibrous reinforcing material can be applied to the outer periphery of the drum in several manners. Primarily, the particular method is dictated by the choice of fibrous material. A preferred method for applying a continuous individual reinforcing fibrous strand involves the use of a level winder. In this method, the drum is rotated while the reinforcing fibrous strand is initially attached to the drum, is pulled through the level winder, and is wound around the drum helically across the width of the drum, such that a helix is formed in longitudinal extension around the length of the drum. It is preferred that the level winder move across the entire width of the drum such that the continuous reinforcing fibrous strand is uniformly applied in a layer across the drum. In this embodiment, the strand is in a helically wound pattern of a plurality of wraps in a layer within the organic polymeric binder material, with each wrap of the strand parallel to the previous wrap of the strand.

If the level winder does not move across the entire width of the drum, the reinforcing fibrous strands can be placed in a specific portion of the article along the width of the seamless, endless article. In this way, regions in which reinforcing fibrous strands are present in one plane can be separated from each other without overlap. For advantageous strength, however, the fibrous reinforcing strands are in a continuous layer across the width of the belt.

The level winder can also contain an orifice such that as the fibrous strand proceeds through the orifice it is coated with a binder material. The diameter of the orifice is selected to correspond to the desired amount of binder.

Additionally, it may be preferable to wind two or more different yarns side by side on the level winder. It is also preferable to wind two or more different yarns at a time into the article. For example, one yarn may be made of fiberglass and another may be polyester.

A chopping gun can also be used to apply the fibrous reinforcing material. A chopping gun projects the fibers onto the resin material on the drum, preferably while the drum is rotating and the gun is held stationary. This method is particularly suited when the reinforcing fibers are small, i.e., with a length of less than about 100 millimeters. If the length of the reinforcing fiber is less than about 5 millimeters, the reinforcing fiber can be mixed into and suspended in the binder. The resulting binder/fibrous material mixture can then be applied to the drum in a similar manner as discussed above for the binder.

In certain methods of the present invention the binder may be applied to a rotating drum simultaneously with a fibrous reinforcing material. The binder will then typically wet the surfaces of the reinforcing material. In preferred applications of the present invention, the fibrous reinforcing material is coated with the binder and then the binder/fibrous material is applied to the drum.

If the fibrous material is in the form of a mat or web, such as a nonwoven or woven mat, the mat is applied by directing it from an unwind station and wrapping it helically around the drum as the drum rotates. Depending upon the particular construction desired, there can be more than one wrap of the fibrous mat structure around the drum. Preferably, there are at least two wraps of the fibrous mat in each "layer" of the fibrous mat structure. In this way a discreet seam in the layer is avoided.

The fibrous mat structure can be combined with the organic polymeric binder material in several manners. For example, the mat can be applied directly to the binder material that has been previously applied to the drum, the mat can be applied to the drum first followed by the binder material, or the mat and the binder material can be applied to the drum in one operation.

In preferred methods of the present invention, the fibrous mat structure is coated (preferably saturated) with the organic polymeric binder precursor material prior to application to the outer periphery of the drum. This method is preferred at least because the amount of binder material can be more easily monitored. This coating or saturation can be done by any conventional technique such as roll coating, knife coating, curtain coating, spray coating, die or dip coating.

Referring to FIG. 8, in a preferred method for preparing a fiber reinforced intermediate article (having binder which is only partially cured), the fibrous mat structure 82 is saturated with the organic polymeric binder material 84 as it is removed from an unwind station 85. The amount of binder material 84 applied is determined by a knife coater 86, in which a gap 88 in the knife coater controls the amount of polymeric binder material 84 applied.

The mat/liquid binder composition (82/84) is then applied to a drum 90 in at least one layer, i.e., such that the mat/liquid binder composition (82/84) is wrapped completely around the outer periphery of the drum at least once. Although the structure is seamless, there is a seam in the internal structure of an endless, seamless loop made in this manner. To avoid such a seam, it is preferable to wrap the mat/liquid binder composition (82/84) around the drum 90 at least twice. The binder precursor wets the surface of the fibrous mat structure prior to solidification such that upon curing a unitary, endless, seamless, construction is achieved.

If a layer of a continuous individual reinforcing fibrous strand is used as well, the process described above can be used in its application. Referring to FIG. 8, the method involves the use of a yarn guide system 91 with a level winder 92. In this method, the drum 90 is rotated while the reinforcing fibrous strand 94 is initially attached to the drum 90, is pulled through the level winder 92, and is wound around the drum 90 helically across the width of the drum, such that the layer of the strand 94 is no wider than the layer of the mat 82. It is preferred that the level winder 92 move across the width of the drum such that the continuous reinforcing fibrous strand 94 is uniformly applied in a layer across the width of the mat 82. Thus, the strand 94 is in a helically wound pattern of a plurality of wraps in a layer within the organic polymeric binder material, with each wrap of the strand parallel to the previous wrap of the strand. Furthermore, the individual wraps of the strand 94 are at a constant nonzero angle relative to the parallel side edges of the mat 82. Sufficient uncured thermosetting binder precursor 84 is applied to the mat 82 to provide a layer of resin at least above and below the reinforcing material, i.e., on the outer and inner surfaces of the loop. Furthermore, there is a layer of resin between the mat 82 and layer of fibrous strand 94, if sufficient resin is used.

Figure 8A:
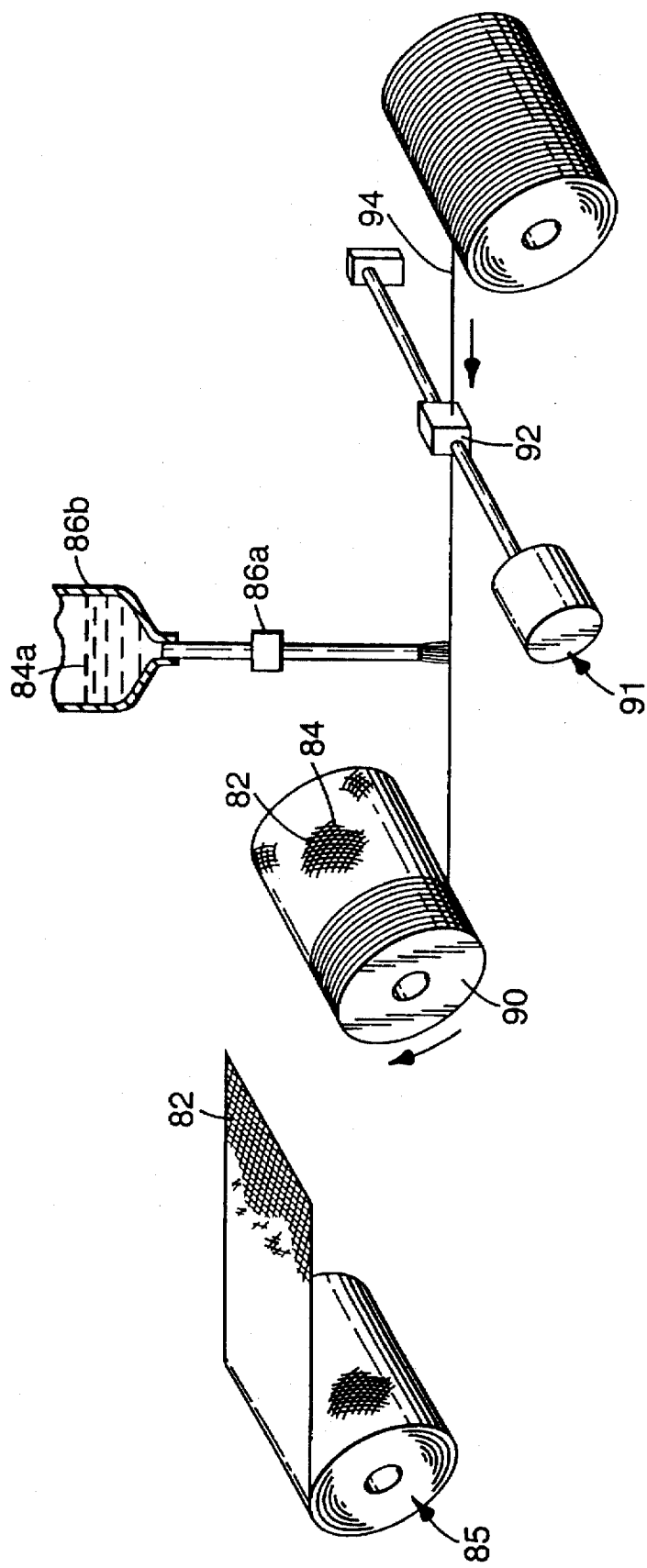
FIG. 8a is a schematic of a preferred process of the present invention for applying a thermosetting binder precursor to a reinforcing yarn which is subsequently wound onto a reinforcing mat such that they are both engulfed within the thermosetting resin.

FIG. 8A illustrates an alternative to the arrangement in FIG. 8, wherein the knife coater 86 in FIG. 8 may be removed and instead a metering pump 86a is employed to coat the strand 94. Typically and preferably a plurality of strands 94 (usually about 6 strands) are passed through a comb (not illustrated) and coated by a single flow from metering pump 86a, which draws thermosetting binder precursor 84a from container 86b. Typically flow rates of binder precursor to coat 6 strands range from about 20 to about 40 grams per minute.

FIG. 9 illustrates an alternative embodiment of a process for forming an intermediate endless, seamless fiber reinforced article. This process is similar to that shown in FIG. 8, but uses an alternative support structure. In this embodiment the process uses a conveyor unit 100. This particular procedure illustrates the general method of making an intermediate endless, seamless article utilizing a thermosetting binder material, although a thermoplastic material could also be used. The intermediate article is formed on a sleeve 102, i.e., in the form of a belt. The sleeve 102 is preferably a stainless steel sleeve. The stainless steel sleeve 102 can be coated with a silicone release liner, i.e., material, on the outer surface of the sleeve for easy removal of the endless, seamless loop formed. The sleeve 102 can be of any size desired. A typical example is in the form of a belt 0.4 mm thick, 10 cm wide, and 61 cm in circumference. This sleeve 102 is typically mounted on a two idler, cantilevered, drive system 104 that rotates the sleeve 102 at any desired rate. The drive system 104 consists of two drive idlers 106 and 108, a motor 110 and a belt drive means 112.

The procedures described herein with respect to forming an intermediate endless, seamless article on a drum apply also to the forming of an intermediate article on this conveyor unit 100. For example, analogously to the method discussed in FIG. 8, a nonwoven web 82 is saturated with a liquid organic binder material 84 by means of a knife coater 86. The resulting saturated material, i.e., mat/liquid binder composition (82/84) is then preferably wrapped twice around the outer surface, i.e., periphery, of the sleeve 102 as it rotates on the drive system 104, at a rate, for example, of 2 revolutions per minute (rpm). A single reinforcing fibrous strand 94 can then be wrapped over the saturated nonwoven web, i.e., mat/liquid binder composition (82/84) by means of a yarn guide system 91 with a level winder 92 that moves across the face of the drive idler 108 as the sleeve 102 rotates on the drive system 104. The sleeve 102 typically rotates at a speed of 50 rpm. This results in an intermediate with a distinct layer of fibrous reinforcing strands with a spacing of about 10 strands per cm of width. This strand spacing can be changed by increasing or decreasing the rate of rotation of the sleeve or by increasing or decreasing the speed of the yarn guide.

Figure 14:
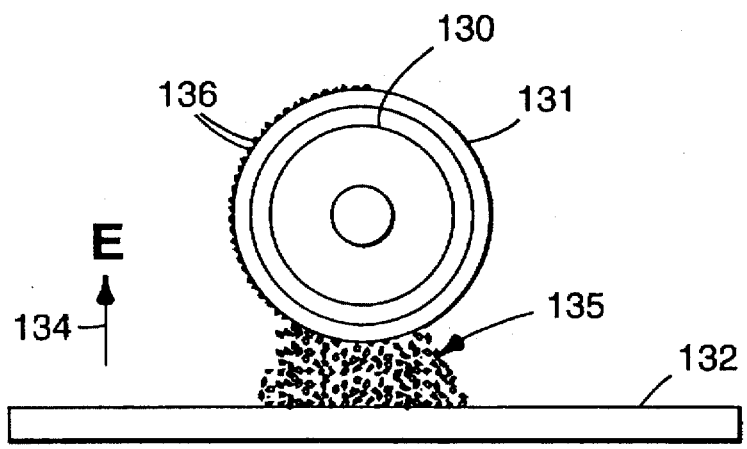
FIG. 14 is a side elevation view (reduced) of an apparatus useful for electrostatic projection of abrasive particles onto an article formed using the processes depicted in FIGS. 8 and 9.

After the intermediate article is formed by either of the methods illustrated in FIGS. 8 and 9, the intermediate article and drum are placed in an environment conducive to dry and/or partially cure the binder precursor. If a thermosetting binder precursor is employed, this generally entails placing the intermediate in a batch oven on rotating spindles, rotating the spindles at, for example 10 rpm, for a time and with the oven set at a temperature required for the particular binder precursor to partially cure. Afterwards, the drum and intermediate are removed from the oven and mounted on a rotating shaft above a hot plate covered with abrasive particles for electrostatically projecting the particles onto the intermediate, as illustrated in FIG. 14, where 130 represents the drum having intermediate article 131 thereon, drum 130 rotating above hot plate 132. An electric field E having lines of force 134 projects abrasive particles 135 onto the intermediate article, the drum acting as the ground plate. After application of abrasive particles, the drum and intermediate are placed in the oven again to more fully cure the binder precursor; alternatively, a size coating precursor is applied and then the intermediate and drum are placed in the oven to fully cure the binder precursor.

It is also within the scope of this invention to make non-uniform coated abrasives. In non-uniform articles there will be at least two distinct regions where the composition and/or amount of materials are not uniform. This non-uniformity can either be throughout the length of the article, the width of the article, or both the length and width of the article. The composition non-uniformity can be attributed to either the binder material 13, the fibrous reinforcing material or any optional additives. The non-uniformity can also be associated with different materials in different regions of the article or the lack of a material in certain regions of the article.

Figure 10:
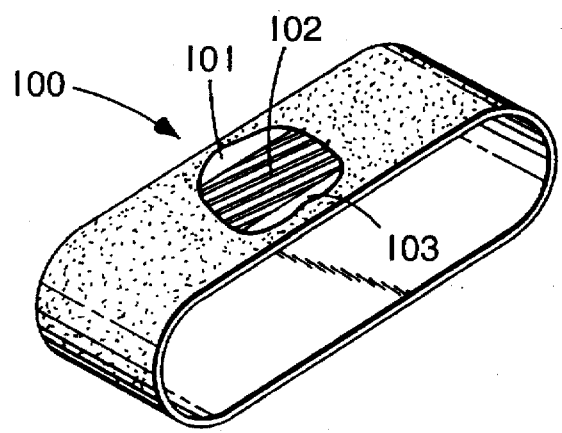
FIG. 10 is a perspective view (with parts broken away) of another embodiment of an endless, seamless coated abrasive of the invention wherein reinforcing yarns are located only near the center of the article.
Figure 11:
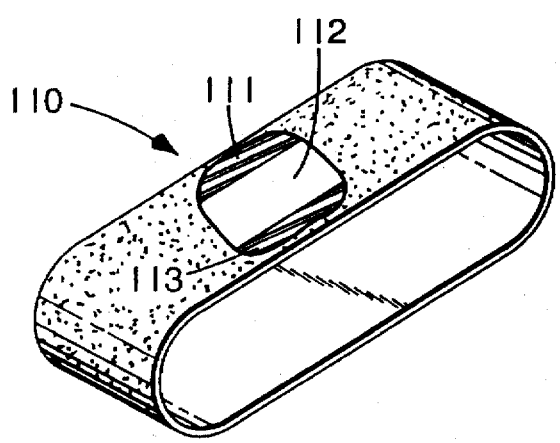
FIG. 11 is a perspective view (with parts broken away) of still another embodiment of an endless, seamless abrasive article wherein reinforcing yarns are located only at the edges of the loop.
Figure 12:
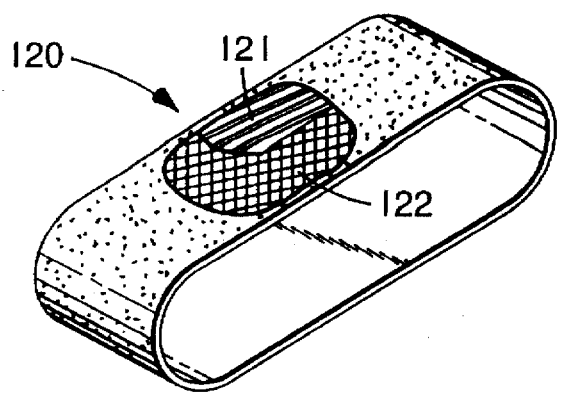
FIG. 12 is a perspective view (with parts broken away) of yet another embodiment of an endless, seamless coated abrasive wherein one region comprises a binder, a reinforcing strand and a reinforcing mat, and the second region comprises only a binder and a reinforcing mat.

FIGS. 10 through 12 illustrate three embodiments of non-uniform coated abrasives. Referring to FIG. 10, the coated abrasive 100 has three regions 101, 102, 103. The center 102 has a reinforcing yarn, whereas the adjacent regions 101 and 102 do not have reinforcing yarns. Regions 101 and 102 are made solely of binder material 13 of FIG. 1. The resulting coated abrasive will tend to have more flexible edges. Referring to FIG. 11, the coated abrasive 110 has three regions, 111, 112 and 113. Center 112 of the article is made essentially of only the binder 13 (FIG. 1), the regions adjacent to center region 111 and region 113 comprise binder and reinforcing material. Referring to FIG. 12, coated abrasive 120 has two regions 121 and 122. In region 122, the article comprises binder, reinforcing strands and a reinforcing mat. In region 121, the article comprises only binder and reinforcing fibers. There are many combinations of binder, reinforcing strands, reinforcing mats, additives and the amounts of such materials. The particular selection of these materials and their configuration is dependent upon the desired application for the coated abrasive. For instance, the coated abrasive described above and illustrated in FIG. 10 may have applications for an abrading operation where it is desired to have flexible edges on the coated abrasive. The coated abrasive described above and illustrated in FIG. 11 may have applications for abrading operations in which it is desired to have strong edges to prevent the edges from tearing.

There are many different methods to make a non-uniform coated abrasive. In one method, the level winder only winds the fibrous strands in certain regions on the outer periphery of the drum. In another method, a chopping gun places the reinforcing material in certain regions. In a third method, the reinforcing yarns are unwound from a station and wound upon the drum in only certain regions. In still another approach, the binder material is only placed or coated on certain regions of the drum. It is also within the scope of the invention to use a combination of all of the different approaches.

There are several ways in which the optional additives can be applied. The method of application depends upon the particular components. Preferably, any additives are dispersed in the binder prior to the binder being applied to the drum. In some situations, however, the addition of additive to the binder results in either a thixotropic solution or a solution that has too high a viscosity to process. In such a situation, the additive is preferably applied separately from the binder material. For example, the binder material can be applied to the drum first, and while it is in a "tacky" state, additives can be applied. Preferably, the drum with the binder material rotates while the additive is either drop coated onto the drum or projected onto the drum. With either method, the additive can be uniformly applied across the width of the drum or concentrated in a specific area. Alternatively, the additive(s) can be applied to the fibrous reinforcing material, and the fiber/additive(s) combination can be applied to the drum.

If the viscosity of the binder precursor is too low, then during further processing of the abrasive article, the binder precursor will tend to flow or "run". This flow is undesirable and may cause the placement and orientation of the abrasive particles, or even the reinforcing fibers, to shift. If the viscosity of the binder precursor is too high, then the binder precursor may not adequately wet the reinforcing fibers. A preferred viscosity range is between about 500 to 20,000 centipoise, more preferably between about 1,000 and 5,000 centipoise, and most preferably between about 1,500 to 3,000 centipoise, measured at room temperature using a Brookfield model DV-1T viscometer at 30 rpm and room temperature (20°–25° C). The viscosity may be adjusted by the amount of solvent (the % solids of the resin) and/or the chemistry of the starting resin. Heat may also be used to lower the resin viscosity, and may additionally be applied during the processes of the invention to effect better wetting of the binder precursor onto the reinforcing fibers. However, the amount of heat should be controlled such that there is not premature solidification of the binder precursor.

To make the endless, seamless coated abrasives of the present invention, there should be enough binder material present to completely wet the surface of the fibrous reinforcing material and additives, and provide an anchoring mechanism for the abrasive particles. Additionally, there should be enough binder material present such that the binder material seals the non-abrasive surface and provides a relatively "smooth" and uniform non-abrasive surface, as discussed previously.

In preparation of a coated abrasive belt of the present invention, the intermediate article having abrasive particles thereon but no size coating can be installed around two drum rollers, which are connected to a motor for rotating the article. Alternatively, the intermediate can be installed around one drum roller, which is connected to a motor for rotating the article. Preferably, this drum roller can be the same as the drum used in the preparation of the previous intermediates. As the intermediate and drum rotate, the size adhesive precursor coating may be applied by any conventional coating technique such roll coating, spray coating, or curtain coating. Spray coating is preferred for certain applications. The adhesive layer(s) can then be fully solidified while the article is still on the drum rollers. Alternatively, the resulting product can be removed from the drum rollers prior to solidification of the adhesive layer(s).

If the binder is a thermoplastic material, several different methods that can be used to apply a thermoplastic binder to a hub, i.e., drum roller. For example, a solvent can be added to the thermoplastic binder such that the thermoplastic can flow. In this method the thermoplastic binder can be applied to the hub by any technique such as spraying, knife coating, roll coating, die coating, curtain coating, or transfer coating. The thermoplastic binder is then solidified by a drying process to remove the solvent. The drying conditions will depend upon the particular solvent employed and the particular thermoplastic binder material employed. Typical drying conditions include temperatures within a range of about 15°–200° C., preferably 30°–100° C.

Alternatively, the thermoplastic binder can be heated above its softening point, and preferably above its melting point, such that it can flow. In this method, the thermoplastic binder material can be applied to the hub by any technique such as spraying, knife coating, roll coating, die coating, curtain coating, or transfer coating. The thermoplastic material is then solidified by cooling.

In a third method, the thermoplastic binder material can be applied in a solid or semi-solid form. This method is preferred for certain applications of the present invention. Typically, a segment of a thermoplastic material is cut and applied to the drum. The fibrous reinforcing material and any additives or other components are then applied to the hub. A second segment of a thermoplastic material is then applied over the fibrous reinforcing material. The hub/thermoplastic material are then heated to above the softening point, and preferably to above the melting point, of the thermoplastic binder material such that the thermoplastic binder flows and fuses all the binder, fibrous reinforcement, and optional ingredients. The thermoplastic binder material is then cooled and resolidified.

Elastomeric binders can be solidified either via a curing agent and a curing or polymerization process, a vulcanization process or the elastomeric binder can be coated out of solvent and then dried. During processing, the temperatures should not exceed the melting or degradation temperatures of the fibrous reinforcing material.

In certain coated abrasive embodiments of the invention, a material such as cloth, polymeric film, vulcanized fiber, nonwoven, fibrous reinforcing mat, paper, etc., treated versions thereof, or combinations thereof can be laminated onto the coated abrasive. In certain abrading applications the back side of the coated abrasive should have a low coefficient of friction during use, such as abrading applications that are used with a platen. In these applications, a cellulosic nonwoven such as paper can form the back side of the coated abrasive. During the batch manufacturing processes described above, a paper substrate is helically wound upon the support drum. Next, the binder precursor and the reinforcing fibers (nonwoven and/or reinforcing yarns) are applied over the paper. The binder precursor will flow and fill in between the gaps of the helically wound nonwoven. The remainder of the steps to form the coated abrasive are essentially the same as previously described. The paper may or may not be treated. In many cases, the paper will contain some type of treatment to either saturate or seal the paper.

Figure 18:
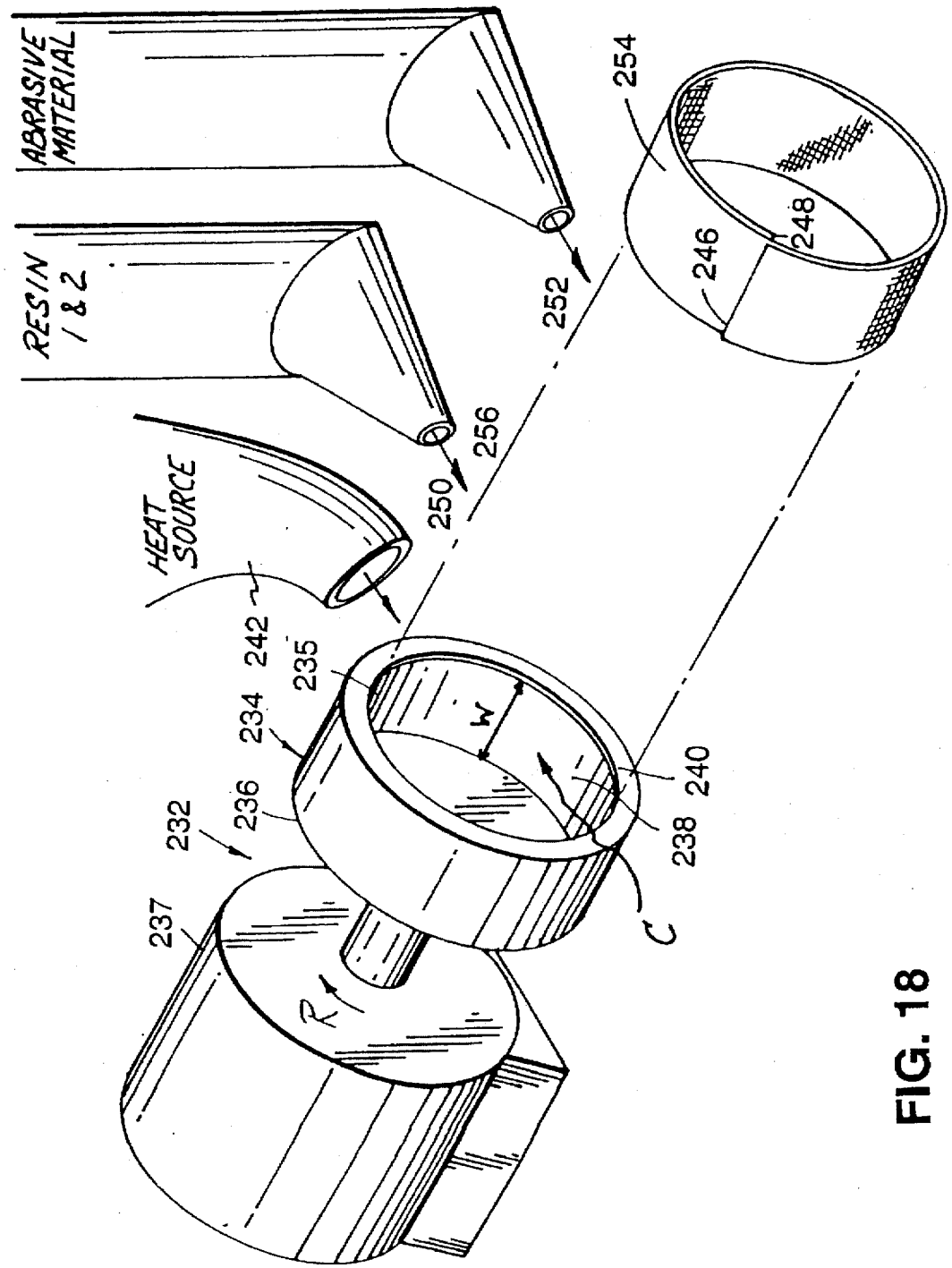
FIG. 18 is a perspective view of an alternative method and the equipment used therein.

The following is a description of some of the basic equipment used in yet other inventive methods described herein that use the interior of a drum to prepare an endless, seamless backings and belts. FIGS. 15, 18, and 20 show a spin caster 232 having a drum 234 that is attached to a motor 237. A speed control (not shown) is attached to the motor 237 to control the rate of rotation of the drum 234. The drum 234 has an open end 235, a closed end 236, and an interior surface 238 that is preferably substantially smooth (as illustrated), although patterned interior surfaces may be used (such as in methods wherein abrasive particles are first placed in the drum and the drum rotated slowly to insert and hold the grains in the pattern by centrifugal force). The motor 237 and the drum 234 are positioned such that the rotational axis of the drum 234 is horizontal. A retaining lip 240 is provided adjacent the open end 235 of the drum to retain the materials used in the inventive method within the drum 234.

The dimensions of the drum 234 generally correspond to the dimensions of the substrate or the abrasive belts that will be produced. An interior circumference C of the drum 234 (along interior surface 232), will generally correspond to the length of the substrate or the abrasive belt. The width of the substrate or abrasive belt can be of any value less than or equal to the inside width W of the drum 234. Accordingly, a single substrate or belt can be made within the drum 234. Additionally, the substrate or abrasive belt can be slit longitudinally into multiple substrates or belts which have a width substantially less than the original substrate or belt produced by the inventive method.

As will be discussed below, heating materials is a step that may be used in the inventive methods herein. Therefore, a heat source 242 is disposed adjacent the drum 234 such that materials disposed adjacent the interior surface 238 of the drum 234 can be heated.

In many instances, it is preferred that a release coating be applied to the interior surface 238 of the drum 234 before any materials are inserted into the drum 234. This provides for easy release of the substrate or belt after the substrate or belt is solidified. In most instances, this release coating will not become part of the substrate or belt. Examples of such release coatings include, but are not limited to, silicones, fluorochemicals, or polymeric films coated with silicones or fluorochemicals.

FIGS. 15 and 16 illustrate one preferred method of the present invention which produces either a flexible, endless, seamless substrate or a flexible, endless, seamless abrasive belt. This particular method involves inserting fibrous material such as a fibrous mat or scrim 244 within the drum 234 adjacent the interior surface 238. Preferably, the scrim 244 should have a width W' that is the same as or less than the inside width W of the drum. In addition, the length $L_s$ of the scrim 244 should be such that the scrim 244 can be wrapped inside the drum 234 in a double-layered configuration. Drum 234 is then rotated in the direction R at a desired speed (such as 3,500 rpm) for a few seconds to insure that the scrim 244 is pressed evenly against the interior surface 238. As seen in FIG. 16, the length of the scrim 244 is such that two ends 246 and 248 of the scrim 244 form an abutment relationship, wherein the ends 246 and 248 do not overlap, nor do they leave a gap. Alternatively, the length can be such that the scrim 244 can be wrapped more than twice within the drum 234. Thus, the step of inserting material adjacent the interior surface of the drum comprises providing a fibrous mat structure having two ends and a length that is twice as large as an inner circumference of the drum, and inserting the mat structure within the drum in a double-layered configuration such that the two ends of the mat structure are positioned adjacent each other. However, a thicker than desired substrate or belt may be formed if the scrim 244 is wrapped more than twice. If only a single layer of scrim 244 is used, a weak point may form where the two ends 246 and 248 abut.

As seen in FIG. 15, the rate of rotation of the drum 234 in this preferred method is reduced to approximately 20% of its maximum speed after the scrim 244 is properly positioned adjacent the interior surface 238. The drum speed is reduced to permit the insertion of an organic binder precursor 250 in the drum, preferably adjacent the scrim 244. The amount of binder precursor 250 that is inserted within the drum 234 is dependent upon a number of factors, including the area of the interior surface 238, the type of binder precursor resin used, and the type of scrim that is used.

Once the binder precursor 250 is inserted within the drum 244, the speed of the drum 244 is increased to nearly its maximum rate (for example 3,450 rpm). The rotation of the drum creates centrifugal forces which distribute the binder precursor 250 evenly about and throughout the scrim 244, such that the scrim 244 is entrapped within the binder precursor 250. Preferably, the scrim 244 is completely encapsulated or engulfed by the binder precursor 250.

A preferred method comprises combining these first two steps (inserting fibrous material and subsequently the binder precursor). This can be done by spraying or otherwise applying a composition (preferably a slurry) of fibrous material and binder precursor into the drum. Accordingly, this method of preparing a flexible, endless, seamless abrasive belt includes the steps of inserting a mixture comprising an abrasive agent and a flowable organic binder precursor within a drum and rotating the drum such that centrifugal forces distribute the mixture uniformly about an interior surface of the drum to form an exterior layer, the interior surface defining a belt width and a belt length. This method further includes the steps of inserting a fibrous material adjacent the exterior layer, providing additional flowable organic binder precursor adjacent the reinforcing material, and rotating the drum such that centrifugal forces distribute the additional organic binder precursor evenly about the reinforcing material. The organic binder precursors are then exposed to conditions sufficient to solidify the organic binder precursors such that a flexible, endless, seamless abrasive belt is formed having a fibrous material embedded within the binders.

The method typically further includes the steps of removing the abrasive belt from the drum and treating the exterior layer to form an abrasive layer. Alternatively, the method can further include the step of inserting an abrasive agent (i.e., abrasive material) in the drum so that upon hardening of the binder precursor an abrasive layer is formed upon the inner surface of the flexible, endless, seamless substrate. This method further comprises the step of inverting the flexible, endless, seamless substrate, once removed from the drum, such that the abrasive layer is facing outwardly to thereby form a flexible, endless, seamless abrasive belt. The exterior layer of the belts may be immediately dressed, or dressed prior to use, to expose an abrasive layer. "Dressing" is an abrasives industry term used to describe a procedure used to expose abrasive particles, and may be accomplished by any of a variety of methods, typically using a dressing bar or wheel. Dressing bars typically consist of rows of abrasive industrial diamonds or hard ceramic particles referred to in the abrasives art as "superabrasives." Dressing wheels may also be employed, consisting of ceramic vitrified wheels. The dressed abrasive belts may then have coated on the abrasive layer a supersize coating, such as an aqueous epoxy resin having grinding aid dispersed therein.

Specifically, referring again to FIG. 15, abrasive material such as an abrasive mineral 252 is added after binder precursor 250 is evenly distributed about scrim 244. The amount of mineral inserted is dependent upon a number of factors including the area of drum interior surface 238. The resin in binder precursor 250 will begin to cure while it is being rotated within drum 234. Accordingly, abrasive mineral 252 should be added while binder precursor 250 is still in a flowable state to insure that the abrasive mineral properly adheres to binder precursor 250.

Figure 17:
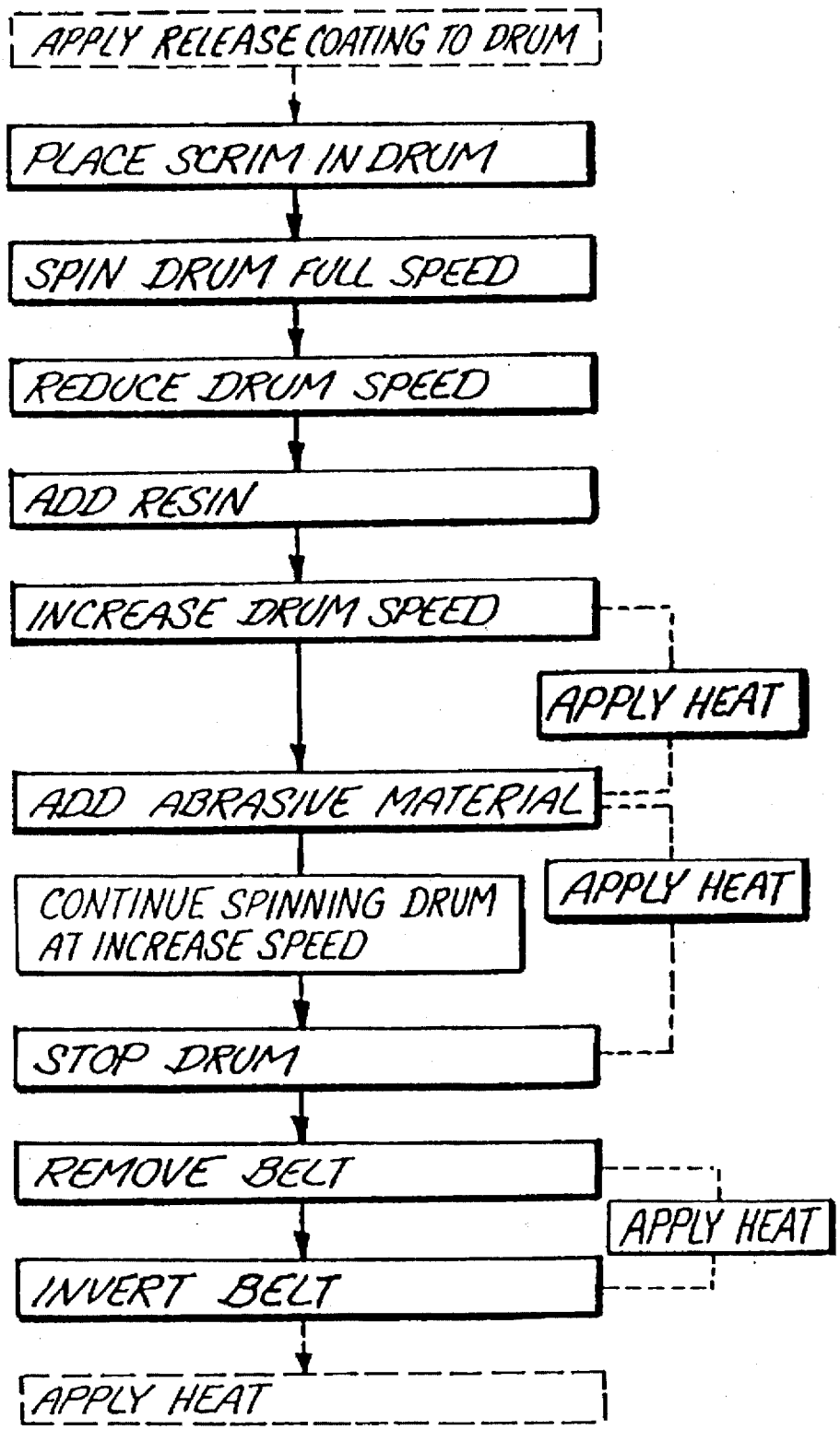
FIG. 17 is a flow chart of the inventive method shown in FIG. 15.

Drum 234 continues to spin at a high speed after abrasive mineral 252 is placed within drum 234. It has been found that drum 234 should continue rotating for a sufficient time (typically at least 45 minutes) after inserting abrasive mineral 252 to insure that abrasive mineral 252 properly adheres to binder precursor 250. Heat may be directed toward interior surface 238 via the heat source 242 to increase the rate at which the resin(s) in the binder precursor cures. Accordingly, as seen in FIG. 17, heat may be applied at various times to insure that the substrate or belt is properly formed and cured. Preferably, heat should be applied during the continued rotation of drum 234 such that the belt can be handled by an operator immediately after the rotation of the drum is stopped.

Drum 234 can be stopped after abrasive mineral 252 is sufficiently adhered to the binder precursor 250, which is now a "binder." An excess amount of abrasive mineral 252 may be present within drum 234 after drum 234 has stopped rotating. This excess mineral should be removed from the drum 234. The flexible, endless, seamless abrasive belt can be removed from drum 234 once the binder precursor 250 is sufficiently cured such that the belt can be handled by an operator. The belt may need to be post-cured at an elevated temperature after the belt has been removed from drum 234. The abrasive layer that is formed by the abrasive mineral 252 during this preferred method is formed upon the inner surface of the belt as it rests within drum 234. Accordingly, the flexible, endless, seamless belt made in accordance with this method must be inverted after it is removed from drum 234 such that the abrasive minerals 252 are positioned on the outer circumference of the belt.

The above-described preferred method of the invention employs a variable rpm motor/drum arrangement. It is feasible to use another preferred method wherein a single speed "on/off" motor having a rotational speed of about 1750 rpm is used. In this method the fibrous material is rolled such that about ½ the length is a double layer. This rolled fibrous material fits through the opening of the drum. After placing the rolled fibrous material into the drum the motor is turned on, thus forcing the fibrous material against the internal surface of the drum by centrifugal force. If the motor is stopped before binder precursor resin is introduced into the drum, the fibrous material may come away from the internal surface of the drum, but is easily returned once the motor is started and the drum rotated again. Binder precursor resin is added while the motor spins the drum, and, once wetted, the fibrous material remains in place adjacent to the interior surface of the drum. Abrasive particles may be added either to the binder precursor resin before application to the fibrous material, or after the binder precursor resin is applied to the fibrous material, to form a flexible, endless, seamless abrasive belt. These belts are typically dressed before use by any of a variety of methods, typically using a dressing bar, as is known in the art.

The methods described above produce a flexible, endless, seamless abrasive belt. The flexible, endless, seamless substrate can be attained by eliminating the step of adding an abrasive mineral 252. Accordingly, the flexible, endless, seamless coated abrasive belt made using the interior of a drum can be made using conventional make and size coatings. This method comprises: inserting a composition comprising a fibrous material adjacent an interior surface of a drum, the interior surface defining a substrate width and a substrate length; rotating the drum such that centrifugal forces distribute the fibrous material about the interior surface of the drum; while the drum is rotating, pouring a liquid composition comprising an organic binder precursor into the drum such that centrifugal forces distribute the composition about the fibrous material; exposing the composition to conditions to solidify the organic binder precursor to form a binder such that a flexible, endless, seamless backing is formed having an outer surface formed adjacent the interior surface of the drum, an inner surface opposite the outer surface and the fibrous material embedded in the partially hardened binder; removing the backing from the drum; slipping the backing over a mandrel; while rotating the mandrel; applying a make coating binder precursor to the backing; and applying a plurality of abrasive particles to the make coating binder precursor; exposing the make coating binder precursor to conditions sufficient to at least partially solidify the make coating binder precursor; while rotating the mandrel, applying a size coating binder precursor over the make coating binder precursor and abrasive particles; and exposing the make coating binder precursor and the size coating binder precursor to conditions sufficient to substantially solidify the make and the size coating binder precursors to form make and size coatings.

Although this invention has been described using a fibrous scrim 244, it is within the scope of the invention to use other fibrous materials that are not in a mat or scrim structure. Furthermore, although this invention has been described using a liquid resin, the organic binder precursor can be a solid. Accordingly, the step of applying an organic binder precursor adjacent the fibrous material comprises the steps of placing a first layer of a composition comprising a first solid organic polymeric binder material within the drum adjacent the interior surface of the drum. A fibrous material is then placed adjacent the first layer of the solid organic polymeric organic binder material. A second layer of a second composition comprising a second solid organic polymeric binder material is then placed within the drum such that the fibrous material is positioned between the first and second compositions. The first and second compositions are then heated sufficiently to form first and second organic binder materials in a flowable state.

Unlike previously known methods, these methods of forming a belt inside a drum produce a belt or a substrate that has a substantially uniform thickness throughout its width and length. Furthermore, the substrate or belt produced by these methods possesses a generally uniform tensile strength and high stretch resistance in the longitudinal, i.e., length direction because the fibrous material extends along the entire length of the substrate or belt and because there is no seam. In addition, these methods can produce an abrasive belt in essentially one single process, unlike the conventional methods which require providing a substrate, coating a make resin layer, coating abrasive minerals thereon, partially curing the make resin layer, coating a size resin layer, and then curing the make and size resin layers. However, it is within the scope of the present invention to use the backings and abrasive belts of the invention as backings for conventional coated abrasives wherein abrasive particles are adhered to the backing or belt of the invention by make and size coatings.

EXAMPLES

The present invention will be further described by reference to the following detailed examples, in which all parts and percentages are by weight unless otherwise noted. The following designations are used throughout for Examples –12 and Comparative Examples A and B.

PET1NW=a spunbonded polyester nonwoven mat approximately 0.127 mm thick and weighed approximately 28 g/m$^2$; it was purchased from the Remay Corporation, Old Hickory, Tenn., under the trade designation "Remay", style 2275;

PET=polyethylene terephthalate film having a thickness of 5 mils (0.127 mm);

CAT=complex of methylene dianiline and sodium chloride dispersed in dioctyl phthalate; this material was purchased from Uniroyal Chemical Co., Inc., Middlebury, Conn., under the trade designation "Caytur 31";

LR1=a carboxyl terminated butadiene acrylonitrile copolymer commercially available from BF Goodrich, Cleveland, Ohio, under the trade designation "Hycar 1300X31", having a molar acrylonitrile content of 10 percent, a carboxyl content acid number of 28 (equivalents per hundred rubber), a functionality of 1.9, a number average molecular weight of 3,800, and a glass transition temperature measured by differential scanning calorimetry of –66° C.;

UR1=a ketoxime-blocked poly-1,4-butylene glycol diisocyanate having a molecular weight of about 1500 commercially available from Uniroyal Chemical Corp. under the trade designation "BL-16";

ER1=a diglycidyl ether of bisphenol A epoxy resin commercially available from Shell Chemical Co., Houston, Tex., under the trade designation "Epon 828";

ACA=an anhydride curing agent commercially available from Anhydrides and Chemicals Inc., Newark, N.J., under the trade designation "AC-39";

CA1=2,4,6-tri(dimethylaminomethyl)phenol, an epoxy curing accelerator commercially available from Air Products and Chemicals, Allentown, Pa., under the trade designation "DMP-30";

VIB=polyether based toluene diisocyanate terminated prepolymer polyurethane elastomer commercially available from Uniroyal Chemical Co., Inc., Middlebury, Conn., under the trade designation "Vibrathane B-813";

CMD=a diglycidyl ether of bisphenol A epoxy resin coatable from water and was approximately 55% solids; this epoxy resin was purchased from Hi-Tek Polymers, Jeffersontown, Ky., under the designation of "CMD 35201";

ERC=25% solids aqueous solution of 2-ethyl-4-methyl imidiazole, commercially available from Air Products, Allentown, Pa., under the trade designation "EMI-24";

SOL=an organic solvent which is a blend of light aromatic hydrocarbons known under the trade designations "Aromatic 100" and "Shell CYCLO SOL 53 Solvent", commercially available from Worum Chemical Co., St. Paul, Minn.;

GEN=a very low viscosity 100% solids amidoamine resin, known under the trade designation "Genamid 747", from Henkel Corporation, LaGrange, Ill., characterized by a theoretical amino hydrogen equivalent weight of 95, an amine value of 462 milligrams KOH/ gram resin, and a density of 7.8 pounds per gallon (0.12 grams/cm$^3$); and PS=a 15/85 blend of water and propylene glycol monomethyl ether commercially available from Worum Chemical Co., St. Paul, Minn., under the trade designation "Polysolve".

General Procedure for Preparing an Endless, Seamless Coated Abrasive According to Examples 1–12 and Comparative Examples A and B This procedure illustrates the general method of making an abrasive article in which the binder precursor serves to engulf the reinforcing fibers and secure the abrasive particles to the article.

The article was formed over an aluminum hub which had a diameter of 19.4 cm and a circumference of 61 cm. The aluminum hub had a wall thickness of 0.64 cm and a width of 61 cm. It was installed on a 7.6 cm mandrel that rotated by a DC motor and was capable of rotating from 1 to 120 revolutions per minute (rpm). Over the periphery of the hub was a 0.05 millimeter thick silicone coated polyester film, which acted as a release surface. This silicone coated polyester film was not a part of the final article. The final dimension of the abrasive was 53 cm wide by 61 cm long.

A nonwoven web approximately 3.8 cm wide was saturated with a binder precursor by means of a 5 cm wide knife coater with a gap setting of 0.23 mm. The knife coater was attached to a level winder and the nonwoven was helically wrapped onto the hub while the hub rotated at 5 rpm. Two layers of nonwoven were wrapped over the hub, the second layer was 180 degrees out of phase with the first. The adjacent wraps were applied such that they did appreciably overlap and the gap was less than 1 mm. Next, reinforcing strands or yarns were applied into the make coat precursors saturated nonwoven. The strands were first run through a tensioner and then wound through a comb, two at a time. The reinforcing fibrous strands were wrapped over the saturated nonwoven web by means of a yarn guide system with a level winder that moved across the face of the hub at a rate of 10 cm per minute. During this process, the hub rotated at 120 rpm. This resulted in the spacing of the reinforcing strands of 24 strands per cm of width. The reinforcing strands were normally of different materials. The strand spacing was changed by the increase or decrease in the speed of the yarn guide. After strands were wound in over the width of the hub, the hub was removed and placed in a batch oven on a rotating spindles. The spindles rotated at 10 rpm. The hub was kept in the oven for 5 minutes at 110° C.

Afterwards, the hub was removed from the oven and mounted on a rotating shaft above a hot plate that was covered with abrasive particles. The hub acted as the ground plate. The abrasive particles had an average particle size of 286 micrometers (ANSI grade 60) and was a 15/85 blend of fused aluminum oxide and ceramic aluminum oxide. The ceramic aluminum oxide was made according to the teachings of U.S. Pat. Nos. 4,314,827 and 4,881,951, and is available from Minnesota Mining and Manufacturing Co., St. Paul, Minn. ("3M") under the trade designation "Cubitron 321". The abrasive particle blend was performed according to U.S. Pat. No. 4,734,104. The total abrasive particle weight was about 600 g/m². As the hub rotated at 10 rpm during the activation of the electric field which coated the abrasive particles into the make coat precursor. After coating, the resulting construction was removed and placed in a batch oven on rotating spindles for 30 minutes at 100° C.

Next, the hub was mounted on a rotating shaft that rotated at 40 rpm. A size coat precursor was sprayed over the abrasive particles/make coat. The size coat precursor was 72% solids diluted with a 90/10 mixture of water and PS. The size coat precursor consisted of 32 parts of a resole phenolic resin, 66 parts of cryolite and 2 parts of iron oxide colorant. The size coat precursor weight was about 340 g/m². After spraying, the coated abrasive received a thermal cure of 60 minutes at 88° C.

After this thermal cure, the hub was remounted on the spray system and a supersize coating was sprayed over the size coat. The supersize coating consisted of 17 parts of CMD, 76 parts potassium tetrafluoroborate filler, 3 parts thickener, 2 parts iron oxide, 2 parts ERC. The overall supersize was 72% solids in water. The supersize wet weight was about 150 g/m². The resulting construction was then thermally cured for 60 minutes at 88° C. and a final cure of 10 hours at 105° C. Prior to testing, the resulting coated abrasive was flexed by running over a 2.5 cm support bar and a raised spiral bar.

EXAMPLES 1–12

This set of examples compared various coated abrasive constructions. The coated abrasives were made according to the General Procedure for Forming the Endless, Spliceless Coated Abrasive and were tested according to Test Procedure I. The test results can be found in Table 1.

EXAMPLE 1

The nonwoven mat was PET1NW and the make coat precursor consisted of 60% VIB, 28.5% CAT, 1.5% iron oxide colorant. The binder precursor was diluted to 90% with SOL. The two alternating reinforcing fibers were 235 denier nylon multifilament yarn, commercially available from DuPont, Wilmington, Del. under the trade designation "DuPont Nylon, style 728 (210-34-R20)". The other alternating yarn was a fiberglass bobbin yarn 15000 yield, commercially available from PPG Industries Inc., Pittsburgh, Pa. under the trade designation of "ECG 150 1/0 0.7Z", style 930. The fiber spacing was 24 fibers per cm of width. The ratio of binder precursor to fibrous reinforcement was 4 to 1 (i.e., 80 weight percent binder precursor).

EXAMPLE 2

The coated abrasive of Example 2 was made in a similar manner to Example 1, except that the size coating precursor weight was 400 g/m².

EXAMPLE 3

The coated abrasive of Example 3 was made in a similar manner to Example 1, except that the binder precursor was not thermally heated for five minutes prior to the application of the abrasive particles.

EXAMPLE 4

The coated abrasive of Example 4 was made in a similar manner to Example 1, except that a layer of barrier coated A weight paper was wrapped around the hub prior to the first layer of the binder precursor coated nonwoven. This A weight paper had a weight of 70 g/m² and remained a part of the finished article.

EXAMPLE 5

The coated abrasive of Example 5 was made in a similar manner to Example 1, except that a layer of 3 mil (76 micrometer) thick polyester film having an ethylene acrylic acid copolymer primer was wrapped around the hub prior to the first layer of the binder precursor coated nonwoven. This film remained a part of the article.

EXAMPLE 6

The coated abrasive of Example 6 was made in a similar manner as Example 4, except that no reinforcing fibers were wound on top of the two layers of saturated nonwoven.

EXAMPLE 7

The coated abrasive of Example 7 was made in a similar manner of Example 1 except that three layers of nonwoven were used and no reinforcement fibers were wound in. Additionally, the abrasive particle weight was 1050 g/m².

EXAMPLE 8

The coated abrasive of Example 8 was made in a similar manner of Example 7 except there was no size coating precursor applied. After, the binder precursor was cured for 30 minutes at 88° C., the supersize coating precursor was sprayed over the abrasive particles and the make coat. Next, the resulting construction was thermally cured for one hour at 115° C., followed by flexing.

EXAMPLE 9

The coated abrasive of Example 9 was made in a similar manner of Example 1 except the size coating precursor was sprayed over the abrasive particles/binder precursor before the binder precursor was cured.

EXAMPLE 10

The coated abrasive of Example 10 was made in a similar manner of Example 1 except that the binder precursor consisted of 37.5 parts of UR1, 12.5% of solution of 35% methylene diamine/65% 1-methoxy-2-propyl acetate, 33% ER1 and 17% GEN. The binder precursor was diluted to 90% solids with SOL.

EXAMPLE 11

The coated abrasive of Example 11 was made in a similar manner of Example 1 except that the binder precursor consisted of 32 parts of ER1, 50 parts ACA, 7 parts LR1, 1 part AC. The binder precursor was diluted to 93% solids with SOL.

EXAMPLE 12

The coated abrasive belt for this Example 12 was made on the same equipment as Example 1. The binder precursor was a polyurethane thermoplastic. A 30 cm wide layer of solid polyurethane, 0.13 millimeters thick (known under the trade designation "HPR625FS" from Stevens Elastomers Corp, Northampton, Mass.) was helically wrapped on the hub. The reinforcement fibers were wound on top of this layer. A second layer of polyurethane was helically wrapped on top of the fibers. The hub was placed in an oven at 210° C. for 30 minutes. The abrasive particles were preheated to 210° C. and uniformly drop coated into the peripheral layer of the thermoplastic polyurethane. The hub was then removed from the oven and processed in a similar as Example 1 for size and supersize coatings.

Comparative Example A

Comparative Example A was a commercially available spliced coated abrasive belt from 3M under the trade designation "3M 777F Regalite Polycut Resin Bond" cloth. This product comprised standard calcium carbonate filled phenol formaldehyde resins as make and size coatings and a KBF₄/epoxy supersize coating, and employed 286 micrometer average particle size ceramic aluminum oxide abrasive particles blended with fused alumina known under the trade designation "Cubitron 321", from 3M. The abrasive particles of the is product were present as a substantially continuous coating, i.e., there was no pattern of abrasive particles.

Comparative Example B

The coated abrasive for Comparative Example B was made in a manner similar to Example 1 except that the binder precursor did not adhere the abrasive particles to the article. An additional coating was applied between the binder and the abrasive particles. After the article was formed as in Example 1 and thermally heated for 30 minutes at 110° C. an additional coating was sprayed over the article. This additional coating was a standard calcium carbonate filled resole phenol-formaldehyde. Next, the abrasive particles were electrostatically coated. The remaining steps to form the abrasive article are essentially the same as Example 1.

Grinding Test Procedure for Examples 1–12 and Comparative Examples A–B

The coated abrasive belt (1.3 cm by 61 cm) was installed on a air powered abrasive belt machine (model #11000, from Dynabrade Inc. Clarence, N.Y.). This belt machine had a 1" diameter×⅜" wide (2.54 cm×0.95 cm), radiused rubber contact arm, Model #11219, also available from Dynabrade. A 14" long by 3" wide by ½" thick (35.56 cm×7.62 cm×1.27 cm) 304 stainless steel bar was placed in a vise. Half moon shape cut was ground into the bar across the ½" (1.27) dimension, about 1" (2.54 cm) wide. The belt was used to grind the ½" (1.27 cm) wide surface continuously for 5 minutes or until the belt failed. The grinding pressure used was about 5–10 pounds per square inch (about 0.35 to 0.70 kg/cm²). The abrasive belt was weighed before and after the test. The bar was also weighed before and after the test. A generally preferred belt construction ground for a high cut rate with a minimal loss in belt weight (i.e., low amounts of shelling). The results listed in Table 1 were an average of two belts.

Tensile Test Procedure for Examples 1–12 and Comparative Examples A and B

Strips of dimensions 2.5 cm by 17.8 cm were taken from endless, seamless articles of Examples 1–12. The tensile results can be found in Table 2. The strips were taken from the articles in two directions: machine direction (MD) and cross direction (CD) (normal to the machine direction).

These strips were tested for tensile strength using a tensile testing machine known under the designation "Sintech", which measured the amount of force required to break the strips. The machine had two jaws. Each end of a strip was placed in a jaw, and the jaws moved in opposite directions until the strip broke. In each test, the length of the strip between the jaws was 12.7 cm and the rate at which the jaws moved apart was 0.5 cm/sec. In addition to the force required to break the strip, the percent stretch of the strip at the break point was determined for both the machine and cross direction samples. "% stretch" was defined as [(final length minus original length)/original length], and this result was multiplied by 100.

TABLE 1

| Grinding Test Procedure | | | |
| --- | --- | --- | --- |
| Example | Time min:sec | % Belt Weight Loss | Cut % of Control |
| 1 | 5:00 | 26.9 | 99 |
| 2 | 4:45 | 21.0 | 91 |
| 3 | 4:15 | 20.8 | 84 |
| 4 | 4:45 | 20.6 | 95 |
| 5 | 3:45 | 17.4 | 73 |
| 6 | 0:30 | 8.3 | 8* |
| 7 | 0:30 | 5.5 | 8* |
| 8 | 3:15 | 29.0 | 37 |
| 9 | 5:00 | 30.0 | 97 |
| 10 | 1:45 | 37 | 37** |
| 11 | 1:15 | 39 | 33** |
| 12 | 2:15 | 36 | 51** |

TABLE 1-continued

Grinding Test Procedure

| Example | Time min:sec | % Belt Weight Loss | Cut % of Control |
|---------|--------------|--------------------|--------------------|
| A | 4:45 | 21.3 | 100 |
| B | 3:00 | 36 | 56** |

*There was excessive belt stretch.
**There was excessive shelling.

TABLE 2

Tensile Test Results

| | MD Tensile Stretch | | CD Tensile Stretch | |
|---------|-----|--------|-----|--------|
| Example | (%) | (kg/cm) | (%) | (kg/cm) |
| 1 | 31 | 2.7 | 4.5 | 23 |
| 2 | 34 | 3.0 | 3.9 | 25 |
| 3 | 34 | 2.8 | 4.6 | 18 |
| 4 | 39 | 3.0 | 9.8 | 8 |
| 5 | 43 | 3.0 | 16 | 18 |
| 6 | 5.5 | 3.6 | 7.7 | 7 |
| 7 | 8.6 | 54.6 | 7.1 | 36 |
| 8 | 38 | 3.3 | 6.0 | 30 |
| 9 | 37 | 3.1 | 3.7 | 18 |
| 10 | 37 | 2.8 | 6.2 | 4.4 |
| 11 | 37 | 3.1 | 6.2 | 4.7 |
| 12 | 45 | 2.9 | 4.7 | 225 |

EXAMPLES 13–36

The drum which was used to construct Examples 13–36 had an inner diameter of 12.4 cm. Accordingly, the fibrous scrim used in these examples was cut to 77.9 cm, exactly twice the inner circumference of the drum. The drum had an inside width of 7.0 cm. Therefore, the drum had an inside surface area of 272.7 cm². The following designations are used throughout Examples 13–36.

SN=woven nylon scrim, starch sized nylon 6/6, 840 denier, 630 strands per meter lengthwise and 590 strands per meter widthwise, commercially available from Burlington Industries, product number 61501/16/70;

SC=cotton canvas cloth;

SS=spun-laced polyester scrim, commercially available from DuPont under the trade designation "Sontara" type 8801;

SF=fiberglass scrim, 38 holes per cm, commercially available from Clark-Schwebel, style 1614, finish CS-649;

R1=an oligomeric diamine, commercially available from Air Products and Chemical, Inc., Allentown, Pa., under the trade designation "Versalink 1000";

R2=an oligomeric diamine, commercially available from Air Products and Chemical, Inc., Allentown, Pa., under the trade designation "Versalink 2000";

R24=a modified 4,4'-diaminodiphenylmethane isocyanate prepolymer, having an equivalent weight of about 420, an NCO percentage of 10 mole percent, and an isocyanate functionality of 2, commercially available from Imperial Chemical Industries, under the trade designation "PBA 2040";

RN=an aqueous polyurethane emulsion having a percent solids of 33%, the polyurethane based on an aliphatic polyether, commercially available from Imperial Chemical Industries under the trade designation "Neorez R-966";

RW=an aqueous dispersion of polyurethane particles, having a weight percent solids of about 65%, an anionic particle charge, and a particle size of 2 micrometers, commercially available from Witco Corp., under the trade designation "Witcobond 290H";

C2=polymeric diphenylmethane diisocyanate (MDI), consisting of 18–25% MDI, containing methylene bisphenyl isocyanate, and 75–82% polymethylene polyphenyl isocyanate, commercially available from Dow Chemical Co., under the trade designation "PAPI 2020";

C3=diphenylmethane diisocyanate (MDI), commercially available from Dow Chemical Co., under the trade designation "Isonate 143L";

UR1=73 weight percent of a ketoxime-blocked poly-1,4-butylene glycol diisocyanate having a molecular weight of about 1500 commercially available from Uniroyal Chemical Corp. under the trade designation "BL-16", 9.45 weight percent methylene diamine, and 17.55 weight percent 1-methoxy-2-propyl acetate;

CW=aqueous epoxy resin dispersion, commercially available from Witco Corp., under the trade designation "Witcobond XW";

M1=an agglomerate of individual abrasive particles, the agglomerates having an average particle size of about 375 micrometers, made in accordance with the teachings of U.S. Pat. No. 4,799,939, using 180 grade (80 micrometer average particle size) fused Al2O3, available from 3M;

FSX=grade 80 (200 micrometer average particle size) blue heat treated aluminum oxide ($Al_2O_3$) abrasive mineral, available from Treibacher, Treibach, Austria;

ER1=a diglycidyl ether of bisphenol A epoxy resin commercially available from Shell Chemical Co., Houston, Tex., under the trade designation "Epon 828";

ER2=an aliphatic diglycidyl ether epoxy resin commercially available from the Shell Chemical Co., Houston, Tex., under the trade designation "Epon 871";

ECA=a polyamide curing agent for the epoxy resin, commercially available from the Henkel Corporation, Gulph Mill, Pa., under the trade designation "Versamid 125";

GEN=a fatty amidoamine resin known under the trade designation "Genamid 490", available from Henkel Corp., Gulph Mills, Pa.;

EPOX-4=a combination of 50 weight percent ER1 and 50 weight percent GEN;

EPOX-7=a combination of 25 weight percent ER1, 25 weight percent ER2, and 50 weight percent ECA;

P140=a modified solvent-free polyether based on propylene oxide and a triol, having an OH equivalent of approx. 250, known under the trade designation "Blendur P 140M", from Mobay Corporation, Pittsburgh, Pa.;

P120=a modified solvent-free polyether polyol liquid having an OH number of approx. 32, known under the trade designation "Blendur P 120M", from Mobay Corporation, Pittsburgh, Pa.;

5006=an aromatic modified polyisocyanate based on MDI, having an NCO equivalent of about 160–170, known under the trade designation "Baymidur KU 3-5006", from Mobay Corporation, Pittsburgh, Pa.;

A3220=70% solids in solvent (comprising 10% "Polysolve" and 90% water) consisting of 48% resole phenolic resin and 52% calcium carbonate filler;

"Polysolve"=a water/solvent blend known under the trade designation "Polysolve 1984PM" containing 15% water and 85% propylene glycol monomethyl ether, available from Worum Chemical Co. in St. Paul, Minn.;

SOL=an organic solvent which is a blend of light aromatic hydrocarbons known under the trade designations "Aromatic 100" and "Shell CYCLO SOL 53 Solvent", commercially available from Worum Chemical Co., St. Paul, Minn.

The following examples listed in Table 3 present various polyurea binder compositions that were used in conjunction with the method described in FIGS. 15–17. The amine and isocyanate compounds listed in Table 3 were mixed according to the various instructions provided by the manufacturers of the materials. The amount listed is the mixed amount. Some of these examples were then subjected to the test procedure described below.

TABLE 3

| Example | scrim | Binder, total weight (grams) | mineral M1 (grams) |
| --- | --- | --- | --- |
| 13 | SS | R1, C2 (37 gms) | 65 |
| 14 | SC | R1, C2 (36.4 gms) | 50.7 |
| 15 | SN | R1, C2 (48 gms) | 89 |
| 16 | SF | R1, C2 (23.4 gms) | 71.7 |
| 17 | SC | R2, C2 (36.4 gms) | 61 |
| 18 | SN | R2, C2 (36 gms) | 101 |
| 19 | SF | R2, C2 (21.5 gms) | 53.1 |
| 20 | SF | RW, CW (27.8 gms) | 61.9 |
| 21 | SN | RN (63 gms) | 108.3 |
| 22 | SN | R2, C3 (28 gms) | 77.2 |
| 23 | SC | R1, C3 (32 gms) | 60 |

Test Procedure 1: Aluminum Workpiece

Test Procedure 1 was designed to test the cut of the abrasive belts of Examples 14, 16, 18, 19, 21, 22, and 23. The abrasive belt in each case was placed on a pneumatic expanding wheel which, when expanded, securely held the belt. The wheel and belt were connected to a hand-held sander made by Pneu-Matic Grinders, Inc., (Cleveland, Ohio), Model #620. A preweighed aluminum workpiece, approximately 6.35 cm×30 cm×1.5 mm was securely held by two clamps, and the top surface of the workpiece abraded. The test was run until about 1 gram of material was removed from the workpiece. The workpiece was weighed, and the weight of workpiece removed per minute ("cut") was calculated by dividing the total weight difference by the abrading time. The results are recorded in grams/minute. The results are listed in Table 4.

TABLE 4

| Example | Cut Rate (g/min) |
| --- | --- |
| 14 | 1.3 |
| 16 | 0.5 |
| 18 | 1.4 |
| 19 | 0.2 |
| 21 | 1.5 |
| 22 | 1.0 |
| 23 | 0.5 |

It should be noted that, in view of the tests above, generally, the preferred combination of materials utilized with the inventive method described in FIGS. 15–17 is a polyurea resin, made using the amine curatives "Polamine 1000" or "Polamine 2000", reacted with a diphenylmethane diisocyanate, e.g., PAPI 2020 from Dow Chemical Co., and a woven nylon scrim.

Alternative Method #2

Figure 19:
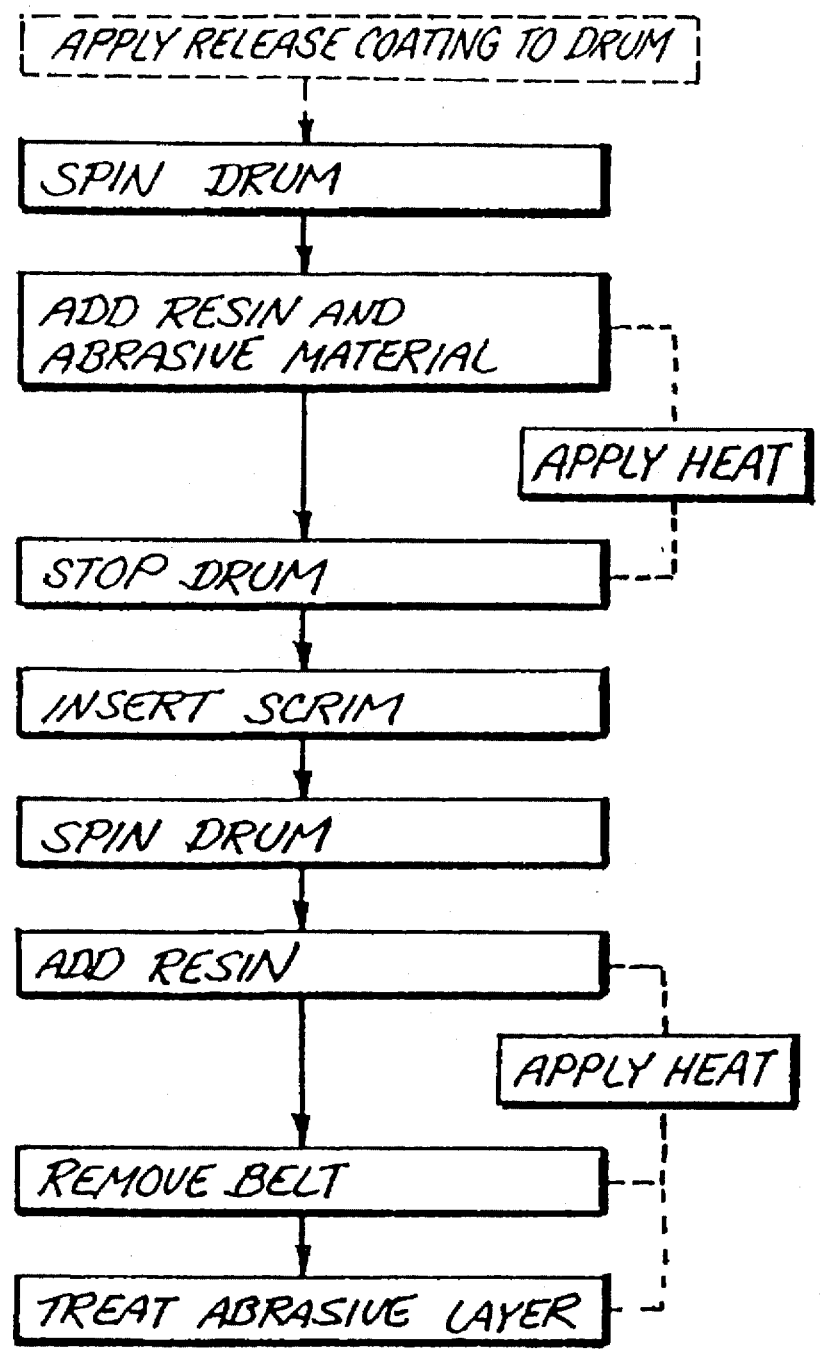
FIG. 19 is a flow chart of the alternative method shown in FIG. 18.

FIGS. 18 and 19 show an alternative method of the present invention. With this alternative method, a mixture of a resinous slurry 250 and an abrasive material such as an abrasive mineral 252 is inserted into the drum 234 which is rotating in a direction R. As seen in FIGS. 18 and 19, heat from the heat source 242 may be applied to the interior surface 238 of the drum to partially cure the resin 250 to thereby form an exterior layer adjacent the interior surface 238 of the drum 234. The drum 234 is then stopped to permit the insertion of a scrim 254 that is in a doubled-layered configuration much like that discussed in FIG. 15. The drum is then spun at a high speed to press the scrim 254 against the exterior layer formed by the resin 250 and the abrasive material 252. Additional resin 256 is then added to the drum such that the scrim 254 becomes engulfed within a layer of resin. The belt is removed from the drum 234 once the resins 250 and 256 have cured sufficiently. There is no need to invert the abrasive belt formed by this method, since the exterior layer is already on the outer surface of the belt. However, the exterior layer must be treated in some manner in order to expose the abrasive mineral on the exterior layer. A dressing bar (not shown) can be used to treat the exterior layer such that the abrasive minerals are exposed to form an abrasive belt.

Alternative Method #3

Figure 21:
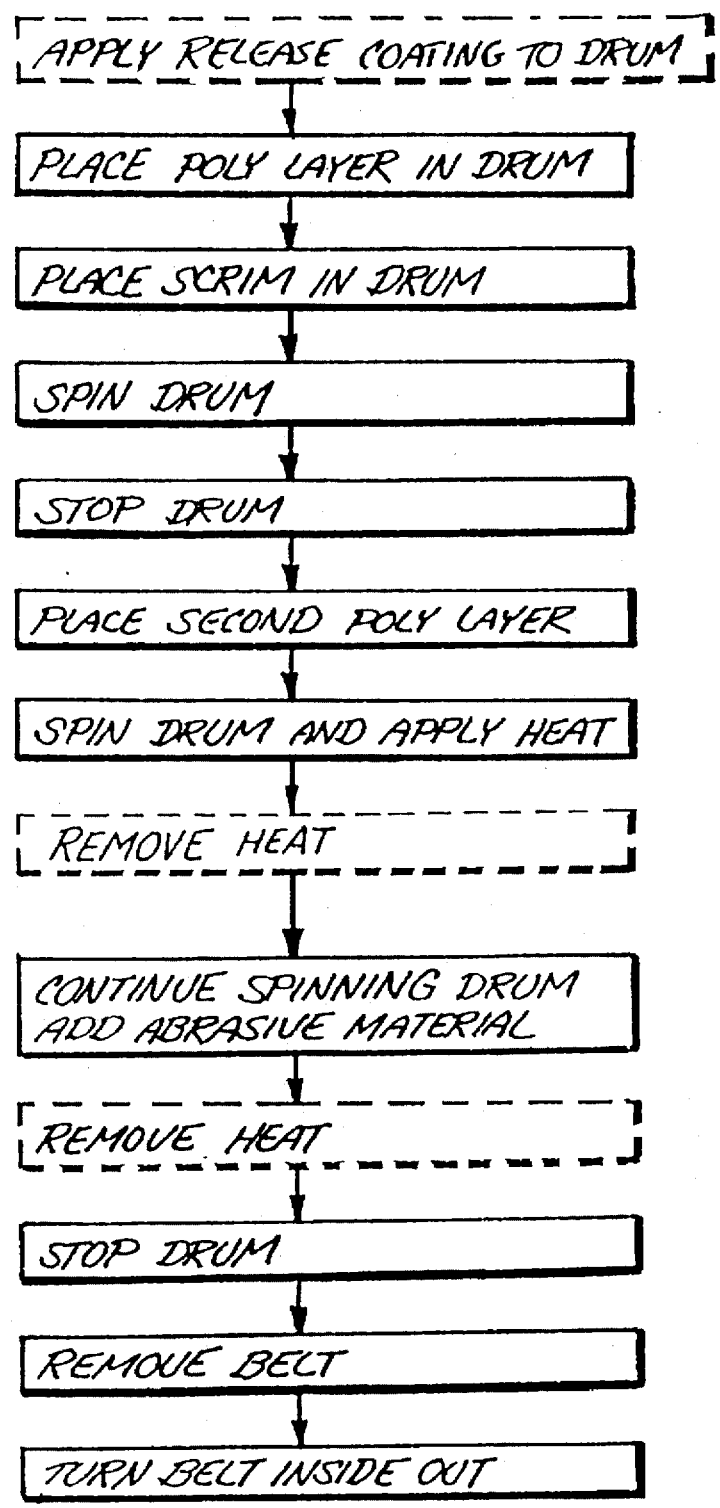
FIG. 21 is a flow chart of the alternative method shown in FIG. 20.

FIGS. 20 and 21 present another alternative method of the present invention. With this method, the organic binder material is comprised of a thermoplastic binder material. A thermoplastic binder material is a polymeric material that softens when exposed to elevated temperatures and generally returns to its original physical state when cooled to ambient temperatures. The preferred thermoplastic materials of the invention are those having a high melting temperature and/or good heat resistant properties. That is, preferred thermoplastic materials have a melting point of at least about 100° C., preferably about at least 150° C. Additionally, the melting point of the preferred thermoplastic materials is sufficiently lower, i.e., at least about 25° lower, than the melting temperature of the reinforcing material. Preferably, the thermoplastic material is a polyamide, polyurethane, or a polyvinyl chloride.

As seen in FIGS. 20 and 21, this inventive method essentially involves inserting a first loop 270 of thermoplastic binder material adjacent the interior surface 238 of the drum 234. A scrim 272, is cut and configured much like the scrim 244 described in FIG. 15, and is placed within the first loop 270. The drum is then spun in the direction R such that the scrim 272 is properly positioned against the first loop 270. A second loop of thermoplastic binder material is then inserted within the drum 234 such that the scrim 272 is positioned between the first loop 270 and the second loop 274.

The drum is then rotated in the direction R while sufficient heat is applied via the heat source 242 toward the interior surface 238 of the drum 234. The heat source 242 provides sufficient heat such that the thermoplastic binder materials obtain a flowable state to thereby permit centrifugal forces to distribute the thermoplastic material evenly about the scrim 272 such that the scrim 272 is embedded within the thermoplastic material. As seen in FIGS. 20 and 21, the heat can be removed once the thermoplastic material is evenly distributed about the scrim 272, Preferably, immediately after removing the heat, an abrasive material 252 is inserted within the drum. The drum should continue rotating until the abrasive material 252 is sufficiently adhered to the thermoplastic material. Once the thermoplastic material is cooled and solidified, the belt can be removed from the drum and turned inside out to thereby form an abrasive belt.

A substrate can be made by the method above by eliminating the step of inserting the abrasive material 252.

EXAMPLES 24-29

Backings useful for producing coated abrasives were prepared in these examples. Each backing was 48.3 cm long by 4.5 cm wide. The fibrous reinforcement used in Examples 24-29 was a composite material made by 3M comprising a nonwoven layer comprising core-sheath melt-bondable fibers (polyester/polyester) made on a Rando-Web making machine and a plurality of continuous, generally parallel polyester yarns thermally bonded to the nonwoven so that the length of the yarns extended the entire length of the composite. The yarn was in the form of a plurality of yarn lengths arranged generally parallel to each other and spaced apart such that there were 18 yarns per 2.54 cm of composite width. The yarns were also generally parallel to the length dimension of the finished backing, therefore providing increased tensile strength and tear resistance, as well as increased stretch resistance to the backings. The composite was 4.2 cm wide and 49 cm in length in each example backing. Backings of Examples 24 and 25 employed one layer of the fibrous composite, while the backings of Examples 26-29 employed two layers of fibrous composite. Backings of Examples 24-25 employed as the binder resin EPOX-4. Backings of Examples 26-30 employed as binder resin a mixture comprised of 6 parts, 4 parts, and 5 parts respectively of P 140, P 120, and 5006, respectively. The binder for Examples 28-29 additionally had 30 weight percent calcium carbonate filler added thereto as a percentage of the total weight of binder and filler.

Tensile Test Procedure and Results for Examples 24-29

Strips of dimensions 2.5 cm by 17.8 cm were taken from endless, seamless backings of Examples 24-29. The strips were taken from the backings in two directions: Strips were taken in the length direction (BD) and from the cross direction (CD) (normal to the length direction).

These strips were tested for tensile strength using a tensile testing machine known under the trade designation "Sintech", which measured the amount of force required to break the strips. The machine has two jaws. Each end of a strip was placed in a jaw, and the jaws moved in opposite directions until the strips broke. In each test, the length of the strip between the jaws was 12.7 cm and the rate at which the jaws moved apart was 0.5 cm/sec. In addition to the force required to break the strip, the percent stretch of the strip at the break point was determined for both the machine and cross direction samples. "% stretch" is defined as [(final length minus original length)/original length], and this result multiplied by 100. Data recorded in Table 5 include break load, percent stretch at break, tensile modulus, percent stretch at 45.4 kg load, and percent stretch at 20.4 kg load.

TABLE 5

| Example | Break Load (Kg) | Stretch @ Break (%) | Modulus (Kg/cm²) | Stretch @ 45.4 Kg (%) | Stretch @ 20.4 Kg (%) |
|---|---|---|---|---|---|
| 24 | 77 | 13.3 | 281 | 3.80 | 1.1 |
| 25 | 62 | 20.8 | — | 5.72 | 2.7 |
| 26 | 104 | 16.6 | 140 | 7.75 | 2.0 |
| 27 | 112 | 17.7 | 164 | 7.74 | 1.9 |
| 28 | 105 | 16.3 | 139 | 7.86 | 2.0 |
| 29 | 100 | 16.0 | 190 | 7.79 | 1.7 |

EXAMPLES 30-66

Endless, flexible, seamless backings, and coated abrasives incorporating same, of the invention were prepared in these examples.

Production of Backings of Examples 30-36: Endless, flexible, seamless backings of the invention were prepared using the methods illustrated in FIGS. 15-16. A cup-shaped aluminum drum (such as depicted in FIG. 20 at 234) was formed by machining a cylinder of east aluminum to form a hollow portion having an internal diameter of 18.6 cm and a depth (width W in FIG. 20) of 10.8 cm. A 0.64 by 0.64 cm angle retaining lip (240) was formed in the mold at the open end 235 of drum 234. Thus, each backing formed was 61 cm long and 10.2 cm wide. On the rear, outside of the mold was shaped a coupling type connector so the mold could be mounted on a standard 1.27 cm diameter motor shaft. This mold was mounted on a single speed AC motor, ½ HP, which spun the mold at 1750 rpm when turned on, and a set screw used to hold the mold onto the motor shaft. The mold interior was sprayed with a silicon spray mold release material (known under trade designation "RAM Mold Release 225", available from RAM Products, Gardena, Calif.).

Next, the desired fibrous material was rolled such that about ½ the length is a double layer, and the rolled fibrous material fitted through the open end of the drum. After placing the rolled fibrous material into the drum the motor was turned on, thus forcing the fibrous material against the internal surface of the drum by centrifugal force. Binder precursor resin was then added using a cup while the motor spun the drum, and, once wetted, the fibrous material remained in place adjacent the interior surface of the drum. The mold was spun for 10 minutes at 1750 rpm while a 1000 watt heat gun was used to blow hot air into the mold cavity (onto the resin) as the mold was spinning to the binder precursor resin.

Production of Coated Abrasives of Examples 30-36: After endless, flexible, seamless backings of Examples 30-36 were formed they were slipped over a mandrel and spray coated with make binder precursor composition, followed by electrostatic application of abrasive mineral, followed in turn by exposure to a heat source until the make binder was formed. A size binder precursor composition was then applied, heated to cure, and the completed coated abrasive belt removed from the mandrel. The make and size binder precursor compositions in each of Examples 30-36 was A3230, while the abrasive mineral employed in each case was FSX.

Table 6 details the construction of abrasive belts of Examples 30-36, including abrasive particle add-on weight, make and size add-on weights, and tensile, stretch and abrasive performance data, where "cut" equals weight in grams of workpiece removed in 12.5 minutes. The workpiece in each case was particle board, and the abrasive performance test is described below. Prior to testing according to the Particle Board Test, the coated abrasive was flexed, i.e., the abrasive coating was uniformly and directionally cracked, using a 2.54 cm supported bar.

Test Procedure 2: Particle Board Test

The coated abrasive belt (10 cm×61 cm) was installed on a take-about belt type grinder. The workpiece for this test was 1.9 cm×9.5 cm×150 cm industrial grade, 20.4 kg density, low emission urea-formaldehyde particle board available from Villaume Industries, St. Paul, Minn. Five workpieces were initially weighed. Each workpiece was placed in a holder with the 9.5 cm face extending outward. A 15.3 kg load was applied to the workpiece. The 9.5 cm face was abraded for 30 seconds. The workpiece was reweighed to determine the amount of particle board removed or cut. The total cut of the five workpieces were recorded. This sequence was repeated 5 times for each workpiece for a total of 12.5 minutes of grinding. The control example for this test was a 3M 761D grade 80 (average particle size 204 micrometers) "Regalite" Resin Bond Cloth coated abrasive, commercially available from 3M, which exhibited a total cut of 67.7 gms/12.5 min of cutting. The grinding results for Examples 30–36 can be found in Table 6. The percentage of control was determined by: dividing the cut associated with the particular example by the cut associated with the control example, times 100.

or substrates 282 and 284. Accordingly, it is within the scope of this invention to use a very large drum to thereby provide for the mass production of flexible, endless, seamless substrates or belts.

The invention has been described with reference to various specific and preferred embodiments and techniques. It should be understood, however, that many variations and

TABLE 6

| Example[1] | 30 | 31 | 32 | 33 | 34 | 35 | 36 |
|---|---|---|---|---|---|---|---|
| Backing Total Wt. (g) | 45 | 30 | 29 | 28 | 62 | 50 | 75 |
| Backing Construction[2] | BCBCB | BCBCB | BCBCB | BSB | BSBSB | BSBSB | B |
| Backing Cure[3] | A Cured | A Cured | A Cured | A Cured | A Cured | A Cured | A Cured |
| Make add-on weight (gsm) | 1743 | 1743 | 1485 | 1485 | 2002 | 1485 | 1485 |
| Mineral add-on weight (gsm) | 7492 | 7427 | 7040 | 7427 | 6458 | 5942 | 7427 |
| Size add-on weight (gsm) | 271 | 248 | 248 | 248 | 248 | 248 | 248 |
| BD Tensile, (lbs/in)[4] | 240 | 205 | 210 | 87 | 240 | 220 | 170 |
| BD Stretch @ Break, (%)[4] | 15.00% | 14.00% | 16.00% | 17.00% | 2.00% | 2.50% | 9.00% |
| BD 100/45 lb Stretch (%)[4] | 4%/1% | 4.4%/1.3% | 6.8%/1.5% | —/6% | 0.7%/0.3% | 1%/0.4% | —/5% |
| CD Tensile, (lbs/in)[4] | 83 | 91 | 48 | NA | 460 | 250 | 57 |
| CD Stretch @ Break, (%)[4] | 6.00% | 12.50% | 21.00% | NA | 6.00% | 4.20% | 15.00% |
| Load @ 5%/2% Stretch (lb) | 68/52 | 68/47 | 23/19 | NA | 400/200 | —/150 | 34/21 |
| Total Cut, g/12.5 min. | 66.2 | 41.8 | 52.7 | 17.5 | 64.9 | 74 | 6.8 |
| Cut, % of Control | 97.78% | 61.74% | 77.84% | 25.85% | 95.86% | 97.89% | 10.04% |
| Comments | — | — | — | Broke @ 3 min. | — | — | Broke @ 2.5 min. |

[1]Example 30, fibrous reinforcement was a composite material of core/sheath (polyester/polyester) nonwoven and continuous polyester yarn thermally bonded together, as described in Examples 24–29. Two layers of composite were used. Binder was flexible thermoset epoxy 33% ERI, 33% ER2, 33% ECA, 20% calcium carbonate filled.
Example 31, same as Example 30 except less binder in backing.
Example 32, same as Example 30 except binder was 60% UR1/40% EPOX 7 filled 20% calcium carbonate and 5% SOL.
Example 33 employed as fibrous reinforcement fiberglass scrim 10.2 cm by 20.4 cm, length direction being 20.4 cm, and made of ECG 645 yield fiberglass. Binder resin was same as Example 30.
Example 34 employed a 25.4 cm by 25.4 cm woven fiberglass sheet ECG 75, available from Industrial Polymers and Chemicals, style 3321, CRX-B resin 33–40. Binder resin used was a urethane available from Miles Inc., comprising a two part MDI, polyol system - 39% P140, 26% P120, and 35% 5006 MDI. No filler or solvent was added.
Example 36 used same fibrous material as Example 30 and binder of Example 32. Binder the same as Example 32 except 20% by weight milled fiberglass was added before pouring into mold, and SOL was added to lower viscosity to 1000 cps after fiberglass was added. Fiberglass length was about 0.16 cm, and was available from Fibre Glast Development Corp., Dayton, Ohio.
[2]"BCBCB" denotes binder/fiber layer/binder/fiber layer/binder construction; "BSB" indicates binder/scrim/binder; "BSBSB" denotes binder/scrim/binder/scrim/binder; and "B" indicates binder having milled fiberglass mixed therein.
[3]"A cured" means curing at 102° C. for 12 hours.
[4]"BD" designates length direction.
[4]"CD" desigdates cross direction.

Although the present invention has been described with reference to preferred embodiments, workers skilled in the art will recognize that changes may be made in form and detail without departing from the spirit and scope of the invention. In particular, one skilled in the art will recognize that a large variety of sizes of belts may be made via the inventive method by simply changing the size of the drum. Further, those skilled in the art will recognized that the interior surface of the drum may be patterned (in relief) or grooved such that the resulting abrasive belts would be patterned or grooved on its grinding surface. The interior of the drum may be provided with a permanent release coating, such as polytetrafluorethylene. In this case the belt would not have to be inverted. The patterned surface could also be on the nonabrasive surface of the belt, which may provide higher friction between the belt and backup rollers which drive the belt. In addition, as seen in FIG. 22, a belt or substrate 280 produced by this method can be cut after it has been removed from the drum to produce a plurality of belts modifications can be made while remaining within the scope of the following claims.

What is claimed is:

1. A method for preparing a flexible, endless, seamless substrate suitable for use as a backing for a coated abrasive article, the method comprising:
   (a) inserting a fibrous material into a drum so that a major surface of said material is adjacent an interior surface of the drum, the interior surface defining a substrate width and a substrate length;
   (b) placing a composition comprising an organic binder precursor material within the drum, said composition capable of solidifying to form a flexible binder;
   (c) rotating the drum to evenly distribute the composition about the fibrous material and about the interior surface of the drum;
   (d) solidifying the composition to form a flexible binder such that a flexible, endless, seamless substrate is formed having an outer surface adjacent the interior surface of the drum, an inner surface opposite the outer surface and the fibrous material embedded in the binder; and (e) providing an abrasive coating on the substrate.

2. The method of claim 1 further comprising the step of cutting the flexible, endless, seamless substrate to form at least two flexible, endless, seamless substrates.

3. The method of claim 1 wherein the organic binder precursor material includes a thermosetting resin, and wherein the method further includes the step of inserting an abrasive agent in the drum such that an abrasive layer is formed upon the inner surface of the flexible seamless substrate.

4. The method of claim 3 wherein the step of inserting the abrasive agent includes inserting abrasive particles in the drum after the composition comprising the organic binder precursor material has been uniformly distributed about the fibrous material and before the organic binder precursor material is solidified.

5. A method for preparing a flexible, endless, seamless substrate suitable for use as a backing for a coated abrasive article, the method comprising:

(a) inserting a fibrous material into a drum so that a major surface of said material is adjacent an interior surface of the drum, the interior surface defining a substrate width and a substrate length;

(b) placing a composition comprising an organic binder precursor material within the drum, said composition capable of solidifying to form a flexible binder;

(c) rotating the drum to evenly distribute the composition about the fibrous material and about the interior surface of the drum;

(d) solidifying the composition to form a flexible binder such that a flexible, endless, seamless substrate is formed having an outer surface adjacent the interior surface of the drum, an inner surface opposite the outer surface and the fibrous material embedded in the binder;

(e) applying a make coating binder precursor to the substrate, the make coating precursor including a first resin;

(f) exposing the make coating binder precursor to conditions sufficient to form an at least partially cured make coating;

(g) applying abrasive particles to the partially cured make coating;

(h) applying a size coating binder precursor over the abrasive particles and the partially cured make coating, the size coating binder precursor including a second resin; and (i) exposing the make and size coating binder precursors to conditions to substantially completely cure the first resin and second resin.

6. The method of claim 5 further including applying a supersize coating over the substantially completely cured first resin and second resin.

7. A method for preparing a flexible, endless, seamless substrate suitable for use as a backing for a coated abrasive article, the method comprising:

(a) inserting a fibrous material into a drum so that a major surface of said material is adjacent an interior surface of the drum, the interior surface defining a substrate width and a substrate length;

placing a composition comprising an organic binder precursor material within the drum, said composition capable of solidifying to form a flexible binder;

(c) rotating the drum to evenly distribute the composition about the fibrous material and about the interior surface of the drum;

(d) solidifying the composition to form a flexible binder such that a flexible, endless, seamless substrate is formed having an outer surface adjacent the interior surface of the drum, an inner surface opposite the outer surface and the fibrous material embedded in the binder;

(e) applying a make coating binder precursor to the substrate, the make coating precursor including a first resin;

(f) applying abrasive particles to the make coating binder precursor;

(g) applying a size coating binder precursor over the abrasive particles and the make coating binder precursor, the size coating binder precursor including a second resin; and (h) exposing the make and size coating binder precursors to conditions to substantially completely cure the first resin and the second resin.

8. The method of claim 7 further including applying a supersize coating over the substantially completely cured first resin and second resin.

9. The method of claim 1 wherein the fibrous material is present at a weight percentage ranging from about 1 to about 60 weight percent based on the total weight of the backing.

10. The method of claim 1 wherein the fibrous material comprises glass fibers and the organic binder precursor includes isocyanates and aromatic amines.

11. The method of claim 3 further comprising the step of inverting the flexible seamless substrate such that the abrasive layer is facing outwardly.

12. The method of claim 1 wherein the step of inserting fibrous material comprises the steps of:

(a) inserting at least one fibrous mat structure within the drum, the mat structure selected from the group consisting of nonwoven mats, woven mats, and composites of nonwoven mats and a plurality of continuous yarns, the continuous yarns generally parallel to the substrate length; and (b) rotating the drum such that centrifugal forces position the mat structure against the interior surface of the drum.

13. The method of claim 1 wherein the step (a) of inserting the fibrous material includes the steps of:

(i) providing a fibrous mat structure having two ends and a length that is twice as large as an inner circumference of the drum, the fibrous mat selected from the group consisting of nonwoven mats, woven mats, and composites of nonwoven mats and a plurality of continuous yarns, the continuous yarns generally parallel to the substrate length; and (ii) inserting the mat structure within the drum in a doubled layered configuration such that the two ends of the mat structure are positioned adjacent each other.

14. The method of claim 1 wherein the organic binder precursor material is a liquid resin.

15. The method of claim 14 wherein the step of placing the liquid organic binder precursor into the drum occurs when the drum is rotating.

16. A method for preparing a flexible, endless, seamless substrate suitable for use as a backing for a coated abrasive article, the method comprising:

(a) placing a first layer of a first composition comprising a first solid organic polymeric binder material within a drum adjacent the interior surface of the drum;

(b) placing fibrous material adjacent the first layer of solid organic polymeric binder material;

(c) placing a second layer of a second composition comprising a second solid organic polymeric binder material within the drum such that the fibrous material is positioned between the first and second compositions;

(d) heating the first and second compositions at conditions sufficient to form first and second organic binder materials in a flowable state;

(e) rotating the drum such that centrifugal forces distribute the first and second compositions about the fibrous material and about the interior surface of the drum; and (f) solidifying the first and second compositions to form a flexible binder such that a flexible, endless, seamless substrate is formed adjacent the interior surface of the drum, the substrate having an inner surface opposite the outer surface and the fibrous material embedded in the binder.

17. The method of claim 16, herein the first and second compositions are substantially the same chemical compositions.

18. A method of preparing a flexible, endless, seamless abrasive belt, the method comprising the steps of:

(a) inserting a mixture comprising an abrasive agent and an organic binder precursor material within a drum, the drum having an interior surface;

(b) rotating the drum such that centrifugal forces distribute the mixture uniformly about the interior surface of the drum to form an exterior layer, the interior surface defining a belt width and a belt length;

(c) inserting a fibrous material adjacent the exterior layer;

(d) providing additional organic binder precursor material in the drum;

(e) rotating the drum such that centrifugal forces distribute the additional organic binder precursor material uniformly about the fibrous material; and (f) exposing the organic binder precursor material to conditions sufficient to solidify the organic binder precursor materials to form binders such that a flexible, endless, seamless abrasive belt is formed having said fibrous material embedded within the binders.

19. The method of claim 18 and further comprising the steps of:

(g) removing the flexible, endless, seamless abrasive belt from the drum; and (h) dressing the exterior layer to form an abrasive layer.

20. The method of claim 19 and further comprising the step of coating a supersize layer over the abrasive layer.

21. A method for preparing a flexible, endless, seamless substrate suitable for use as a backing for a coated abrasive article, the method comprising:

(a) inserting a composition comprising a fibrous material and an organic binder precursor adjacent an interior surface of a drum, the interior surface defining a substrate width and a substrate length, the organic binder precursor comprising material capable of solidifying to form a flexible binder;

(b) rotating the drum such that centrifugal forces distribute the organic binder precursor about the fibrous material and about the interior surface of the drum; and (c) exposing the composition to conditions to sufficiently solidify the organic binder precursor to form a flexible binder such that a flexible, endless, seamless substrate is formed having an outer surface formed adjacent the interior surface of the drum, an inner surface opposite the outer surface and the fibrous material embedded within the binder.

22. A method for preparing a flexible, endless, seamless substrate suitable for use as a backing for a coated abrasive, the method comprising:

(a) inserting a composition comprising a fibrous material adjacent an interior surface of a drum, the interior surface defining a substrate width and a substrate length;

(b) rotating the drum such that centrifugal forces distribute the fibrous material about the interior surface of the drum;

(c) while the drum is rotating, pouting a liquid composition comprising an organic binder precursor into the drum such that centrifugal forces distribute the composition about the fibrous material, the composition capable of forming a flexible binder material when solidified; and (d) solidifying the composition to form a flexible binder such that a flexible, endless, seamless substrate is formed having an outer surface formed adjacent the interior surface of the drum, an inner surface opposite the outer surface and the fibrous material embedded within the binder.

23. A method for preparing a flexible, endless, seamless coated abrasive belt, the method comprising:

(a) inserting a composition comprising a fibrous material adjacent an interior surface of a drum, the interior surface defining a substrate width and a substrate length;

(b) rotating the drum such that centrifugal forces distribute the fibrous material about the interior surface of the drum;

(c) while the drum is rotating, pouring a liquid composition comprising an organic binder precursor into the drum such that centrifugal forces distribute the composition about the fibrous material;

(d) exposing the composition to conditions to solidify the organic binder precursor to form a binder such that a flexible, endless, seamless backing is formed having an outer surface formed adjacent the interior surface of the drum, an inner surface opposite the outer surface and the fibrous material embedded in the partially hardened binder;

(e) removing the backing from the drum;

(f) slipping the backing over a mandrel;

(g) while rotating the mandrel,
  (i) applying a make coating binder precursor to the backing, and
  (ii) applying a plurality of abrasive particles to the make coating binder precursor;

(h) exposing the make coating binder precursor to conditions sufficient to at least partially solidify the make coating binder precursor;

(i) while rotating the mandrel, applying a size coating binder precursor over the make coating binder precursor and abrasive particles; and (j) exposing the make coating binder precursor and the size coating binder precursor to conditions sufficient to substantially solidify the make and the size coating binder precursors to form make and size coatings.

24. A method of making a coated abrasive, the method comprising:

(a) applying a fibrous reinforcing material to a support structure and either simultaneously or sequentially applying a sufficient amount of an organic polymeric binder precursor to the reinforcing material such that the binder precursor engulfs the fibrous reinforcing material and further provides a region of binder substantially free of the reinforcing material;

(b) applying a plurality of abrasive particles to the region of binder precursor substantially free of the reinforcing material; and (c) exposing the construction resulting from step (b) to conditions sufficient to solidify the binder precursor thereby forming a binder, wherein a majority of the abrasive particles protrude out of the binder.

25. A method of making a coated abrasive, the method comprising:

(a) providing a fibrous reinforcing material;

(b) applying an organic polymeric binder precursor to the fibrous reinforcing material in an amount sufficient to thereby substantially engulf the reinforcing material with binder precursor and further provide a region of binder precursor substantially free of the reinforcing material;

(c) applying a plurality of abrasive particles to the region of binder precursor substantially free of the reinforcing material such that the abrasive particles protrude from the binder precursor; and (d) exposing the construction of step (c) to conditions sufficient to solidify the binder precursor thereby forming a binder, wherein a majority of the abrasive particles protrude out of the binder.

26. A method of making a coated abrasive, the method comprising:

(a) applying a fibrous reinforcing material to a support structure and either simultaneously or sequentially applying an organic polymeric binder precursor to the reinforcing material in an amount sufficient such that the binder precursor engulfs the reinforcing fibers and provides a region of binder precursor substantially free of the reinforcing material;

(b) applying a plurality of abrasive particles to the region of binder precursor substantially free of the reinforcing material such that a majority of the abrasive particles protrude from the binder precursor;

(c) applying a size coating precursor over the abrasive particles and binder precursor wherein the binder precursor has not been solidified and is still in a flowable state; and (d) exposing the construction resulting from step (c) to conditions sufficient to solidify the binder precursor size coating precursor to form a binder and a size coating.

27. A method of making a coated abrasive, the method comprising:

(a) providing a fibrous reinforcing material;

(b) applying an organic polymeric binder precursor in an amount to substantially engulf the reinforcing material with the binder precursor and provide a region of binder precursor substantially free from said reinforcing material;

(c) applying a plurality of abrasive particles to the region of binder precursor substantially free from said reinforcing material such that a majority of the abrasive particles protrude from the binder precursor;

(d) applying a size coating precursor over the abrasive particles and the binder precursor while the binder precursor is still in a flowable state; and (e) exposing the construction of step (d) to conditions sufficient to solidify the binder precursor and the size coating precursor to form a binder and a size coating.

28. A method of making a coated abrasive, the method comprising:

(a) saturating a nonwoven fibrous substrate with an organic polymeric binder precursor to form a saturated nonwoven;

(b) applying the saturated nonwoven to a support structure;

(c) applying alternating yarns of nylon and fiberglass over the saturated nonwoven while tensioning the yarns such that the yarns are pulled down into the saturated nonwoven, there being sufficient binder precursor to wet and engulf the yarns and still have an excess of binder precursor present to form a region substantially free of said nonwoven and said yarns, the nonwoven and yarns applied to the support structure in two layers, the two layers being out of phase to create a uniform structure;

(d) applying a plurality of abrasive particles to the region of binder precursor substantially free from said nonwoven and said yarns such that a majority of the abrasive particles protrude from the binder precursor; and (e) exposing the construction of step (d) to conditions sufficient to solidify the binder precursor to form a binder.

29. A method of making a coated abrasive, the method comprising:

(a) applying a nonwoven fibrous substrate to a support structure;

(b) applying alternating yarns of nylon and fiberglass over the nonwoven while tensioning the yarns such that the yarns are pulled down into the nonwoven, the yarns having been previously coated with a binder precursor, there being sufficient binder precursor to wet and engulf the yarns and still have an excess of binder precursor present to form a region substantially free of said nonwoven and said yarns, the nonwoven and yarns applied to the support structure in two layers, the two layers being out of phase to create a uniform structure;

(c) applying a plurality of abrasive particles to the region of binder precursor substantially free from said yarns and said nonwoven such that a majority of the abrasive particles protrude from the binder precursor; and (d) exposing the construction of step (c) to conditions sufficient to solidify the binder precursor to form a binder.

30. A continuous web process useful for producing seamed coated abrasives, the process comprising:

(a) traversing a nonwoven web material through a coating station to engulf the nonwoven in an organic polymeric binder precursor, thus forming a saturated nonwoven having a region of binder precursor substantially free of said nonwoven material;

(b) embedding a fibrous reinforcing yarn into the saturated nonwoven to form a region substantially free of said nonwoven material and said yarn;

(c) projecting via electrostatic forces a plurality of abrasive particles into the region of binder precursor substantially free of said nonwoven material and said yarn;

(d) exposing the construction resulting from step (c) to conditions sufficient to solidify the binder precursor to form a binder;

(e) applying a size coating precursor over the abrasive particles and the binder;

(f) exposing the construction resulting from step (e) to conditions sufficient to solidify the size coating precursor thus forming a size coated abrasive;

(g) optionally further processing the size coated abrasive by procedures such as additional curing, flexing and/or humidification; and (h) converting the size coated abrasive into the desired form or shape.

31. The method of claim 24 wherein said organic polymeric binder comprises about 40–99 wt-% of the total weight of the organic polymeric binder plus fibrous reinforcing material.

32. The method of claim 31 wherein said organic polymeric binder comprises about 50–95 wt-% of the total weight of the organic polymeric binder plus fibrous reinforcing material.

33. The method of claim 24 wherein the organic polymeric binder and the fibrous reinforcing material together form a flexible, endless, seamless loop having a length with generally parallel side edges.

34. The method of claim 33 wherein the endless, seamless loop formed includes a plurality of noninterlocking layers of fibrous reinforcing material engulfed within the organic polymeric binder.

35. The method of claim 34 wherein the fibrous reinforcing material comprises a layer of one continuous fibrous strand wrapped generally in the form of a helix in longitudinal extension around the length of the loop.

36. The method of claim 35 wherein the layer of one continuous fibrous strand comprises individual wraps of the strand at a constant, nonzero angle relative to the parallel side edges of the loop.

37. The method of claim 35 wherein the coated abrasive further includes a layer of a fibrous mat structure engulfed within the organic polymeric binder.

38. The method of claim 24 wherein the fibrous reinforcing material comprises a layer of a fibrous mat structure.

39. The method of claim 38 wherein the fibrous reinforcing material comprises a layer of a fibrous mat structure with individual parallel fibrous strands incorporated therein.

40. The method of claim 24 wherein the organic polymeric binder precursor is a thermosetting resin.

41. The method of claim 24 wherein the fibrous reinforcing material comprises a plurality of fibrous reinforcing layers separated and adhered together by a corresponding plurality of organic polymeric binder layers.

42. The method of claim 31 further comprising a step of applying a layer of paper to a support structure prior to the step of applying a fibrous reinforcing material.

43. The method of claim 31 further comprising a step of applying a layer of polymeric film to a support structure prior to the step of applying a fibrous reinforcing material.

* * * * *

UNITED STATES PATENT AND TRADEMARK OFFICE
CERTIFICATE OF CORRECTION

PATENT NO.: 5,681,612

DATED: October 28, 1997

INVENTOR(S): Harold W. Benedict, Michael J. Schneider, Donna W. Bange, Gary L. Heacox, Timothy J. Trudeau, and Subramanian Krishnan It is certified that error appears in the above-identified patent and that said Letters Patent is hereby corrected as shown below:

| | |
|---|---|
| Col. 7, line 65 | "sharer" should read --shatter-- |
| Col. 8, line 9 | "amounts" should read --mounts-- |
| Col. 8, line 10 | "amounts" should read --mounts-- |
| Col. 16, line 35 | "carbon;" should read --carbon,-- |
| Col. 17, line 18 | "trader" should read --under-- |
| Col. 27, line 41 | "convened" should read --converted-- |
| Col. 28, line 2 | "flee" should read --free-- |
| Col. 30, line 16 | delete "the" before the word "all" |
| Col. 36, line 62 | after "such" insert --as-- |
| Col. 41, line 67 | "-12" should read --1-12-- |
| Col. 45, line 61 | delete "the is" and insert --this-- |
| Col. 48, line 28 | "Al203" should read --$Al_2O_3$-- |

UNITED STATES PATENT AND TRADEMARK OFFICE
CERTIFICATE OF CORRECTION

PATENT NO.: 5,681,612

DATED: October 28, 1997

INVENTOR(S): Harold W. Benedict, Michael J. Schneider, Donna W. Bange, Gary L. Heacox, Timothy J. Trudeau, and Subramanian Krishnan It is certified that error appears in the above-identified patent and that said Letters Patent is hereby corrected as shown below:

Col. 55, line 65   before "placing" insert --(b)--

Col. 57, line 21   "herein" should read --wherein--

Signed and Sealed this

Tenth Day of November 1998

Attest:

BRUCE LEHMAN

Attesting Officer

Commissioner of Patents and Trademarks